(12) United States Patent
Allin et al.

(10) Patent No.: US 9,460,441 B2
(45) Date of Patent: Oct. 4, 2016

(54) CONSTRUCTION PAYMENT MANAGEMENT SYSTEM AND METHOD WITH DOCUMENT EXCHANGE FEATURES

(75) Inventors: Patrick J. Allin, Lake Bluff, IL (US);
Charles C. Cherry, Glenview, IL (US);
William H. Eichhorn, Hinsdale, IL (US); Howard Niden, Chicago, IL (US)

(73) Assignee: Textura Corporation, Lake Bluff, IL (US)

( * ) Notice: Subject to any disclaimer, the term of this patent is extended or adjusted under 35 U.S.C. 154(b) by 0 days.

(21) Appl. No.: 12/061,805

(22) Filed: Apr. 3, 2008

(65) Prior Publication Data

US 2008/0281735 A1    Nov. 13, 2008

Related U.S. Application Data

(63) Continuation-in-part of application No. 11/509,385, filed on Aug. 24, 2006, which is a (Continued)

(51) Int. Cl.
*G07F 19/00* (2006.01)
*H04M 15/00* (2006.01)
(Continued)

(52) U.S. Cl.
CPC .............. *G06Q 30/00* (2013.01); *G06Q 10/06* (2013.01); *G06Q 20/04* (2013.01); *G06Q 20/042* (2013.01);
(Continued)

(58) Field of Classification Search
CPC ...... G06Q 30/00; G06Q 40/10; G06Q 40/00;
G06Q 20/10; G06Q 20/40; G06Q 10/06;
G06Q 20/04; G06Q 10/042; G06Q 20/102;
G06Q 30/04; G06Q 40/02; G06Q 40/12
USPC ..................................................... 705/34, 44
See application file for complete search history.

(56) References Cited

U.S. PATENT DOCUMENTS 4,700,318 A    10/1987  Ockman
4,774,664 A    9/1988   Campbell et al.
(Continued)

FOREIGN PATENT DOCUMENTS

CN    1459068    11/2003

OTHER PUBLICATIONS

Lamkin takes Abstar into new regions, grows it 66% ;Jackson, Margaret. St. Louis Business Journal 24.39 (May 28, 2004): A9.*
(Continued)

*Primary Examiner* — Matthew Gart
*Assistant Examiner* — Harshad Parikh
(74) *Attorney, Agent, or Firm* — Michael Best & Friedrich LLP

(57) ABSTRACT

Systems and methods for managing a construction payment process. One construction of the system includes a computer readable memory and a software enabled user interface. A process is configured to display to a payee via the user interface an electronic notification of a pending payment and a request for an electronically signed document such as a lien waiver. The processor of this construction is further configured to receive the electronically signed document, store it to a computer readable memory, and initiate payment. In some constructions, the processor is further configured to display the electronically signed document to the payer only after payment has been initiated. In some constructions, the processor is further configured to verify that requirements are fulfilled before initiating payment.

51 Claims, 39 Drawing Sheets

Related U.S. Application Data continuation-in-part of application No. 11/032,699, filed on Jan. 10, 2005, now abandoned.

(60) Provisional application No. 60/910,401, filed on Apr. 5, 2007, provisional application No. 60/926,867, filed on Apr. 30, 2007, provisional application No. 60/583,782, filed on Jun. 29, 2004.

(51) Int. Cl.
*G06Q 40/00* (2012.01)
*G06Q 30/00* (2012.01)
*G06Q 20/10* (2012.01)
*G06Q 20/40* (2012.01)
*G06Q 10/06* (2012.01)
*G06Q 20/04* (2012.01)
*G06Q 30/04* (2012.01)
*G06Q 40/02* (2012.01)

(52) U.S. Cl.
CPC ............ *G06Q 20/10* (2013.01); *G06Q 20/102* (2013.01); *G06Q 20/40* (2013.01); *G06Q 30/04* (2013.01); *G06Q 40/00* (2013.01); *G06Q 40/02* (2013.01); *G06Q 40/10* (2013.01); *G06Q 40/12* (2013.01)

(56) References Cited

U.S. PATENT DOCUMENTS

| | | | |
|---|---|---|---|
| 4,816,655 A * | 3/1989 | Musyck | G06Q 20/347 235/380 |
| 4,876,648 A | 10/1989 | Lloyd | |
| 4,937,743 A | 6/1990 | Rassman et al. | |
| 4,989,141 A | 1/1991 | Lyons et al. | |
| 5,189,606 A | 2/1993 | Burns et al. | |
| 5,239,462 A | 8/1993 | Jones et al. | |
| 5,323,315 A | 6/1994 | Highbloom | |
| 5,521,815 A | 5/1996 | Rose, Jr. | |
| 5,644,727 A | 7/1997 | Atkins | |
| 5,655,085 A * | 8/1997 | Ryan | G06Q 40/02 705/4 |
| 5,699,527 A | 12/1997 | Davidson | |
| 5,704,045 A | 12/1997 | King et al. | |
| 5,709,410 A | 1/1998 | Reeves, Jr. | |
| 5,761,674 A | 6/1998 | Ito | |
| 5,819,230 A | 10/1998 | Christie et al. | |
| 5,870,720 A | 2/1999 | Chusid et al. | |
| 5,870,721 A | 2/1999 | Norris | |
| 5,875,437 A | 2/1999 | Atkins | |
| 5,940,812 A | 8/1999 | Tengel et al. | |
| 5,950,206 A | 9/1999 | Krause | |
| 5,995,947 A | 11/1999 | Fraser et al. | |
| 6,021,397 A | 2/2000 | Jones et al. | |
| 6,025,774 A | 2/2000 | Forbes | |
| 6,029,149 A | 2/2000 | Dykstra et al. | |
| 6,038,547 A | 3/2000 | Casto | |
| 6,064,983 A * | 5/2000 | Koehler | G06Q 40/02 705/31 |
| 6,067,533 A | 5/2000 | McCauley et al. | |
| 6,076,064 A | 6/2000 | Rose, Jr. | |
| 6,112,190 A | 8/2000 | Fletcher et al. | |
| 6,185,543 B1 | 2/2001 | Galperin et al. | |
| 6,366,892 B1 | 4/2002 | Altman et al. | |
| 6,385,594 B1 | 5/2002 | Lebda et al. | |
| 6,393,410 B1 | 5/2002 | Thompson | |
| 6,427,140 B1 * | 7/2002 | Ginter | G06F 21/10 348/E5.006 |
| 6,438,526 B1 | 8/2002 | Dykes et al. | |
| 6,460,021 B1 | 10/2002 | Kirksey | |
| 6,539,365 B1 * | 3/2003 | Kutsumi | G06K 9/00456 382/149 |
| 6,579,764 B2 | 6/2003 | Kuwazawa | |
| 6,581,040 B1 | 6/2003 | Wright et al. | |
| 6,633,875 B2 | 10/2003 | Brady | |
| 6,643,625 B1 | 11/2003 | Acosta et al. | |
| 6,842,760 B1 | 1/2005 | Dorgan et al. | |
| 6,859,768 B1 | 2/2005 | Wakelam et al. | |
| 6,904,412 B1 | 6/2005 | Broadbent et al. | |
| 6,952,717 B1 | 10/2005 | Monchilovich et al. | |
| 6,985,886 B1 | 1/2006 | Broadbent et al. | |
| 7,031,930 B2 | 4/2006 | Freeman et al. | |
| 7,076,455 B1 | 7/2006 | Fogelson | |
| 7,321,864 B1 * | 1/2008 | Gendler | G06Q 10/06 705/7.15 |
| 7,734,546 B2 * | 6/2010 | Allin | G06Q 10/00 705/35 |
| 7,797,210 B2 * | 9/2010 | Eichhorn | G06Q 10/00 705/35 |
| 7,925,584 B2 * | 4/2011 | Allin | G06Q 10/06 705/35 |
| 8,165,935 B2 * | 4/2012 | Allin | G06Q 10/00 705/30 |
| 2001/0027407 A1 | 10/2001 | Mori | |
| 2001/0042785 A1 | 11/2001 | Walker et al. | |
| 2001/0044768 A1 | 11/2001 | Wares | |
| 2001/0047326 A1 | 11/2001 | Broadbent et al. | |
| 2002/0040339 A1 | 4/2002 | Dhar et al. | |
| 2002/0069167 A1 * | 6/2002 | Conlow | G06Q 20/102 705/40 |
| 2003/0009420 A1 * | 1/2003 | Jones | G06Q 20/04 705/39 |
| 2003/0179867 A1 * | 9/2003 | Piepho | H04L 12/2856 379/90.01 |
| 2004/0064402 A1 * | 4/2004 | Dreyer | G06Q 40/00 705/38 |
| 2004/0186763 A1 * | 9/2004 | Smith | G06Q 50/165 705/315 |
| 2004/0210470 A1 | 10/2004 | Rusk | |
| 2004/0215633 A1 | 10/2004 | Harris | |
| 2004/0230521 A1 | 11/2004 | Broadbent et al. | |
| 2004/0236651 A1 * | 11/2004 | Emde | G06F 17/243 705/34 |
| 2004/0255266 A1 | 12/2004 | Dement | |
| 2005/0021449 A1 | 1/2005 | Sweeney | |
| 2005/0033611 A1 * | 2/2005 | Phelps | G06Q 20/10 705/4 |
| 2005/0033690 A1 * | 2/2005 | Antognini | G06K 1/121 705/40 |
| 2005/0039115 A1 | 2/2005 | Gordon et al. | |
| 2005/0076213 A1 | 4/2005 | Conlow | |
| 2005/0137931 A1 | 6/2005 | Janssen | |
| 2005/0171790 A1 | 8/2005 | Blackmon | |
| 2005/0182641 A1 | 8/2005 | Ing et al. | |
| 2005/0197856 A1 | 9/2005 | Drucker | |
| 2005/0197953 A1 | 9/2005 | Broadbent et al. | |
| 2005/0204283 A1 | 9/2005 | Kroeger | |
| 2005/0209897 A1 | 9/2005 | Luhr | |
| 2005/0216400 A1 * | 9/2005 | Doyle | G06Q 20/10 705/39 |
| 2005/0222923 A1 | 10/2005 | Lambright | |
| 2005/0222942 A1 | 10/2005 | Pheil et al. | |
| 2005/0289051 A1 * | 12/2005 | Allin | G06Q 10/00 705/40 |
| 2006/0010005 A1 | 1/2006 | Rowland | |
| 2006/0095777 A1 * | 5/2006 | Brekke | G06Q 30/06 713/176 |
| 2006/0173706 A1 * | 8/2006 | Allin | G06Q 30/00 705/38 |
| 2006/0173775 A1 | 8/2006 | Cullen, III et al. | |
| 2006/0247975 A1 * | 11/2006 | Shapiro | G06Q 20/102 705/14.1 |
| 2007/0078771 A1 * | 4/2007 | Allin | G06Q 10/06 705/52 |
| 2007/0288334 A1 | 12/2007 | Creedle et al. | |
| 2008/0027840 A1 * | 1/2008 | Allin | G06Q 10/00 705/34 |
| 2008/0046350 A1 * | 2/2008 | Allin | G06Q 10/0875 705/35 |
| 2008/0189204 A1 * | 8/2008 | Hansford | G06Q 40/00 705/38 |
| 2008/0256184 A1 * | 10/2008 | Ubaldi | G06Q 10/06 709/205 |

(56) References Cited

U.S. PATENT DOCUMENTS

| | | | | |
|---|---|---|---|---|
| 2008/0281647 | A1* | 11/2008 | Morris | G06Q 10/10 705/311 |
| 2008/0281648 | A1* | 11/2008 | Morris | G06Q 10/10 705/311 |
| 2008/0281649 | A1* | 11/2008 | Morris | G06Q 10/10 705/311 |
| 2008/0281735 | A1* | 11/2008 | Allin | G06Q 10/06 705/34 |
| 2009/0018889 | A1* | 1/2009 | Petersen | G06Q 10/06375 705/7.37 |
| 2009/0171724 | A1* | 7/2009 | Allin | G06Q 10/06 705/30 |
| 2009/0235352 | A1* | 9/2009 | Schrijen | G07F 7/1008 726/18 |
| 2010/0017337 | A1* | 1/2010 | Butler | G06Q 10/0637 705/80 |
| 2010/0088247 | A1* | 4/2010 | Allin | G06Q 10/06 705/344 |
| 2010/0094748 | A1* | 4/2010 | Cobb | G06Q 40/02 705/38 |
| 2010/0145877 | A1* | 6/2010 | Haug | G06Q 40/06 705/36 R |
| 2010/0250417 | A1* | 9/2010 | Allin | G06Q 10/00 705/34 |
| 2010/0268643 | A1* | 10/2010 | Allin | G06Q 10/00 705/40 |
| 2010/0287092 | A1* | 11/2010 | Colman | G06Q 40/025 705/38 |
| 2011/0035364 | A1* | 2/2011 | Lipsey | G06F 17/2836 707/690 |
| 2011/0125636 | A1* | 5/2011 | Allin | G06Q 10/0875 705/40 |
| 2011/0313920 | A1* | 12/2011 | Trickel | G06Q 10/06 705/40 |
| 2012/0022982 | A1* | 1/2012 | Petersen | G06Q 10/06375 705/30 |
| 2012/0095829 | A1* | 4/2012 | Harper | G06Q 10/08 705/14.49 |
| 2012/0254045 | A1* | 10/2012 | Orfano | G06Q 30/06 705/306 |
| 2012/0284178 | A1* | 11/2012 | Allin | G06Q 10/0875 705/40 |
| 2013/0018799 | A1* | 1/2013 | Allin | G06Q 10/06 705/44 |
| 2013/0091023 | A1* | 4/2013 | Shepherd | G06Q 30/02 705/14.72 |
| 2013/0096938 | A1* | 4/2013 | Stueckemann | G06F 19/34 705/2 |
| 2013/0226757 | A1* | 8/2013 | Bouma | G06Q 40/02 705/35 |
| 2014/0081673 | A1* | 3/2014 | Batchelor | G06Q 40/08 705/4 |
| 2014/0195420 | A1* | 7/2014 | Trickel | G06Q 20/10 705/40 |
| 2014/0279404 | A1* | 9/2014 | Kallimani | G06Q 40/025 705/38 |
| 2015/0012377 | A1* | 1/2015 | Koby | G06Q 30/0282 705/26.4 |
| 2015/0213409 | A1* | 7/2015 | Trickel | G06Q 10/103 705/44 |
| 2015/0302382 | A1* | 10/2015 | Reicher | G06Q 20/227 705/44 |

OTHER PUBLICATIONS

What to Do When Your Subs Run Into Financial Problems; Miletsky, Robert. Contractor's Business Management Report 3 (Mar. 2004): 1.*

Best practices in commercial real estate financing: Stein Joshua; Briefings in Real Estate finance 3.4 (Mar. 2004) pp. 355-363.*

Lamkin takes Abstar into new regions, grows it 66%; Jackson, Margaret. St. Louis Business Journal 24.39 (May 28, 2004): A9.*

Unconditional Lien Waivers in Advance of Payment; Mrowiec, John S. Midwest Construction 7.6 (Jun. 2004): 93.*

What to Do When Your Subs Run Into Financial Problems; Miletsky, Robert. Contractors Business Management Report 3 (Mar 2004): 1.*

Computerease Inc., "Paragon, Software for Contractors", p. 1.

Construction Monitoring Systems LLC, "About AD Logo", Welcom to AccuDraw, Available Online at: <http://accudraw.com/aboutAccuDraw.asp?UPK=&loD=&LoT=&EID=&SID=>, p. 1, Retrieved Jun. 9, 2004.

Construction Monitoring Systems LLC, "Questions & Answers", Welcome to AccuDraw, Available Online at: <http://accudraw.com/QandA.asp?UPK=&LoD=&LoT=&EID=&SID=>, pp. 1-2, Retrieved Jun. 9, 2004.

Construction Monitoring Systems LLC, "AccuDraw, an AD Network Product", Lender Page Available Online at: <http://accudraw.com/LenderPage.asp>, pp. 1-3, Retrieved Jun. 9, 2004.

Construction Monitoring Systems LLC, "AccuDraw, an AD Network Product", Processor Page, Available Online at: <http://accudraw.com/ProcessorPage.asp>, pp. 1-3, Retrieved Jun. 9, 2004.

Construction Monitoring Systems LLC, "AccuDraw, an AD Network Product", Builder Page, Available Online at: <http://accudraw.com/BuilderPage.asp>, pp. 1-3, Retrieved Jun. 9, 2004.

Construction Monitoring Systems LLC, "Contact", Welcome to AccuDraw, Available Online at: <http://accudraw.com/contact.asp>, p. 1, Retrieved Jun. 9, 2004.

Construction Monitoring Systems LLC, "Request Info.", Welcome to AccuDraw, Available Online at: <http://accudraw.com/RequestInfo.asp?UPK=&LoD=&LoT-&EID=&SID=>, p. 1, Retrieved Jun. 9, 2004.

Construction Monitoring Systems LLC, AccuDraw Explored Guide Cover Letter, p. 1.

Construction Monitoring Systems LLC, AccuDraw Explored Guide, Available Online at: <https://accudraw.com/AccuDraw%20EXPLORED%20web%20version.htm>, pp. 1-17, Retrieved Feb. 21, 2006.

Construction Monitoring Systems LLC, "CMS/AccuDraw Processor Manual", pp. 1-10.

Construction Monitoring Systems LLC, "Your Agenda Screen Shot", Welcome to AccuDraw, Available Online at: <https://accudraw.com/agenda.asp?UPK=287&LoD=13596&LoT=33953&EID=38664.763587963.706538&SID=106> p. 1, Retrieved Feb. 28, 2006.

Construction Monitoring Systems LLC, "Draw Details Screen Shot", Welcome to AccuDraw, Available Online at: <https://accudraw.com/DrawApproval2.asp?UPK=287&LoD=13596&LoT=33953&EID=38664.763587963.706538&SID=106&PID=38820.3345023148.312131&CD=1>, pp. 1-2, Retrieved Feb. 28, 2006.

Construction Monitoring Systems LLC, "User Information Screen Shot", Welcome to AccuDraw, Available Online at: <https://accudraw.com/userinfo.asp? UPK=287&LoD=13596&33953&EID=38664.763587963.706538&SID=106>, p. 1, Retrieved Feb. 28, 2006.

Construction Monitoring Systems LLC, "AccuDraw: Construction Loan Monitoring Software for the Financial Services Industry", AccuDraw Brochure, pp. 1-2.

ConstructSure, ConstructSure Risk Management, Inspection, Fund Control, and Estimating Services, Available Online at: <http://www.econstructsure.com/solutions.htm> p. 1, Retrieved Jun. 9, 2004.

ConstructSure, "New Program Release—Construction Renovation Bond Program", ConstructSure Risk Management, Inspection, Fund Control, and Estimating Services, Available Online at: <http://www.econstructsure.com/bond_index.htm>, pp. 1-2, Retrieved Jun. 9, 2004.

ConstructSure, "Our Mission", ConstructSure Risk Management, Inspection, Fund Control, and Estimating Services, Available Online at: <http://www.econstructsure.com/mission.htm>, p. 1, Retrieved Jun. 9, 2004.

ConstructSure "About ConstructSure", ConstructSure Risk Management, Inspection, Fund Control, and Estimating Services, Available Online at: <http://www.econstructsure.com/company.htm>, pp. 1-2, Retrieved Jun. 9, 2004.

(56) References Cited

OTHER PUBLICATIONS

ConstructSure, "Our Team", ConstructSure Risk Management, Inspection, Fund Control, and Estimating Services, Available Online at: <http:www.econstructsure.com/team.htm> pp. 1-3, Retrieved Jun. 9, 2004.
ConstructSure, "Our Customers", ConstructSure Risk Management, Inspection, Fund Control, and Estimating Services, Available Online at: <http://www.econstructsure.com/customers.htm>, p. 1, Retrieved Jun. 9, 2004.
ConstructSure, "Our Partners", ConstructSure Risk Management, Inspection, Fund Control, and Estimating Services, Available Online at: <http://www.econstructsure.com/partners.htm>, p. 1, Retrieved Jun. 9, 2006.
Cortexion Inc, Cortexion, Inc—Financial Project Management, Available Online at: <http://www.cortexion.com/Default.aspx>, p. 1, Retrieved Jun. 22, 2006.
Cortexion Inc, "Implementing the Cortexion System", Cortexion, Inc.—Implementation, Available Online at: <http://www.cortexion.com/Implementation.aspx>, p. 1, Retrieved Jun. 22, 2006.
Cortexion Inc, "Cortexion Provides a Unique and Valuable Service to Project Owners and Lenders", Cortexion Inc.—Services, Available Online at: <http://www.cortexion.com/Services.aspx>, pp. 1-2, Retrieved Jun. 22, 2006.
Cortexion Inc, "Banks & Lenders", Cortexion Inc.—Benefits for Banks, Available Online at: <http:/www.cortexion.com/Popups/Banks.aspx>, p. 1, Retrieved Jun. 22, 2006.
Cortexion Inc, "Project Owners", Cortexion Inc.—Benefits for Project Owners, Available Online at: <http://www.cortexion.com/Popups/Owners.aspx>, p. 1, Retrieved Jun. 22, 2006.
Cortexion Inc, "Design Professionals", Cortexion Inc—Benefits for Design Professionals, Available Online at: <http://www.cortexion.com/Popups/Designers.aspx>, p. 1, Retrieved Jun. 22, 2006.
Cortexion Inc, "General Contractors", Cortexion Inc.—Benefits for General Contractors, Available Online at: <http://www.cortexion.com/Popups/GeneralContractors.aspx>, p. 1, Retrieved Jun. 22, 2006.
Cortexion Inc, "Subcontractors", Cortexion Inc.—Benefits for Subcontractors, Available Online at: <http://www.cortexion.com/Popups/Subcontractors.aspx>, p. 1, Retrieved Jun. 22, 2006.
Cortexion Inc, "Suppliers", Cortexion Inc—Benefits for Suppliers—Materials, Equipment, Available Online at: <http://www.cortexion.com/Popups/Suppliers.aspx>, p. 1, Retrieved Jun. 22, 2006.
Cortexion Inc, "Rental Yards", Cortexion Inc.—Benefits for Rental Yards, Available Online at: <http://www.cortexion.com/Popups/RentalYards.aspx>, p. 1, Retrieved Jun. 22, 2006.
Cortexion Inc, "Guaranteed Savings", Cortexion Inc.—Guaranteed Savings, Available Online at: <http://www.cortexion.com/Savings.aspx>, p. 1, Retrieved Jun. 22, 2006.
Cortexion Inc, "Reduction of Risk", Cortexion Inc.—Reduction of Risk, Available Online at: <http://www.cortexion.com/Risk.aspx>, p. 1, Retrieved Jun. 22, 2006.
Cortexion Inc, "No Upfront Costs", Cortexion Inc.—No Upfront Costs, Available Online at: <http://www.cortexion.com/Costs.aspx>, p. 1, Retrieved Jun. 22, 2006.
Cortexion Inc, "Better Project Control", Cortexion Inc.—Better Project Control, Available Online at: <http://www.cortexion.com/ProjectControl.aspx>, p. 1, Retrieved Jun. 22, 2006.
Cortexion Inc, "Schedule Control", Cortexion Inc.—Schedule Control, Available Online at: <http://www.cortexion.com/ScheduleControl.aspx>, p. 1, Retrieved Jun. 22, 2006.
Cortexion Inc, Easy to Use:, Cortexion Inc.—Easy to Use, Available Online at: <http:www.cortexion.com/Easy.aspx>, p. 1, Retrieved Jun. 22, 2006.
Cortexion Inc, "Better Visibility", Cortexion Inc—Better Visibility, Available Online at: <http://www.cortexion.com/Visibility.aspx>, p. 1, Retrieved Jun. 22, 2006.
Cortexion Inc, "High Team Morale", Cortexion Inc.—High Team Morale, Available Online at: <http://www.cortexion.com/Morale.aspx>, p. 1, Retrieved Jun. 22, 2006.
Cortexion Inc, "The Cortexion Team is Dedicated to Eliminating Inefficiencies in Construction Financing and Project Management", Cortexion Inc—About Us, Available Online at: <http://www.cortexion.com/AboutUs.aspx>, pp. 1-2, Retrieved Jun. 22, 2006.
Eclectus Inc, Construction Industry Management and Planning Software—ECL Software, Available Online at: <http://www.eclectusinc.com/>, p. 1, Retrieved Jun. 9, 2004.
Eclectus Inc, "Products", CMIS, Home Construction Accounting, Estimating, Management and Payroll Software—ECL Software, Available Online at: <http://www.eclectusinc.com/cmis.html>, p. 1, Retrieved Jun. 30, 2004.
Eclectus Inc, Construction Industry Management Information System, Fund Control Software and Public Safety—ECL Software, Available Online at: <http://www.eclectusinc.com/products.html>, p. 1, Retrieved Jun. 9, 2004.
Electus Inc, "Fund Control", Fund Control Banking Software—ECL Software, Available Online at: <http://www.eclectusinc.com/fc.html>, pp. 1-2, Retrieved Jun. 9, 2004.
Emerging Solutions Inc, "Constructware. Communication. Collaboration. Control.", Constructware Home Page, Available Online at: <http://www.constructware.com>, pp. 1-2, Retrieved Jan. 18, 2006.
Expesite Inc, "Features and Benefits", Web Based Project Management Software Project Management System, Available Online at: <http://www.expesite.com/homepage/products_services/products_services.asp>, pp. 1-2, Retrieved Jul. 3, 2007.
Expesite Inc, "Project Fact Sheet and Corporate Fact Sheet", Media Kit, Available Online at: <http://www.expesite.com/homepage/press/mediakit.pdf>, pp. 1-5, Retrieved Jul. 3, 2007.
Expesite Inc, "National Companies Sign Up for Online Project Management", Expesite—Collaboration Program Management Available Online at: <http://www.expesite.com/homepage/press/2002_2003/nationalcompanies.asp>, p. 1, Jan. 28, 2002.
Expesite Inc, "Expesite Rolls Our New Cost Tracking Tool in Latest Release", Expesite—Collaboration Management, Available Online at: <http://www.expesite.com/hompage/press/2004/version50.asp>, p. 1, Jan. 6, 2003.
Landamerica Financial Group Inc, "Login", Welcome to SafeDraw, Available Online at: <http://www.safedraw.com/login.asp>, pp. 1-2, Retrieved Jun. 9, 2004.
Landamerica Financial Group Inc, "About AD Logo", Welcome to SafeDraw, Available Online at: <http://www.safedraw.com/aboutAccuDraw.asp?UPK=LoD&LoT=&EID=&SID=>, p. 1, Retrieved Jun. 9, 2004.
Landamerica Financial Group Inc, "Questions & Answers" Welcome to SafeDraw, Available Online at: <http://www.safedraw.com/QandA.asp?UPK=&LoD=&LoT=&EID=&SID=>, pp. 1-2, Retrieved Jun. 9, 2004.
Landamerica Financial Group Inc, "Terms", Welcome to SafeDraw, Available Online at: <http://www.safedraw.com/safedraw_terms_out.asp?UPK=&LoD=&LoT=&EID=&SID=>, pp. 1-4, Retrieved Jun. 9, 2004.
Macomber Builders Kicks Off Second Century of Construction Excellence With Computer Methods, PR Newswire, New York, p. 1, Apr. 22, 2004.
Primavera Systems Inc, Primavera Systems, Inc.—Project and Portfolio Management, Available Online at: <http://www.primavera.com>, p. 1, Retrieved Jan. 18, 2006.
Rawlins, Gordon C, "Construction ERP Software: Balancing Data Between Finance & the Field", CFMA BP, pp. 77-78 & 81-82, Sep.-Oct. 2004.
Sacke & Associates Inc, "Computer Methods International Corp. Appoints Sacke & Associates Inc. as its North American Public Relations Agency of Record", Company News, Available Online at: <http://www.sackepr.com/SackeCMiAug28-2003.html>, pp. 1-2, Aug. 28, 2003.
Safedocs, "About SafeDocs", About SafeDocs, Available Online at: <http://www.sfdocs.com/about.html> pp. 1-2, Retrieved Jun. 9, 2004.
Safedocs, SafeDocs Home, Available Online at: <http://www.sfdocs.com/>, p. 1, Retrieved Jun. 9, 2004.
Safedocs, Unprecedented Document Security, Available Online at: <http://www.sfdocs.com/feature1_popup.html>, p. 1, Retrieved Jun. 9, 2004.

(56) References Cited

OTHER PUBLICATIONS

Safedocs, "Value Proposition", Turn Days Into Hours, Available Online at: <http://www.sfdocs.com/feature2_popup.html>, p. 1, Retrieved Jun. 9, 2004.
Safedocs, "Work-Flow", Unlimited Application Options, Available Online at: <http://www.sfdocs.com/feature3_popup.html>, p. 1, Retrieved Jun. 9, 2004.
Wisconsin Builders Association, "The WBA Foundation", Wisconsin Builders Association—Preserving and Promoting the American Dream, Available Online at: <http://www.wbaonline.org/site/content/about/wba.asp>, pp. 1-3, Retrieved Jan. 12, 2005.
Wisconsin Builders Association, "WBA Foundation Donor Funds" Wisconsin Builders Association—Preserving and Promoting the American Dream, Available Online at: <http://www.wisbuild.org/site/content/about/donorfunds.asp>, pp. 1-2, Retrieved Jan. 12, 2005.
Wisconsin Builders Association, "Past Presidents", Wisconsin Builders Association—Preservation and Promoting the American Dream, Available Online at: <http://www.wbaonline.org/site/content/about/past.asp>, pp. 1-2, Retrieved Jan. 12, 2005.
Wisconsin Builders Association, "Committee Chairs", Wisconsin Builders Association—Preserving and Promoting the American Dream, Available Online at: <http://www.wbaonline.org/site/content/about/committee.asp>, p. 1, Retrieved Jan. 12, 2005.
Wisconsin Builders Association, "Board of Directors", Wisconsin Builders Association—Preserving and Promoting the American Dream, Available Online at: <http://www.wbaonline.org/site/content/about/board.asp> pp. 1-6, Retrieved Jan. 12, 2005.
Wisconsin Builders Association, "About Wisconsin Builders Association" Wisconsin Builders Association—Preserving and Promoting the American Dream, Available Online at: <http://www.wbaonline.org/site/contentabout/>, p. 1, Retrieved Jan. 12, 2005.
Wisconsin Builders Association, "Frequently Asked Questions", WBA Foundation, Available Online at: <http://www.wisbuild.org/pdfs/FAQ.pdf>, pp. 1-2, Retrieved Jan. 12, 2005.
Wisconsin Builders Association, "Fund Creation and Management Policy", WBA Foundation, Available Online at: <http://www.wisbuild.org/pdfs/policysht.pdf>, pp. 1-2, Retrieved Jan. 12, 2005.
Wisconsin Builders Association, "Code of Ethics", WBA Foundation, Available Online at: <http://www.wisbuild.org/pdfs/codethic.pdf>, p. 1, Retrieved Jan. 12, 2005.
Wisconsin Builders Association, "Bylaws", Available Online at: <http://www.wisbuild.org/pdfs/WBAbylaws2004.pdf>, pp. 1-7, Sep. 2004.
Wisconsin Builders Association, "Donation Types", WBA Foundation, Available Online at: <http://www.wisbuild.org/pdfs/dontypes.pdf>, p. 1, Retrieved Jan. 12, 2005.
Wisconsin Builders Association, "2003-2004 Legislative Session: in Review", Available Online at: <http://www.wisbuild.org/pdfs/0304policyupdt.pdf>, pp. 1-4, Jul. 2004.
Wisconsin Builders Association, "Policy Agenda", Wisconsin Builders Association—Preserving and Promoting the American Dream, Available Online at: <http://www.wbaonline.org/site/content/government/policy.asp>, p. 1, Retrieved Jan. 12, 2005.
Wisconsin Builders Association, "Resource Center", Wisconsin Builders Association—Preserving and Promoting the American Dream, Available Online at: <http://www.wbaonline.org/site/content/resource/index.asp>, p. 1, Retrieved Jan. 12, 2005.
Wisconsin Builders Association, "Call to Action", Wisconsin Builders Association—Preserving and Promoting the American Dream, Available Online at: <http://www.wbaonline.org/site/content/government/call.asp>, p. 1, Retrieved Jan. 12, 2005.
Wisconsin Builders Association, "Helpful Links", Wisconsin Builders Association—Preserving and Promoting the American Dream, Available Online at: <http://www.wbaonline.org/site/content/resource/helpful.asp>, pp. 1-5, Retrieved Jan. 12, 2005.
Wisconsin Builders Association, "Press Release", Wisconsin Builders Association—Preserving and Promoting the American Dream, Available Online at: <http://www.wbaonline.org/site/content/resource/press.asp>, pp. 1-2, Retrieved Jan. 12, 2005.
Wisconsin Builders Association, "Construction Data", Wisconsin Builders Association—Preserving and Promoting the American Dream, Available Online at: <http://www.wbaonline.org/site/content/resource/construction.asp>, pp. 1-2, Jan. 12, 2005.
Wisconsin Builders Association, "Consumer Information" Wisconsin Builders Association—Preserving and Promoting the American Dream, Available Online at: <http://www.wbaonline.org/site/content/resource/consumer.asp>, p. 1, Retrieved Jan. 12, 2005.
Wisconsin Builders Association, "Publications", Wisconsin Builders Association—Preserving and Promoting the American Dream, Available Online at: <http://www.wbaonline.org/site/content/resource/publications.asp> p. 1, Jan. 12, 2005.
Wisconsin Builders Association, "Contact Us", Wisconsin Builders Association—Preserving and Promoting the American Dream, Available Online at: <http://www.wbaonline.org/site/content/contact/>, pp. 1-3, Retrieved Jan. 12, 2005.
Wisconsin Department of Administration: Division of State Facilities, "List of Projects Out for Bid", Wisbuild DSF Information System, Available Online at: <http://www.wisbuild.doa.state.wi.us/dfd/dfd_reports/bid_list_public.asp>, pp. 1-4, Jan. 12, 2005.
Zoellick, Bill, "Electronic Signatures—Commentary on the Electronic Signatures in Global and National Commerce Act", Fastwater Library B2B Economy, Available Online at: <www.fastwater.com/Library/B2BEconomy/DigitalSigs/DigSig-Commentary-fr.php3>, pp. 1-11, 2000.
Computerease Inc, "Paragon, Software for Contractors", p. 1, retrieved on Jul. 10, 2006.
Construction Monitoring Systems LLC, AccuDraw Explored Guide Cover Letter, Available Online at: <https://accudraw.com/AccuDraw%20EXPLORED%web%20version.htm>, p. 1, Retrieved Feb. 21, 2006.
Construction Monitoring Systems LLC, "CMS/AccuDraw Processor Manual", pp. 1-10, Retrieved Jul. 10, 2006.
Construction Monitoring Systems LLC, "AccuDraw: Construction Loan Monitoring Software for the Financial Services Industry", AccuDraw Brochure, pp. 1-2, Retrieved Jul. 10, 2006.
Australian Patent Office Action for Application No. 2013200084 dated Nov. 26, 2014 (3 pages).
Canadian Patent Office Action for Application No. 2,682,990 dated Dec. 2, 2014 (4 pages).
Chinese Patent Office Action for Application No. 200880017236.9 dated Feb. 28, 2015 (6 pages).
European Patent Office Exam Report for Application No. 08745152.2 dated Feb. 23, 2015 (5 pages).
Canadian Patent Office Examination Report for Application No. 2682990 dated Dec. 29, 2015 (4 pages).
Chinese Patent Office Action for Application No. 200880017236.9 dated Aug. 3, 2015 (13 pages, including English translation).

\* cited by examiner

CREATE PROJECT

PROJECT INFORMATION

PROJECT NAME *
INTERNAL PROJECT NUMBER
PROJECT TYPE * — RESIDENTIAL - NEW

CONTRACT VALUE *
CONTRACT DATE *
ESTIMATED START DATE * — MM/DD/YYYY
ESTIMATED COMPLETION DATE *

PROJECT FUNDING

BANK NAME *
CITY *
STATE * — ALABAMA
ROUTING NUMBER *
ACCOUNT NUMBER *

LOAN AMOUNT
APPRAISED VALUE
LOAN TO VALUE PERCENT

PROJECT OWNER

OWNER NAME *
ADDRESS LINE 1 *
ADDRESS LINE 2

CITY *
STATE * — ALABAMA
ZIP CODE *

FIG. 31

SITE INFORMATION

ADDRESS LINE 1 *
ADDRESS LINE 2 *
CITY *
STATE *  ALABAMA
ZIP *
PROPERTY LEGAL
DESCRIPTION

COUNTY *
CENSUS TRACT
ASSESSORS PARCEL NO.

HOMEBUILDER  ACB123  CUSTOMER NUMBER  10

SAVE AND ENTER BUDGET    SAVE AS DRAFT

*FIG. 32*

INTERNET
FILE EDIT VIEW FAVORITES TOOLS HELP
ADDRESS HTTP://WWW.URL.COM/
SEARCH  FAVORITES  HISTORY

- USER PREFERENCES
  - EDIT USER
  - CHANGE PASSWORD
- MESSAGES
  - READ MESSAGES
- PROJECTS
  - BROWSE PROJECTS
- ORGANIZATIONS
  - EDIT ORGANIZATION
  - INVITE ORGANIZATION
  - BROWSE ORGANIZATIONS
- USER MANAGEMENT
  - CREATE USER
  - BROWSE USERS

LOGO
HOME | LOG OUT

CREATE COMPLIANCE REQUIREMENT

Scope
Object Type
Requirement
Description

Effective Date
Expiration Date
Initiating Event
☑ Signed      ☑ Required for Payment
☐ Notarized   ☐ Compliance Only Subs
☑ Electronically Stored Document Template
Approval Workflow Expiration
First Notice
Second Notice Role to Send
Rules

SAVE   DELETE

INTERNET

*FIG. 33*

CONSTRUCTION PAYMENT MANAGEMENT SYSTEM AND METHOD WITH DOCUMENT EXCHANGE FEATURES

RELATED APPLICATIONS

The present application claims priority to U.S. Provisional Application No. 60/910,401 filed on Apr. 5, 2007 and U.S. Provisional Application No. 60/926,867 filed on Apr. 30, 2007, the entire contents of which are both herein incorporated by reference. The present application is also a continuation-in-part of prior-filed co-pending U.S. application Ser. No. 11/509,385 filed on Aug. 24, 2006, which claims priority to U.S. application Ser. No. 11/032,699 filed on Jan. 10, 2005, which claims priority to U.S. Provisional Application No. 60/583,782 filed on Jun. 29, 2004, the entire contents of which are all herein incorporated by reference.

BACKGROUND OF THE INVENTION

In the construction industry, some companies have invested a large amount of money and time to automate and/or eliminate particular aspects of the invoicing process between the payer (e.g., a builder, a bank, or a property owner) and a payee (e.g., a subcontractor, vendor, or materials supplier).

SUMMARY OF EMBODIMENTS OF THE INVENTION

Comprehensive automated construction payment management systems may be unneeded or undesired by certain participants in the construction industry. However, such participants may still need or desire automated systems for particular aspects of a construction project or process. As such, there remains a need for automated systems or modules that capture invoices and process budgets or schedules of values, check for document compliance (e.g., verify receipt of requested/required documents), and/or exchange an electronically signed lien waiver for a payment.

Some embodiments of the invention provide systems and methods of managing a construction payment process involving a plurality of participants associated with the construction project and at least one document to be transferred between at least two participants during the construction project in exchange for a payment transferred from a participant receiving the document to a participant creating, submitting, or electronically signing the document. In some embodiments, the method can further include assigning the at least one document to the disbursement of the payment wherein the payment is automatically disbursed if the at least one document is transferred between the at least two participants.

In some embodiments, the method further includes assigning a hold payment enforcement action to the at least one document wherein the hold payment enforcement action is automatically effected if the at least one document is not transferred between the at least two participants. In some embodiments, the hold payment enforcement action is automatically effected without regard to the exchange of other documents between the at least two participants.

In some embodiments, the method further includes creating or electronically signing the at least one document and sending the at least one document to a first participant of the at least two participants, the at least one document requesting a payment from the first participant. In some embodiments, the method can further include receiving approval of the at least one document from the first participant and creating, submitting, or electronically signing at least one additional document in exchange for payment.

In some embodiments, the method further includes creating or electronically signing the at least one document and sending the at least one document to a first participant of the at least two participants, the at least one document including a payment amount. In some embodiments, the method can further include receiving approval of the at least one document from the first participant and creating, submitting, or electronically signing at least one additional document in exchange for payment based on input from the first participant.

BRIEF DESCRIPTION OF THE DRAWINGS

FIG. 9 is an illustration of a create organization form.

FIG. 12 is an illustration of an edit organization form.

FIG. 20 is an illustration of an edit organization form.

FIG. 23 is an illustration of a create user form.

FIG. 26 is an illustration of a view user screen.

FIG. 28 is an illustration of an edit user form.

FIGS. 31 and 32 are illustrations of a create project form.

FIG. 33 is an illustration of a create compliance requirement form.

DETAILED DESCRIPTION

Figure 1:
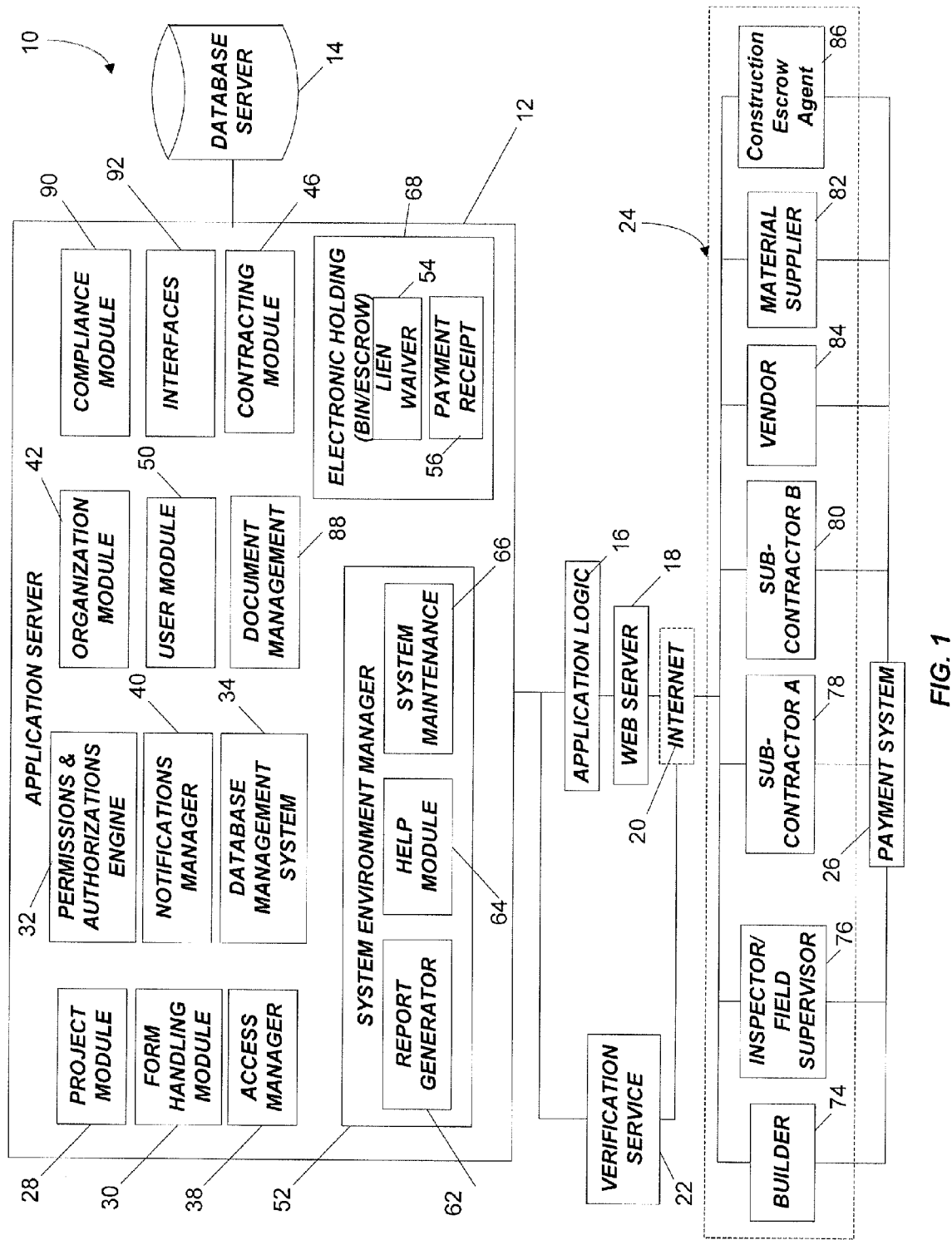
FIG. 1 is a schematic illustration of a construction payment management system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should be noted that a plurality of hardware and software based devices, as well as a plurality of different structural components, may be utilized to implement the invention. Furthermore, and as described in subsequent paragraphs, the specific configurations illustrated in the drawings are intended to exemplify embodiments of the invention and other alternative configurations are possible.

FIG. 1 illustrates a construction payment management system (CPMS) 10 according to one embodiment of the invention. The CPMS 10 includes an application server 12, a database server 14, an application logic module 16, a web server 18, a network 20 (such as the Internet or other networks individually or in combination with the Internet), a verification service 22, participating organizations or individuals 24 (hereinafter "participant" or "organization"), and a payment system 26. The payment system 26 can include an automated clearing house (ACH) system, a wire transfer system, a debit card system, a credit card system, a check generating system that can generate checks, drafts, bills of exchange, promissory notes, IOUs, debit notes, or other negotiable instruments, or any other suitable electronic funds transfer (EFT) system. The verification service 22 verifies new organizations and/or users before they are allowed to use the CPMS 10.

The application server 12 stores and provides access to a project module 28, a form-handling module 30, a permissions and authorizations engine 32, a database management system 34, an access manager 38, a notifications manager 40, an organization module 42, a contracting module 46, a user module 50, a system environment manager 52, and an electronic holding bin/escrow 68. The system environment manager 52 includes a report generator 62, a help module 64, and a system maintenance module 66. The electronic holding bin/escrow 68 can store electronic lien waivers 54 and other electronic payment receipts 56.

The project module 28 administers the creation of projects and stores project-related information. The form-handling module 30 creates documents based on predefined templates. The permissions and authorizations engine 32 identifies and stores permissions and authorizations for users of the CPMS 10. For example, the permissions and authorizations engine 32 can store permissions that specify which users are allowed to sign on behalf of a particular organization or company. Similarly, the access manager 38 manages access to functions provided by the CPMS 10. For example, the access manager 38 can store permissions and/or project assignments.

The notifications manager 40 generates notifications to users of the CPMS 10. For example, the notifications manager 40 can generate notifications when actions are required and/or for information purposes. The organization module 42 creates and maintains organizations using the CPMS 10. The contracting module 46 provides contracting functions and stores contract information. In some embodiments, the contract information is a data class used for posting transactions. The user module 50 creates and maintains individual user accounts for individuals accessing the CPMS 10.

As shown in FIG. 1, the application server 12 also includes a document management module 88. The document management module 88 functions as a categorization and storage facility for electronic documents.

In some embodiments, the application server 12 also includes a compliance module 90. The compliance module 90 includes an engine that stores compliance requirements and their status (e.g., whether a given contractor has complied with particular requirements). In some embodiments, the requirements stored in the compliance module 90 track whether documentation of a document (e.g., contracts, applications for payment, sworn statements, insurance coverage or bonding or certification documents, pre-lien notices, lien waivers, etc.) has been received from participants 24 associated with a project, and, in some embodiments, provides warnings and offer options for enforcing compliance through the payment process, up to and including automatically holding a payment. The documents can be associated with a particular project, a particular property of a project, a particular budget line item within a project, or with a particular participant or organization. The documents can also be tracked for expiration and the compliance module 90 can generate warnings and reminders of impending expiration of payment holds being applied. The warnings and reminders are forwarded to contractors via the notifications manager and payment holds are placed and/or released through the monitoring functions of the compliance module 90.

As shown in FIG. 1, the application server 12 also includes an interfaces module 92. The interfaces module 92 interfaces with external systems, such as accounting systems, project management systems, and enterprise resource planning (ERP) systems, and transmits information to and/or receives information from the external systems.

It should be understood that the components of the application server 12 could be combined in a different manner than as shown and described with respect to FIG. 1. The software used to code the various modules, managers, and engines of the application server 12 can be combined or separated in any suitable manner and can be stored and accessed in any suitable manner.

The application server 12 can be connected to the database server 14, the application logic module 16, and the verification service 22. However, in some embodiments, the verification service 22 may only be connected to the network 20. The application logic module 16 can be connected to the web server 18 or, in some embodiments, directly to the network 20. The web server 18 can be connected to the network 20.

The participants 24 can include, for example, a builder 74, an inspector/field supervisor 76, one or more subcontractors (Subcontractor A 78, Subcontractor B 80, etc.), one or more material suppliers 82, a vendor 84 and one or more construction escrow agents 86. Although not shown in FIG. 1, other participants, such as a bank, a title company, or a property owner, may also be included. The participants 24 can access the application server 12 in order to use the various modules, managers, and engines to perform construction payment management methods according to several embodiments of the invention.

The participants 24 can be connected to the payment system 26; however, some of the participants 24 might not be connected to the payment system 26 in some embodiments of the invention. In some embodiments, the payment system 26 can include an ACH system with one or more originating depository financial institutions (ODFI) and one or more receiving depository financial institutions (RDFI).

Figure 2:
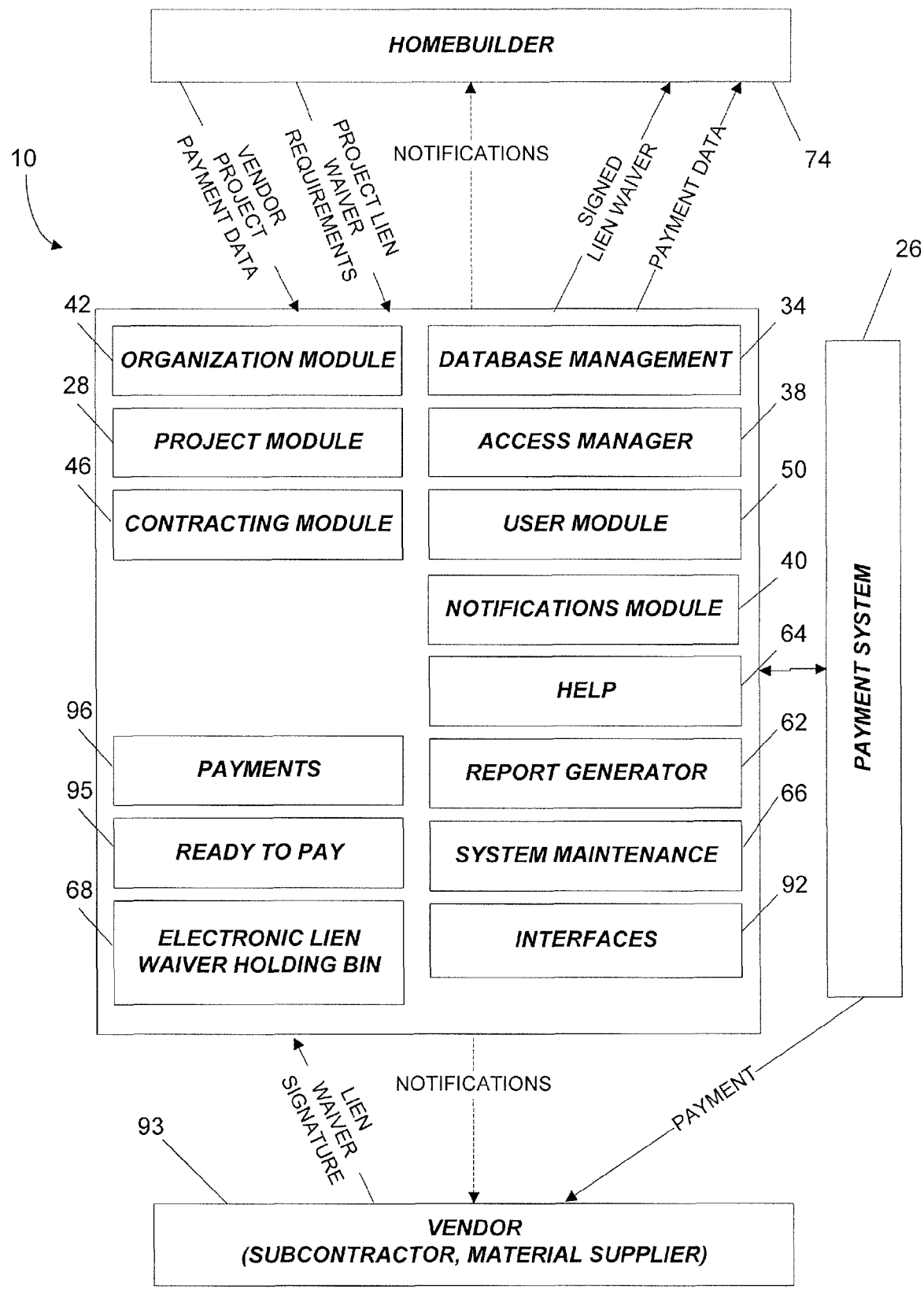
FIG. 2 illustrates a lien waiver exchange workflow of the construction payment management system of FIG. 1 without compliance management.

FIG. 2 illustrates an example of a lien waiver exchange workflow managed by the CPMS 10. In this example, builder 74 is a residential homebuilder; however, the CPMS 10 could be applied to situations where builder 74 is engaged in non-residential construction. Furthermore, similar functionality could be applied to situations where the exchanged document is not a lien waiver 54.

As shown in FIG. 2, a homebuilder 74 can provide the CPMS 10 with project lien waiver requirements. In some embodiments, the homebuilder 74 directly enters the lien waiver requirements into the CPMS 10 (e.g., via a keyboard, a touchscreen, etc.). In other embodiments, the CPMS 10 interfaces with an external system of the homebuilder 74 (e.g., an ERP system) via the interfaces module 92 to obtain the requirements. The lien waiver requirements specify the type of lien waiver required, the dates by which lien waivers must be received in order to receive payment, etc.

After the homebuilder 74 provides the requirements, the homebuilder 74 can provide the CPMS 10 with vendor project payment data. The vendor project payment data can be directly provided by the homebuilder 74 and/or uploaded from an external system of the homebuilder 74 (e.g., an ERP and/or accounting system) via the interfaces module 92. The payment data provided by the homebuilder 74 links a line item with a project, a vendor 93 to be paid, and a requested lien waiver. The payment data includes an amount of a payment to be paid to a particular vendor 93.

When a vendor 93 requests a payment, the CPMS 10 can create an invoice requesting a payment on behalf of the vendor 93. The homebuilder 74 creates an invoice (e.g., using the CPMS 10) on behalf of the vendor 93 that includes a specified payment amount. The vendor 93 views the invoice and approves or disapproves the specified payment amount via the CPMS 10, but cannot modify the payment amount. Once the vendor 93 approves the invoice, the CPMS 10 prompts the vendor 93 to sign a lien waiver in order to initiate payment to the vendor 93. In this manner, the homebuilder 74 specifies the invoice or billed amount submitted by the vendor 93 and, therefore, is often referred to in the industry as "specified billing."

In some embodiments, the CPMS 10 can support "specified payment environments," "specified billing" environments, and invoicing environments, wherein a vendor creates and submits an invoice requesting payment. In some embodiments, the payment amount is specified or set by the vendor 93 (e.g., as a dollar amount or as a percentage of completion), and the homebuilder 74 approves the payment amount (e.g., via the CPMS 10). In some embodiments, the vendor 93 submits an invoice through the CPMS 10. Alternatively, the homebuilder 74 or CPMS 10 can generate an invoice on behalf of the vendor 93 based on the requested payment amount.

After payment data is input into the CPMS 10, the CPMS 10 prompts a vendor 93 (e.g., via a notification) to sign a lien waiver via an electronic signature module of the CPMS 10. The lien waiver can be a partial or a final lien waiver.

Once the vendor 93 electronically signs the lien waiver and submits the lien waiver to the CPMS 10, the CPMS 10 stores the lien waiver in the electronic holding bin 68 and automatically queues a payment to the vendor 93. As shown in FIG. 2, the CPMS 10 of this example includes a ready-to-pay module 95 that stores queued payments. Once the payment is ready to execute, the CPMS 10 initiates a payment to the vendor 93 (e.g., via the payment system 26). For example, the CPMS 10 can initiate a payment to the vendor 93 via ACH.

The CPMS 10 also allows the homebuilder 74 access to the signed lien waiver. In some embodiments, however, the CPMS 10 prevents the homebuilder 74 from viewing the signature on the lien waiver until payment to the vendor 93 is confirmed. Once the payment is confirmed, the CPMS 10 also provides a receipt of payment (e.g., via a notification) to the vendor 93. In addition, the CPMS 10 can create a payment record, which the CPMS 10 stores internally in a payment module 96 and provides to the homebuilder 74 (e.g., via an external ERP or accounting system of the homebuilder 74). In some embodiments the payment record can include an ACH record or file.

Figure 3:
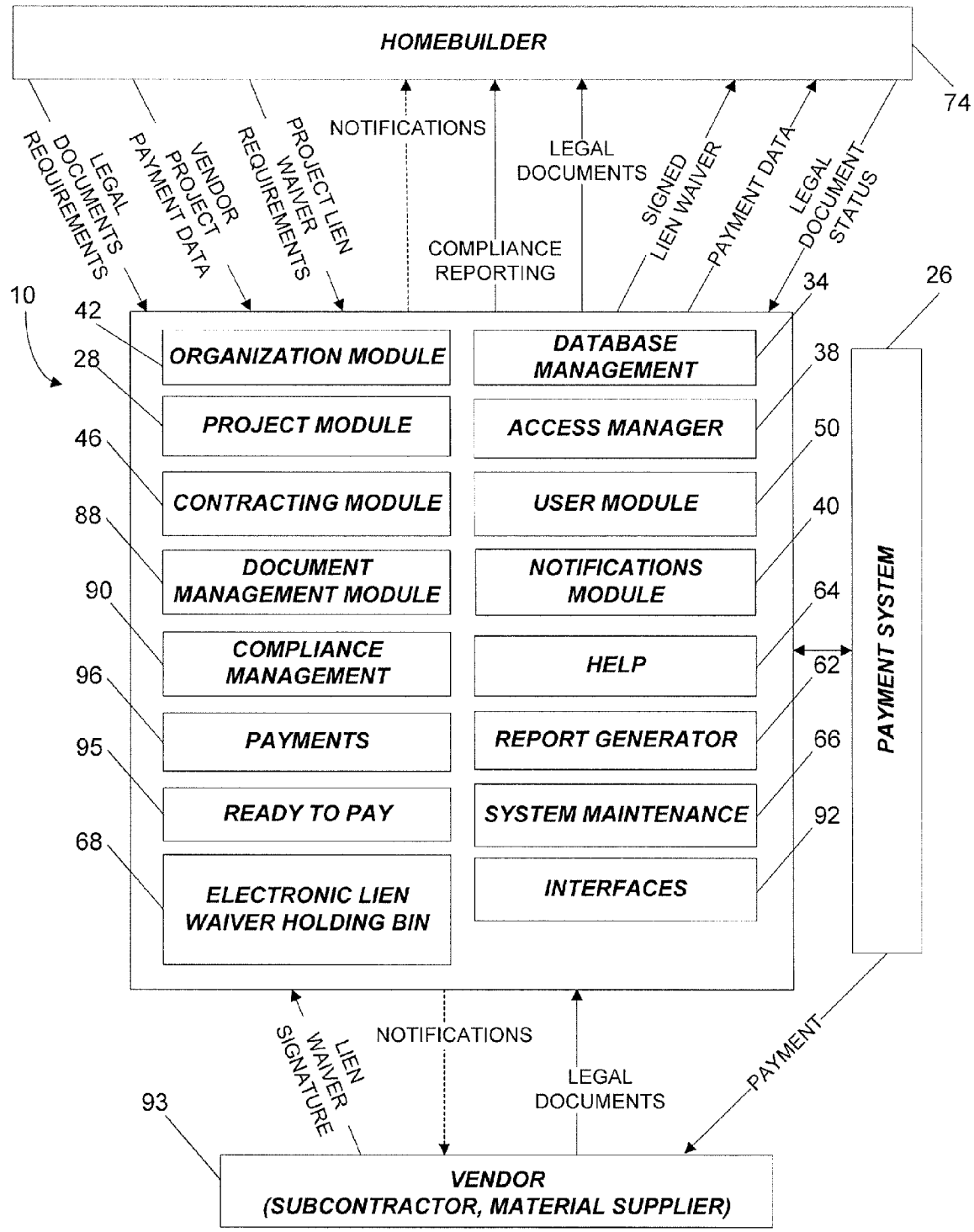
FIG. 3 illustrates a lien waiver exchange workflow of the construction payment management system of FIG. 1 with compliance management.

It should be noted that the CPMS 10 illustrated in FIG. 2 does not include a document management module 88 or a compliance management module 90. Therefore, the CPMS 10 illustrated in FIG. 2 does not provide compliance management. FIG. 3 illustrates a workflow of the CPMS 10 interacting with a homebuilder 74 and one or more vendors 93 wherein the CPMS 10 includes a document management module 88 and a compliance management module 90 and, therefore, provides compliance management. It should be understood that in some embodiments, the CPMS 10 can include a document management module 88 and a compliance management module 90 that can be "turned-on" and "turned-off" in order to optionally provide compliance management as needed or desired.

The CPMS 10 shown in FIG. 3 receives project lien waiver requirements as described above with respect to FIG. 2. The CPMS 10, however, also obtains document requirements from the homebuilder 74. The document requirements can include a list of documents the homebuilder 74 requires from a vendor 93, deadlines for receiving the requested documents, actions to be taken if the requested documents are not received from a particular vendor 93, etc. For example, the homebuilder 74 can specify an enforcement action for a particular requested document. The enforcement action specifies at least one action to be automatically performed by the CPMS 10 if a vendor 93 does not provide a requested document. For example, the enforcement action can include an "Advise Only" action that includes automatically notifying the homebuilder 74 and/or the vendor 93 of a missing document. The enforcement action also can include a "Hold Payment" action that includes automatically holding a payment to a vendor 93 who does not provide a requested document.

The document or compliance requirements can be set at an organization level and/or a project level. In some embodiments, the homebuilder 74 can directly enter the document requirements into the CPMS 10. In other embodiments, the homebuilder 74 can load document requirements to the CPMS 10 via an external system (e.g., an ERP system) using the interfaces module 92 of the CPMS 10. After the homebuilder 74 provides document requirements to the CPMS 10, the vendor 93 can upload the requested documents to the CPMS 10 for approval by the homebuilder 74.

After the homebuilder 74 provides the lien waiver and document requirements, the homebuilder 74 can provide the CPMS 10 with vendor project payment data via the interfaces module 92 as described above with respect to FIG. 2. After the homebuilder 74 enters the payment data into the CPMS 10, the CPMS 10 prompts the vendor 93 (e.g., via a notification) to electronically sign a lien waiver and, once the vendor 93 signs the lien waiver, stores the lien waiver in the electronic holding bin 68. At this point in the lien waiver and payment exchange process, the CPMS 10 can also prompt the vendors 93 to enter any missing compliance documents that are required before a vendor can receive a payment. In comparison to the exchange process described above with respect to FIG. 2, if the vendor 93 is noncompliant with the required documents and the homebuilder 74 has selected to hold payments when a vendor 93 is deemed noncompliant, the payment for the vendor is not automatically generated even if the vendor 93 signs the requested lien waiver.

When a vendor 93 is compliant with the required documents, the homebuilder 74 updates the status of the compliance requirements associated with the vendor 93 and releases any held payments. A payment is then queued for execution, as described above with respect to FIG. 2. Once the payment is ready to execute, the CPMS 10 initiates a payment to the vendor 93 (e.g., via ACH). The CPMS 10 also allows the homebuilder 74 to access the signed lien waiver. In some embodiments, however, the CPMS 10 prevents the homebuilder 74 from viewing the signature on the lien waiver until payment to the vendor 93 is confirmed. Once the payment is confirmed, the CPMS 10 provides a receipt of payment (e.g., via a notification) to the vendor 93. In addition, the CPMS 10 can create a payment record for the homebuilder 74, as described above with respect to FIG. 2.

Figure 4:
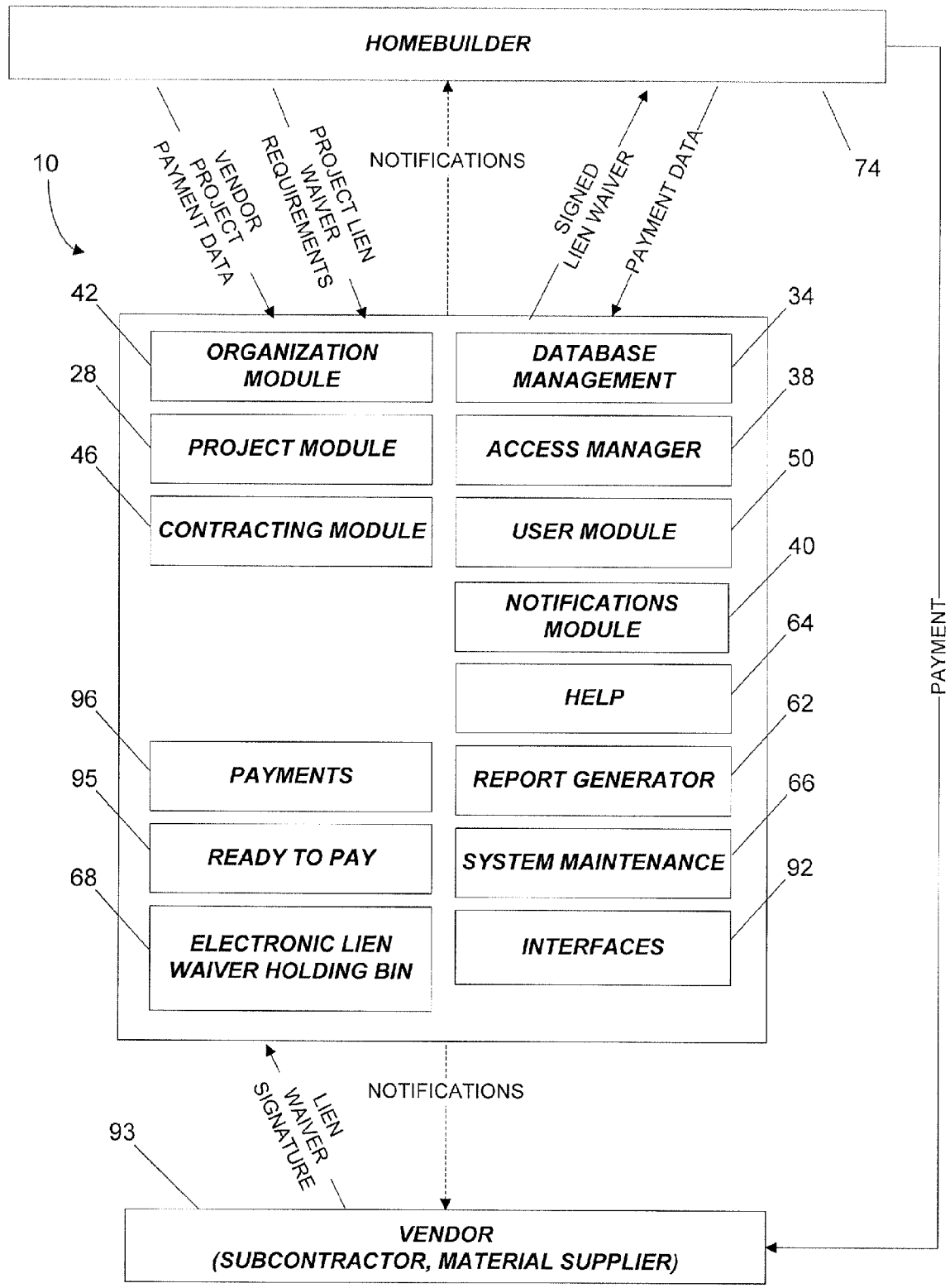
FIG. 4 illustrates a lien waiver exchange workflow of the construction payment management system of FIG. 1 without compliance management and without automated electronic payment.
Figure 5:
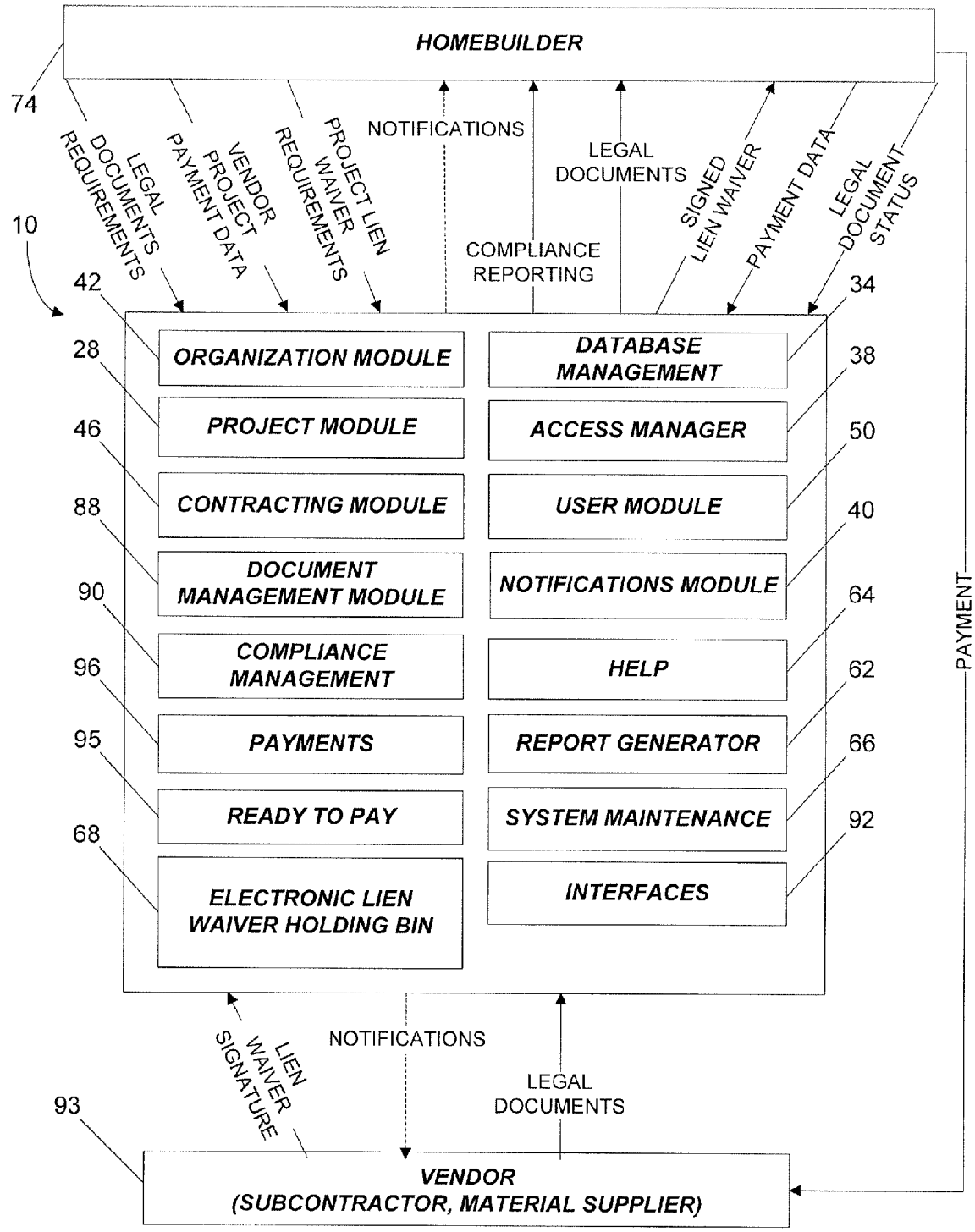
FIG. 5 illustrates a lien waiver exchange workflow of the construction payment management system of FIG. 1 with compliance management and without automated electronic payment.

In additional embodiments, various aspects of the workflow illustrated in FIGS. 2 and 3 may be modified or removed depending upon the particular needs of the builder 74 and the construction project. For example, FIGS. 4 and 5 illustrate lien waiver exchange workflows wherein the CPMS 10 is not directly connected to a payment system 26. Instead, builder 74 is notified by the system that a lien waiver has been stored in the electronic holding bin 68. Builder 74 then effectuates payment manually—for example, by writing a check and physically delivering it to the vendor. Builder 74 indicates to the CPMS 10 that payment has been made and CPMS 10 proceeds as illustrated above in FIG. 2 or 3.

Figure 6:
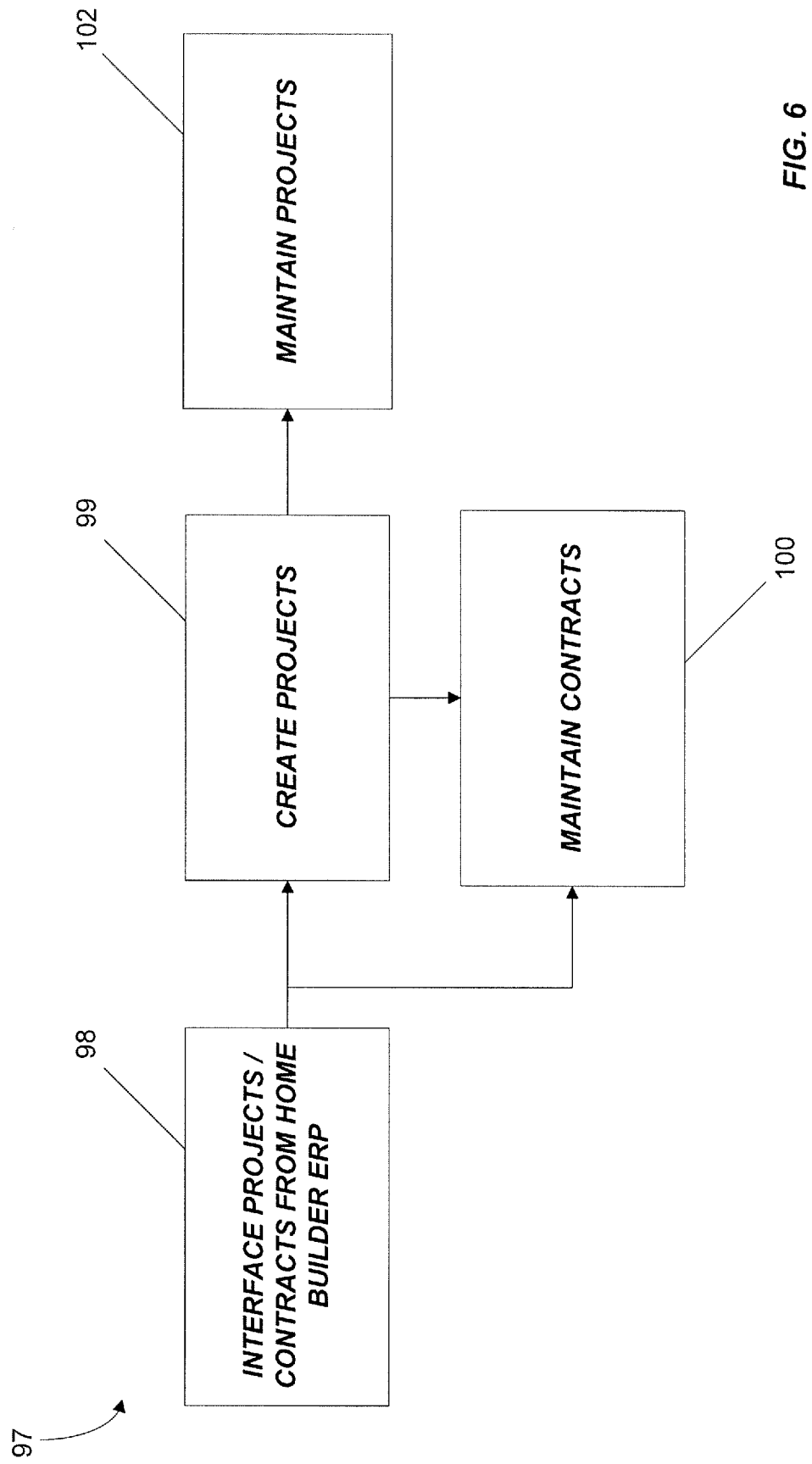
FIG. 6 is a schematic illustration of a manage project process.

FIGS. 6-39 illustrate an overview of the construction payment management processes that can be performed by the participants 24 using the various modules, managers, and engines stored in the application server 12. FIG. 6 illustrates a manage project process 97, which includes an interface project/contract process 98, a create projects process 99, a maintain contracts process 100, and a maintain projects process 102.

Figure 7:
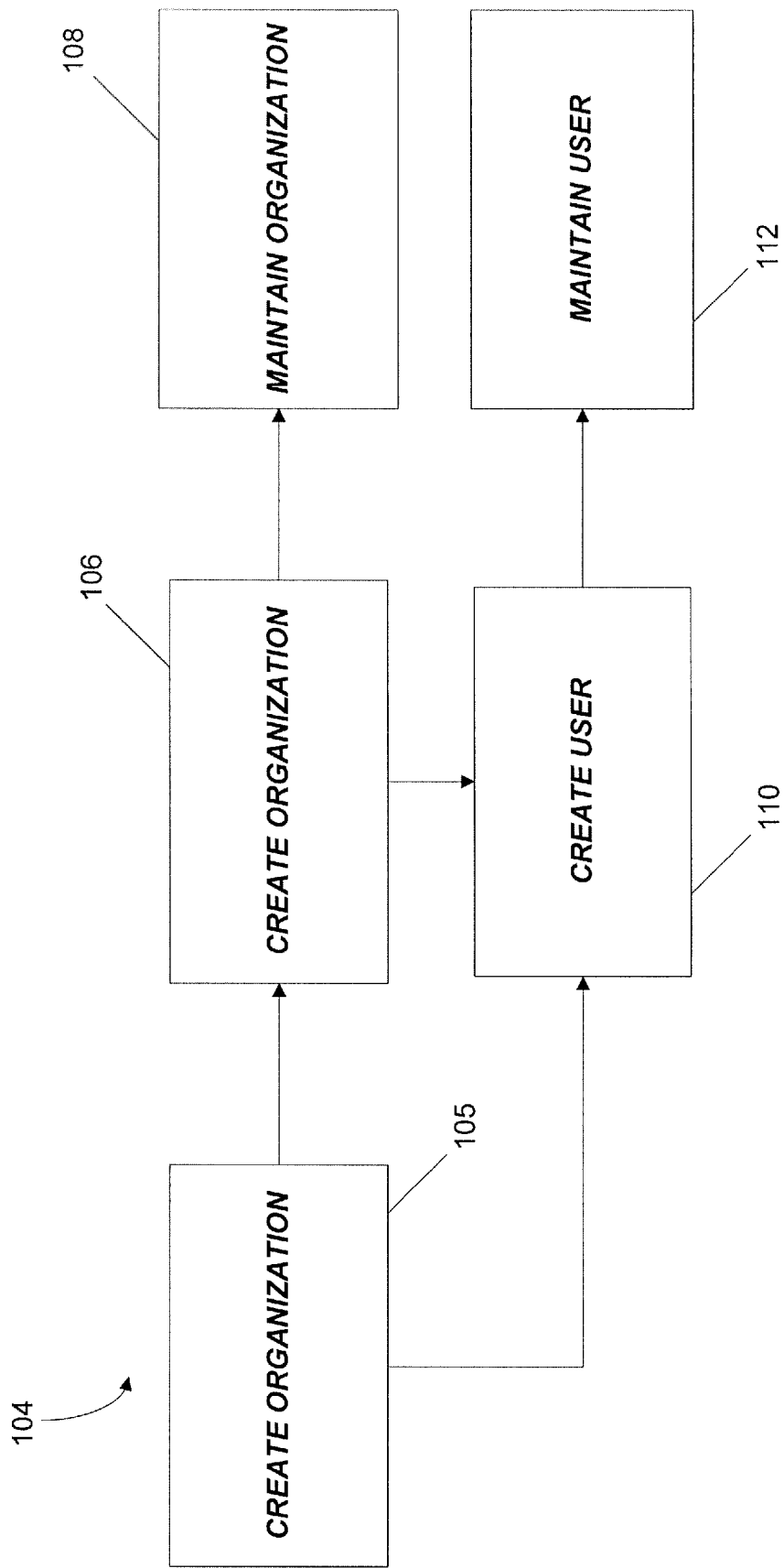
FIG. 7 is a schematic illustration of a manage organization process.

FIG. 7 illustrates a manage organization process 104 (which can be performed by the organization module 42 and/or the user module 50) which includes an invite organization/user process 105, a create organization process 106, a maintain organization process 108, a create user process 110, and a maintain user process 112.

Figure 8:
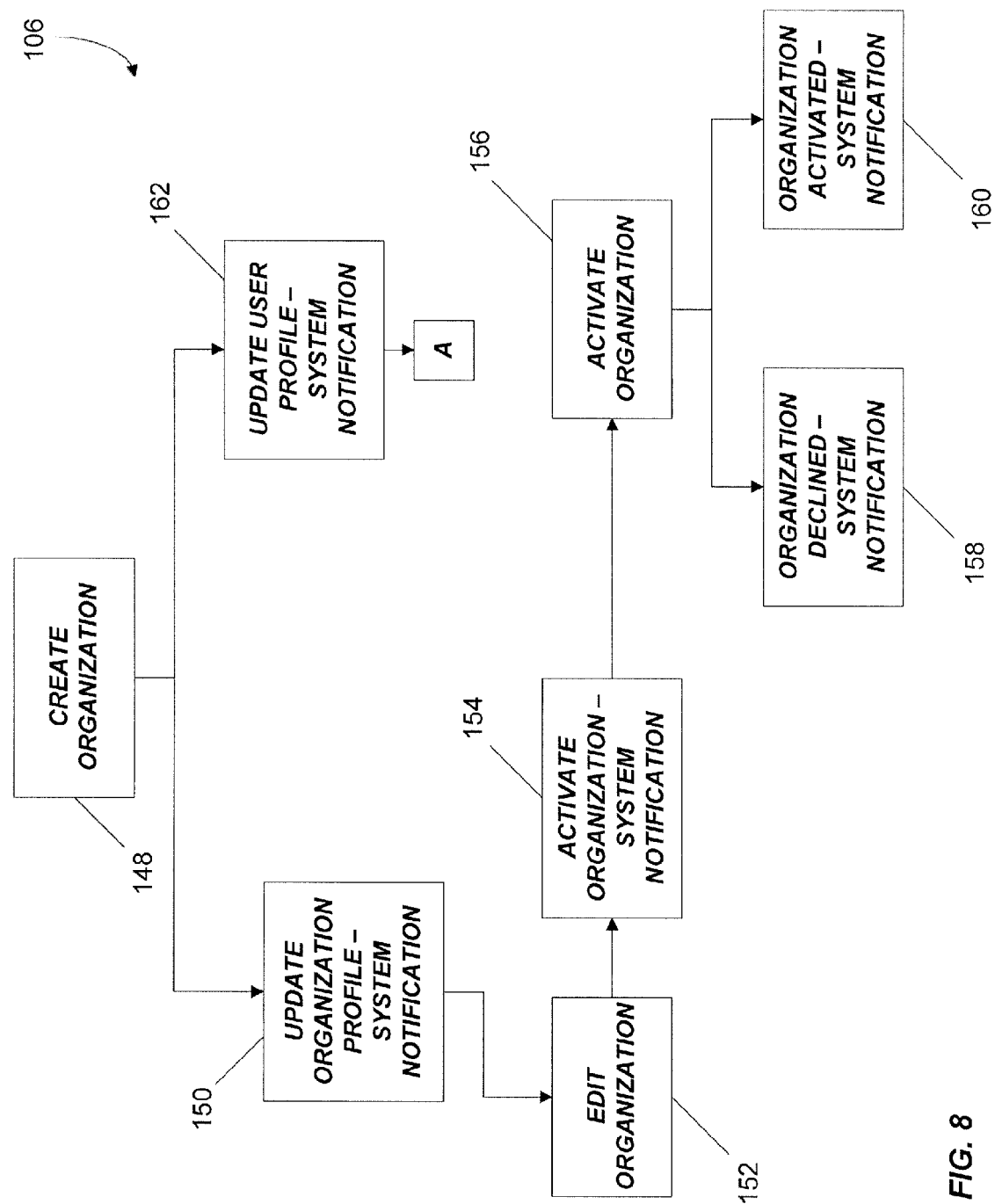
FIG. 8 is a schematic illustration of a create organization and/or user process.

FIG. 8 illustrates the create organization process 106, which can be included in the manage organization process 104. The create organization process 106 can be performed by any of the participants 24 using the organization module 42. The create organization process 106 includes a create organization task 148, an update organization profile task 150, an edit organization task 152, and an activate organization task 156. An update user profile task 162 can also be performed, as further described with respect to FIG. 22.

Figure 9:
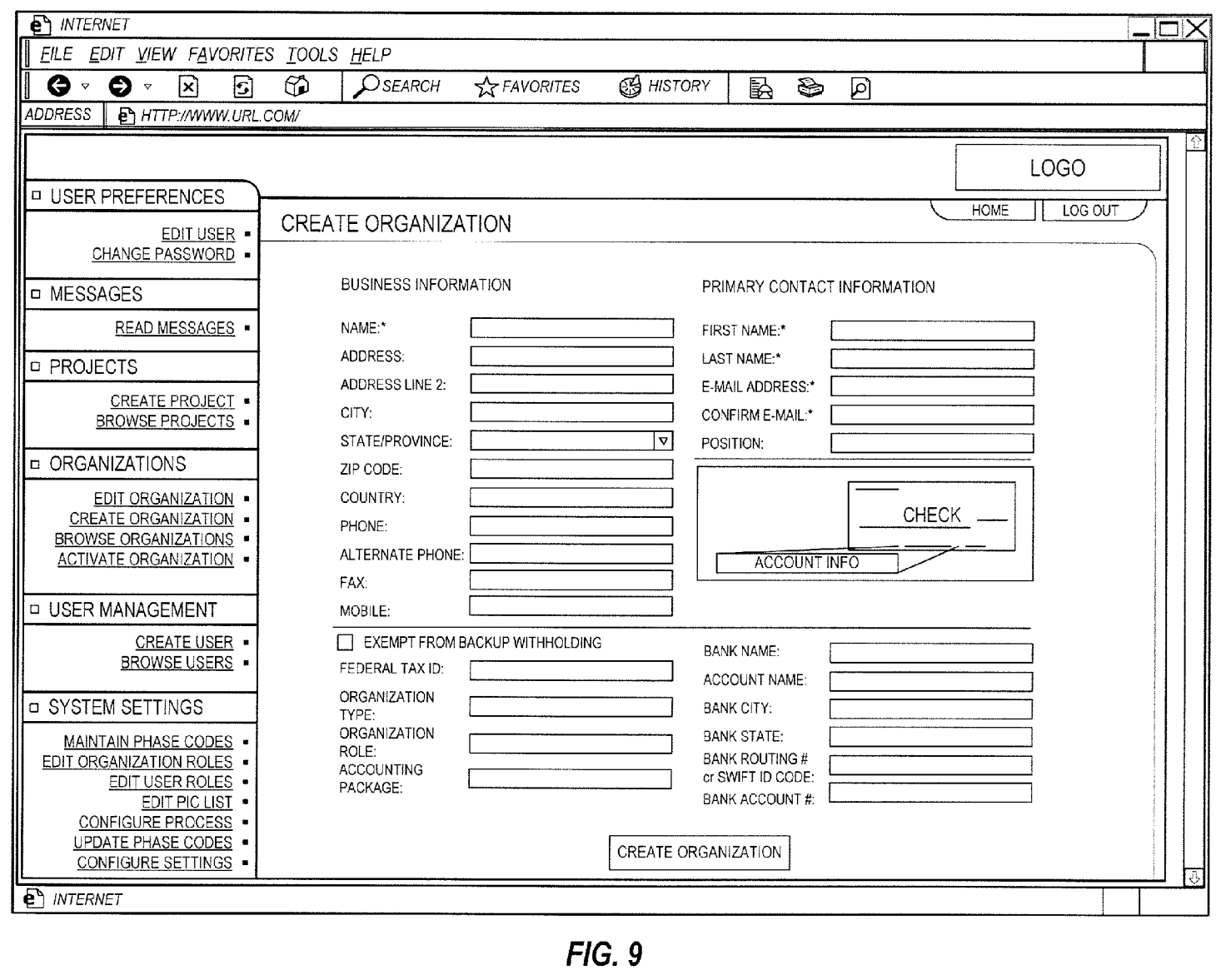

FIG. 9 illustrates a create organization form that can be associated with the create organization task 148. One or more of the participants 24 can access the create organization form through the organization module 42. The participant 24 can then enter the requested information, such as business information, primary contact information, tax information, and banking information. For example, the participant 24 can enter an organization or company name, address, city, state, zip code, county, bank account number, bank routing number, and federal employer identification number (FEIN). The participant 24 can also enter user information associated with the organization, such as user name (first and last), title, email address, and phone number. In some embodiments, the first user of the participating organization 24 that enters his or her personal information as the user information associated with the organization can be deemed an administrator for that participant 24 and can be given more access to the information for the participant than subsequent users. The CPMS 10 can use comprehensive role-based security so that project participants only see information tailored to their specific needs in the project. In some embodiments, once an organization is registered in the CPMS 10, the organization can receive payments for any projects managed by the CPMS 10.

Figure 10:
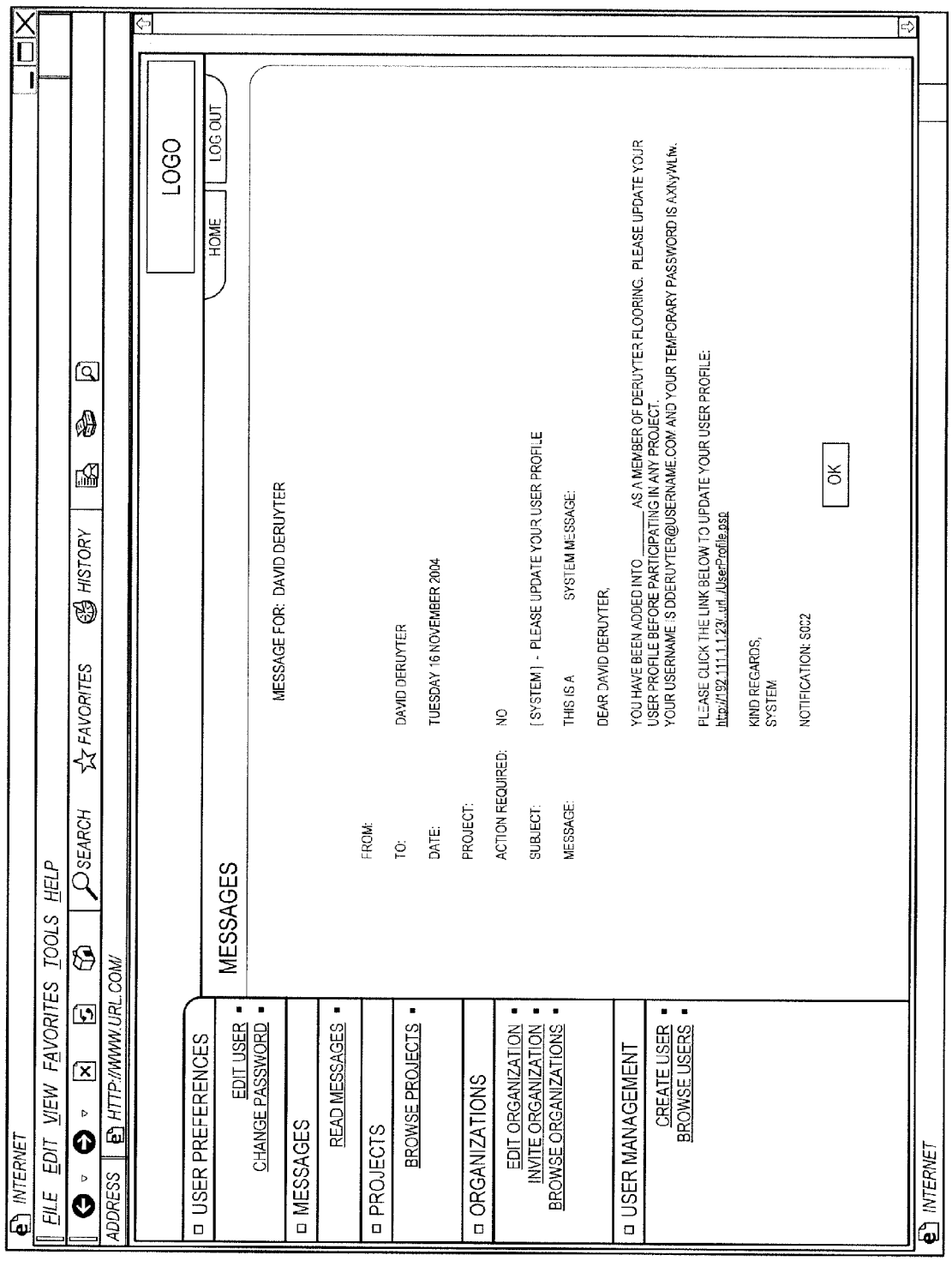
FIG. 10 is an illustration of a new user system notification.

FIG. 10 illustrates a notification that can be transmitted during the update user profile task 162. Unless explicitly stated otherwise, the terms "system notification," "notification," or "system message" as used herein and in the appended claims refer to any form of communication with a participant 24, such as an email message, a screen notice, a text message, a voice message, etc. The system notification of FIG. 8 includes a username and a temporary password for the first user of the participant 24.

Figure 11:
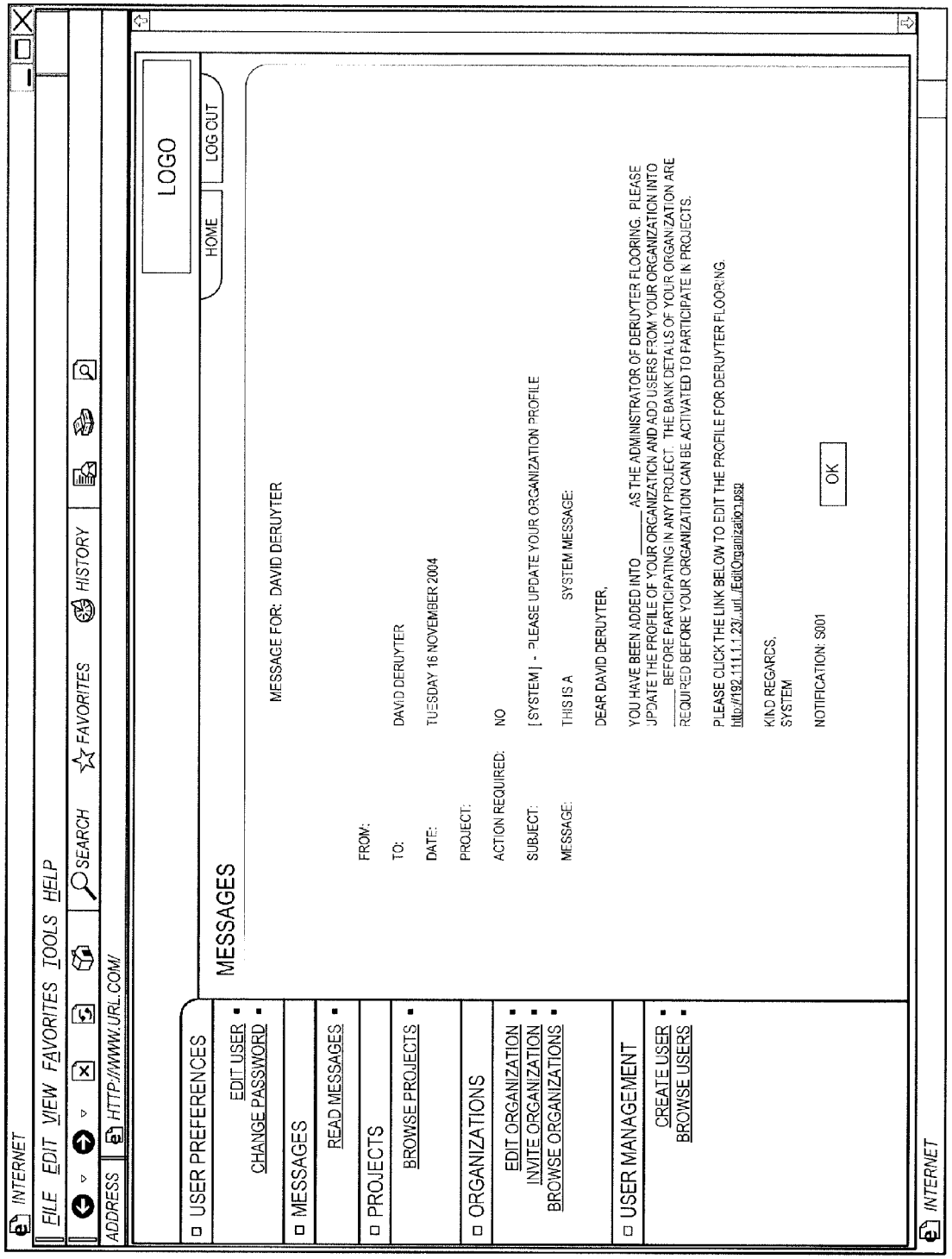
FIG. 11 is an illustration of a system notification.

FIG. 11 illustrates a notification that can be transmitted during the update organization profile task 150. The notification of FIG. 11 can be sent to the administrator for the participant 24. The notification includes a statement requesting the recipient to update the organization profile, add users before participating in a project, and provide bank details.

Figure 12:
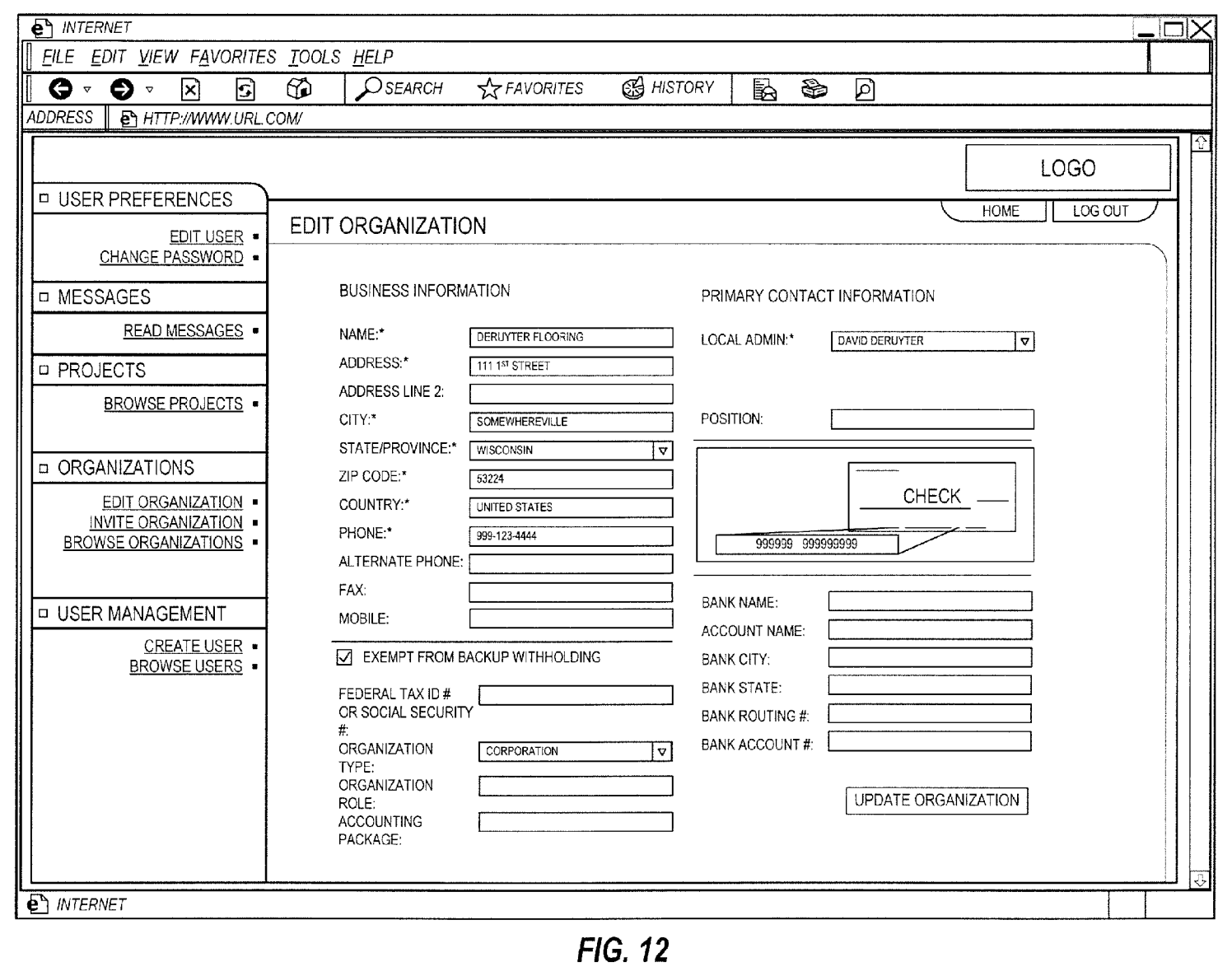

FIG. 12 illustrates an edit organization form that can be associated with the edit organization task 152. Each participant 24 can access the edit organization form through the organization module 42. The participant 24 can modify the existing information, such as business information, primary contact information, tax information, and banking information. In some embodiments, the first user of the participating organization 24 that entered his or her information as user information associated with the organization is the only user given access to the edit organization form.

Figure 13:
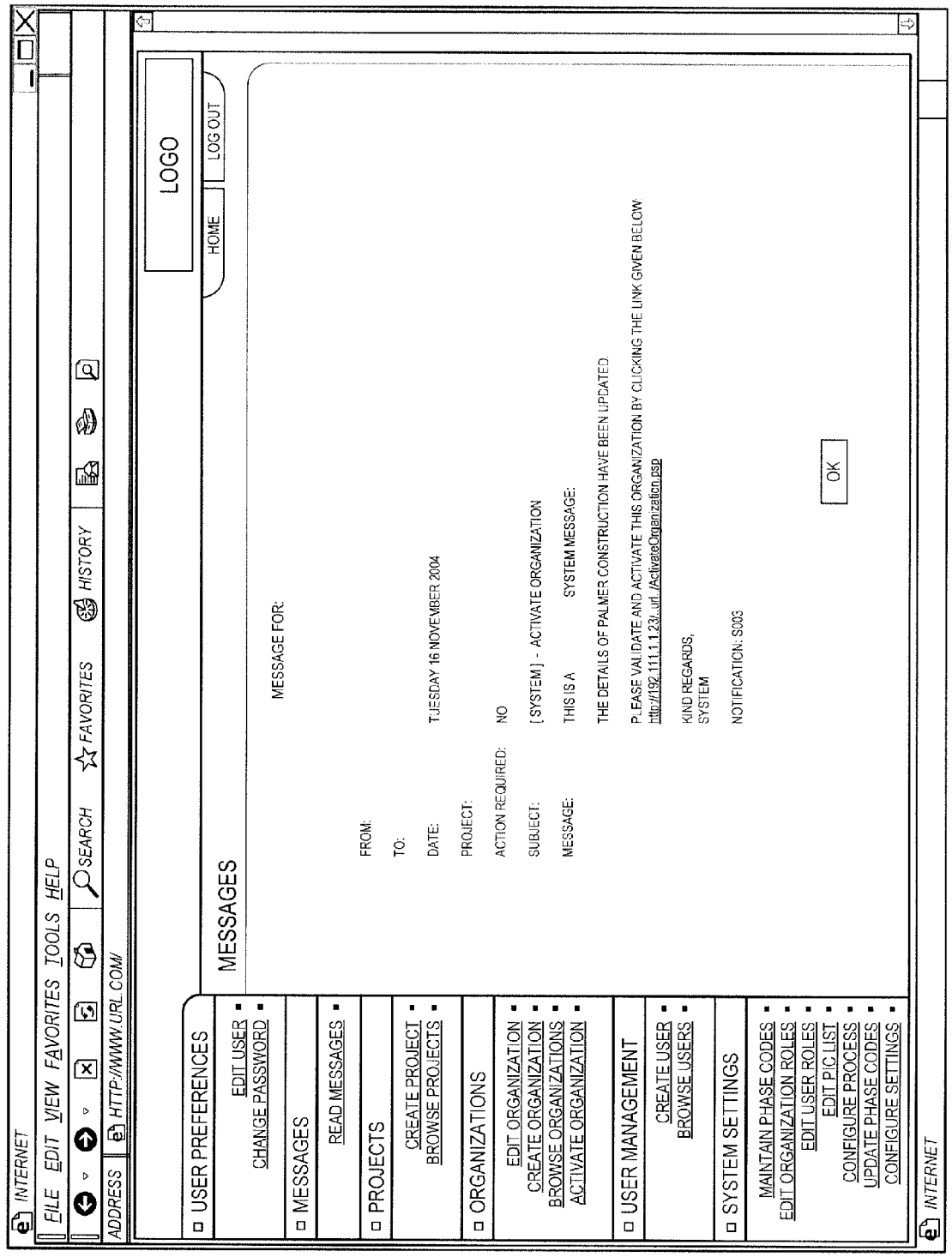
FIG. 13 is an illustration of an activate organization notification.

FIG. 13 illustrates an activate organization notification that can be transmitted during the activate organization notification task 156. The notification of FIG. 13 includes a statement that the details of the organization have been updated and a request that the organization be validated and activated.

Figure 14:
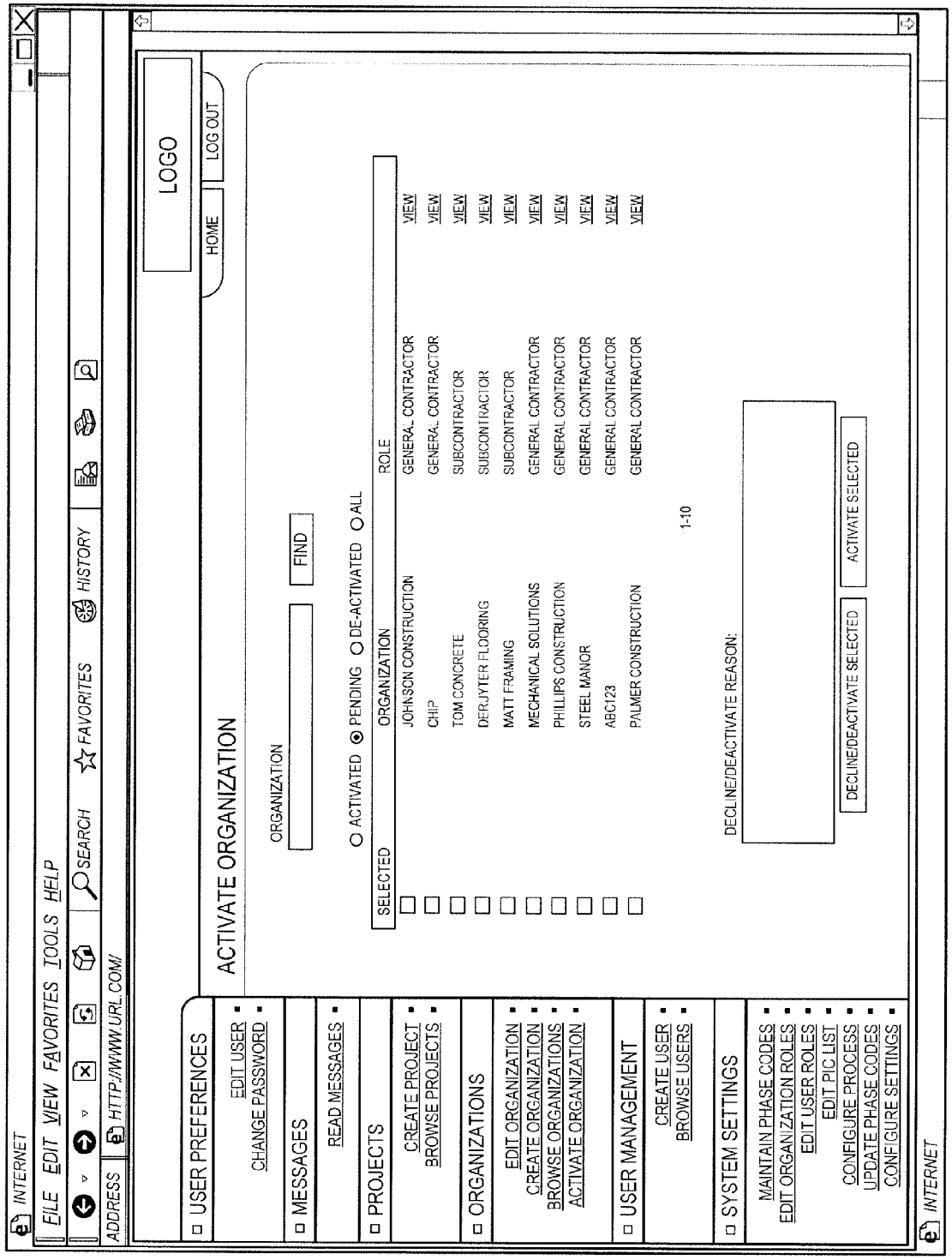
FIG. 14 is an illustration of an activate organization form.

FIG. 14 illustrates an activate organization form that can be associated with the activate organization task 156. The form of FIG. 14 includes a listing of participants 24 (e.g., including the organization name, its role in the construction process, the ability to select participants 24, and the ability to view information for the participants 24). The form of FIG. 14 also includes a "Find" feature, the ability to specify the type of participant 24, and the ability to decline/deactivate selected organizations and to provide a reason for the decline/deactivation.

Figure 15:
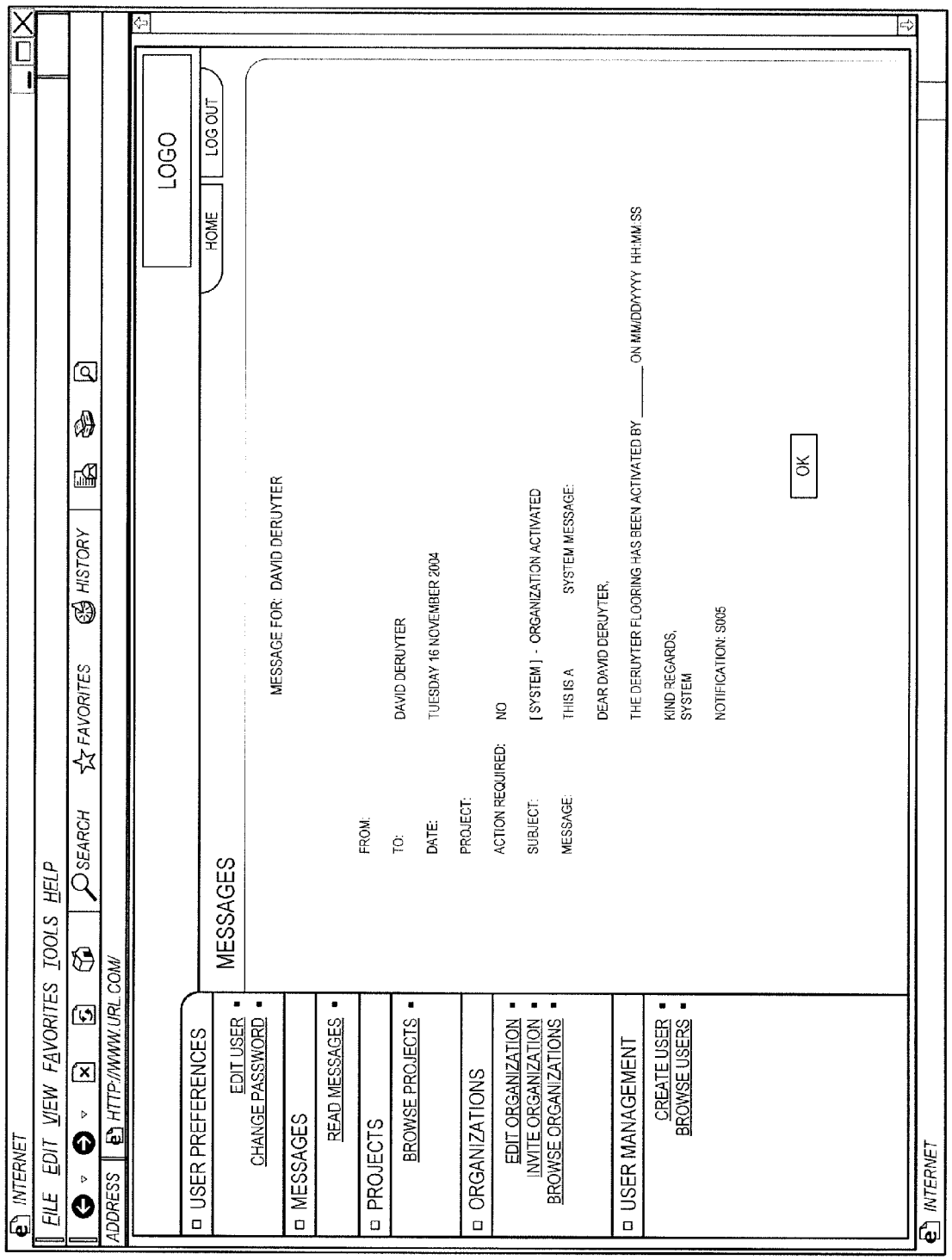
FIG. 15 is an illustration of an organization activated notification.
Figure 16:
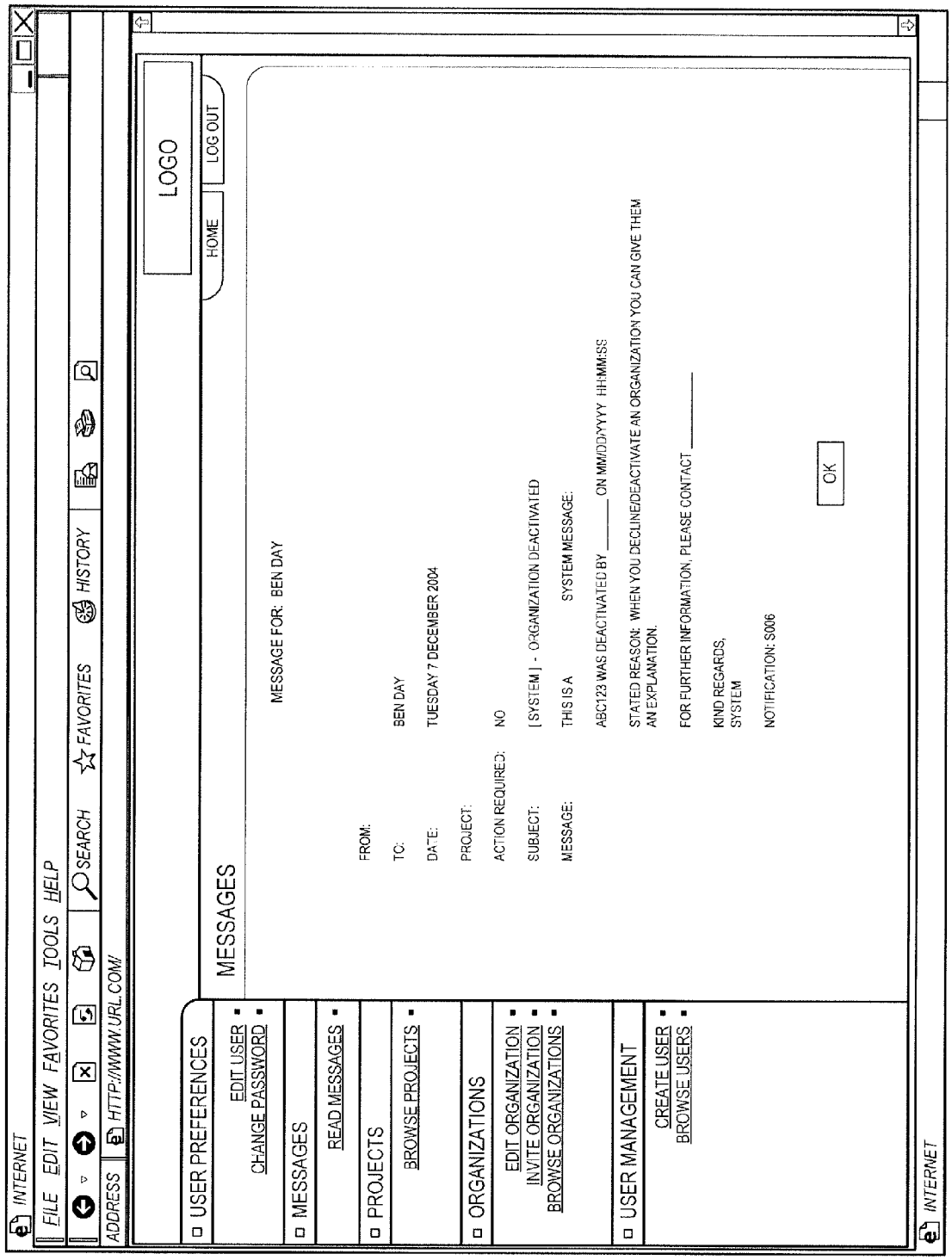
FIG. 16 is an illustration of an organization deactivated notification.

FIG. 15 illustrates an organization activated notification that can be transmitted during the organization activated task 160. Similarly, FIG. 16 illustrates an organization deactivated notification that can be transmitted during the organization declined task 158.

Figure 17:
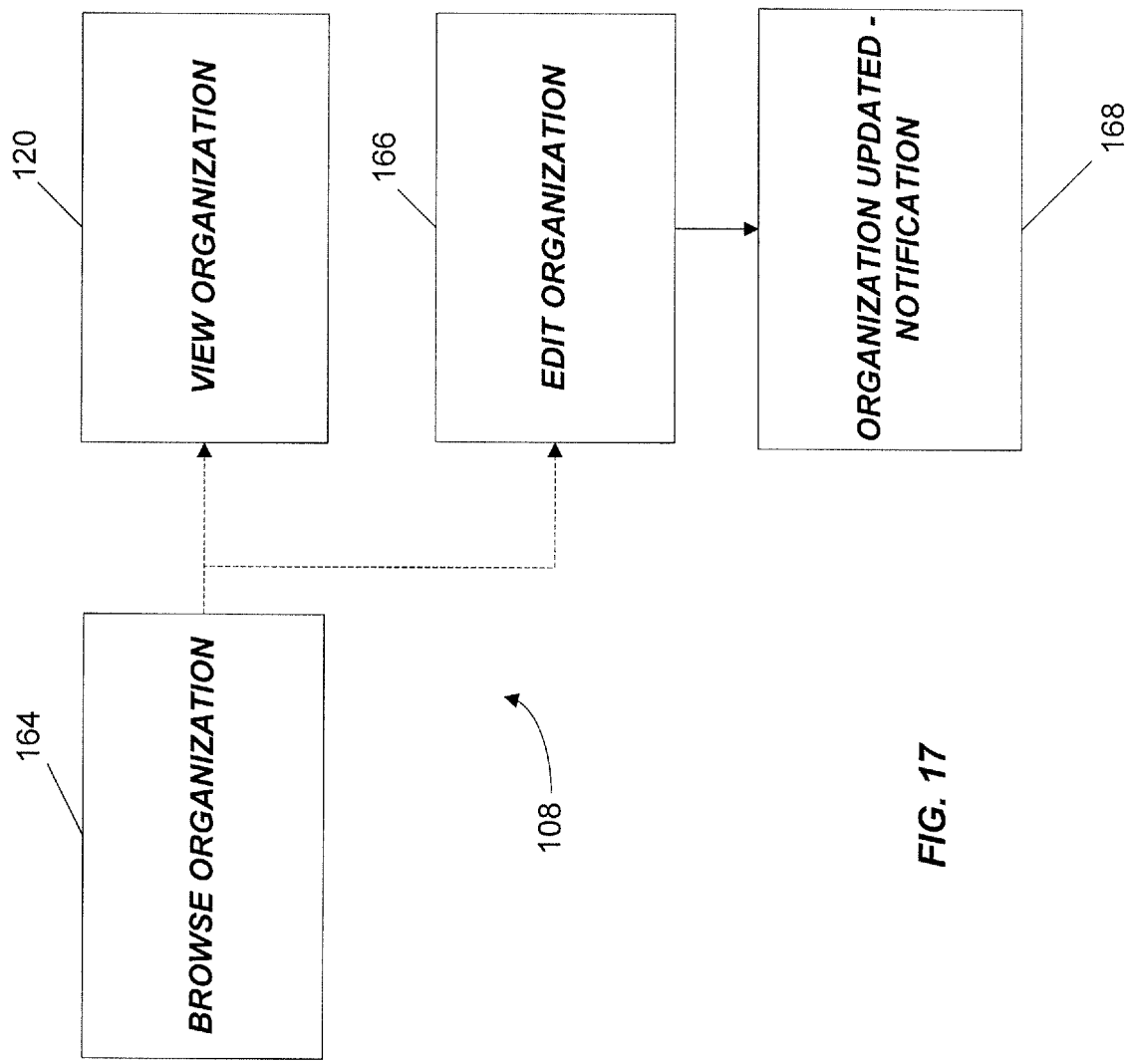
FIG. 17 is a schematic illustration of a maintain organization process.

FIG. 17 illustrates a maintain organization process 108, which can be included in the manage organization process 104. The maintain organization process 108 can be used by the organizations themselves or by other participants to maintain the accuracy of the contact information, bank account information, or any other type of information necessary for the construction payment process. The maintain organization process 108 can be performed by the participants using the organization module 42. The maintain organization process 108 of FIG. 17 includes a browse organization task 164, an edit organization task 166, an organization updated notification task 168, and a view organization task 120.

Figure 18:
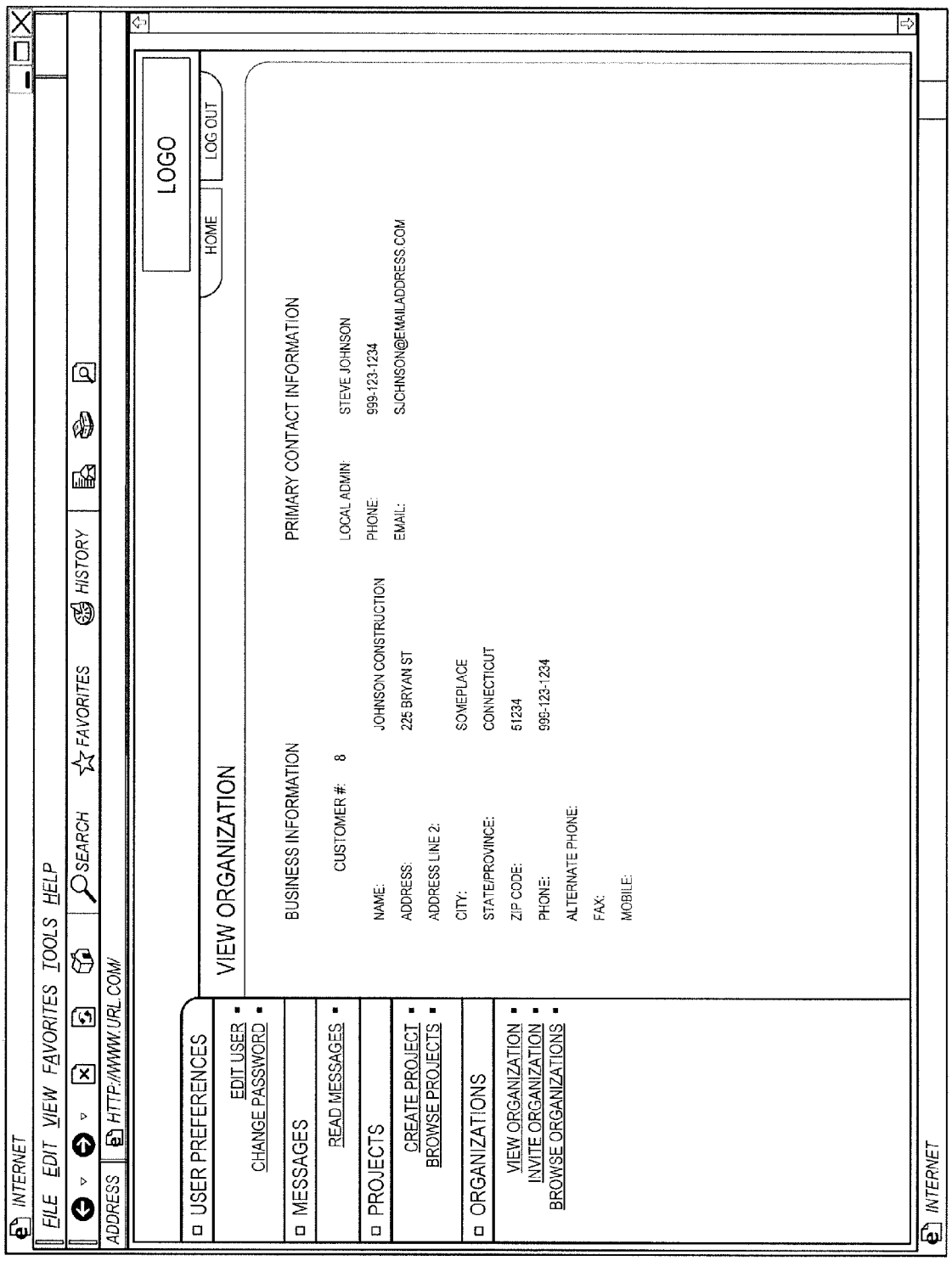
FIG. 18 is an illustration of a view organization screen.

FIG. 18 illustrates a view organization screen that can be associated with the view organization task 120. The view organization screen includes business information and primary contact information for an organization.

Figure 19:
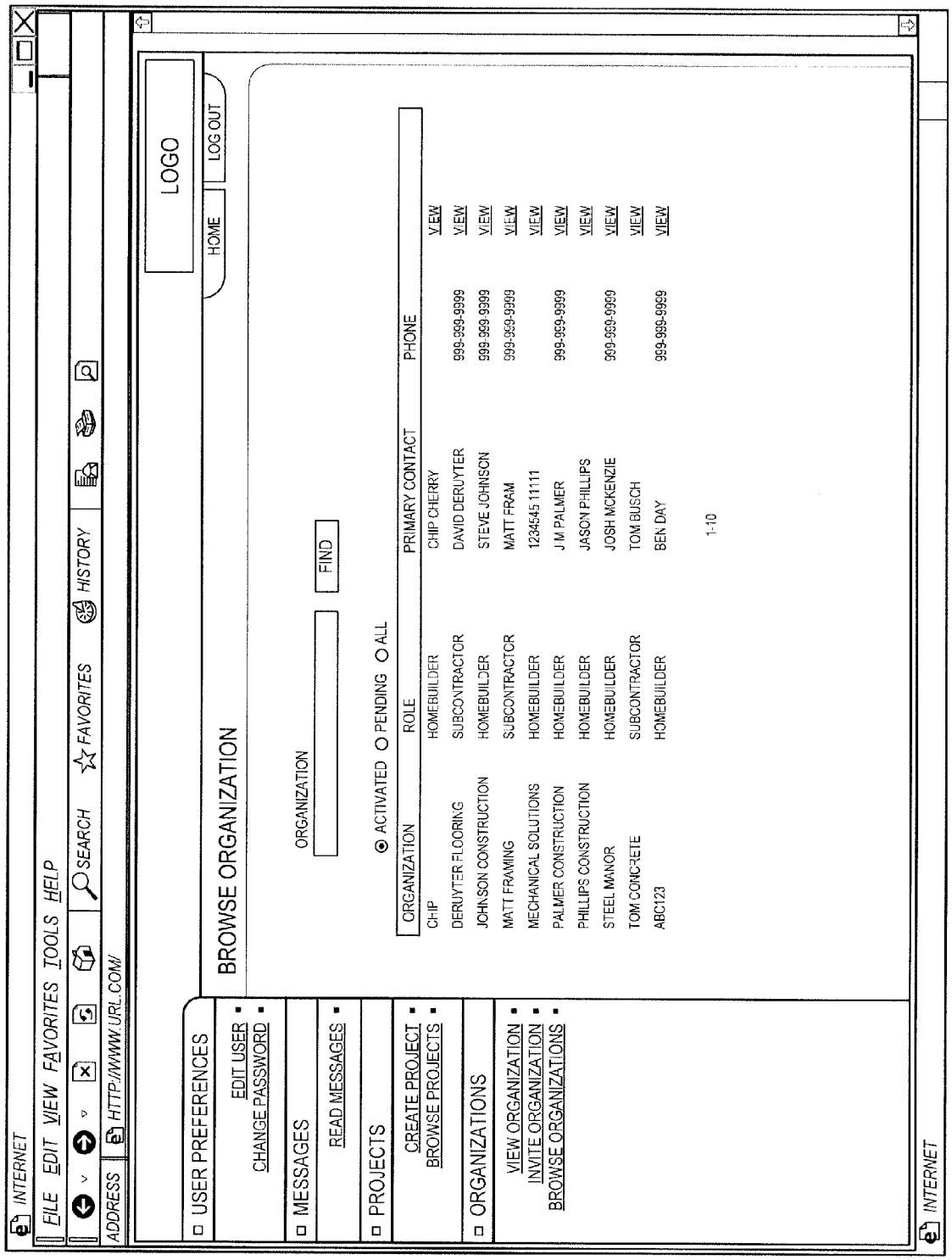
FIG. 19 is an illustration of a browse organization screen.

FIG. 19 illustrates a browse organization screen that can be associated with the browse organization task 164. The browse organization screen includes a list of participants, including the organization name, the organization role in the construction process, the primary contact, and the phone number. The browse organization screen also includes a "Find" feature and links for viewing additional information about each participant. In some embodiments, the browse organization screen can be used by a homebuilder to view its preferred subcontractors or material suppliers.

Figure 20:
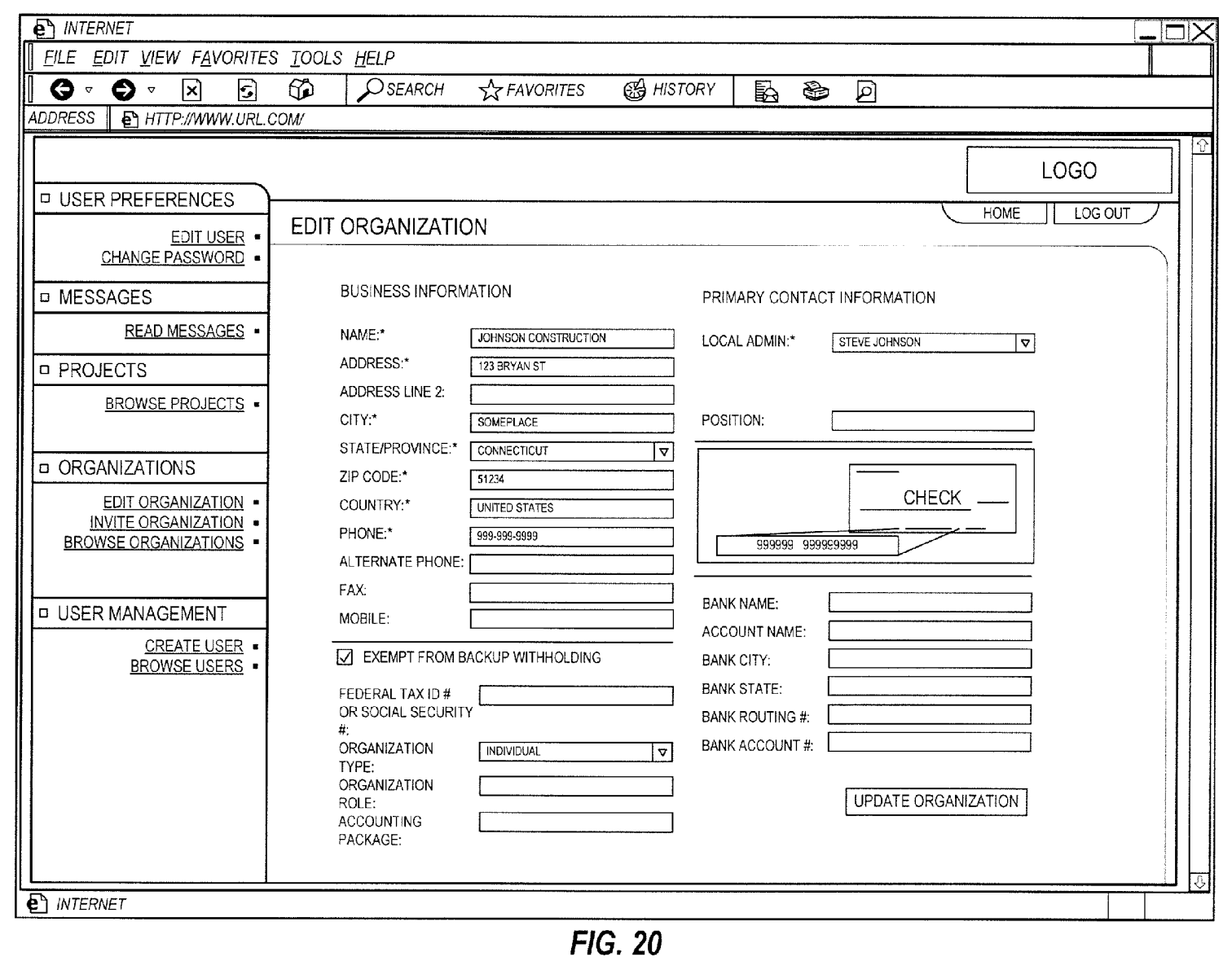

FIG. 20 illustrates an edit organization form that can be associated with the edit organization task 166. The participant can edit the existing information, such as business information, primary contact information, tax information, and banking information. In some embodiments, the first user of the organization that entered his or her information as the primary contact information is the only user given access to the edit organization form.

Figure 21:
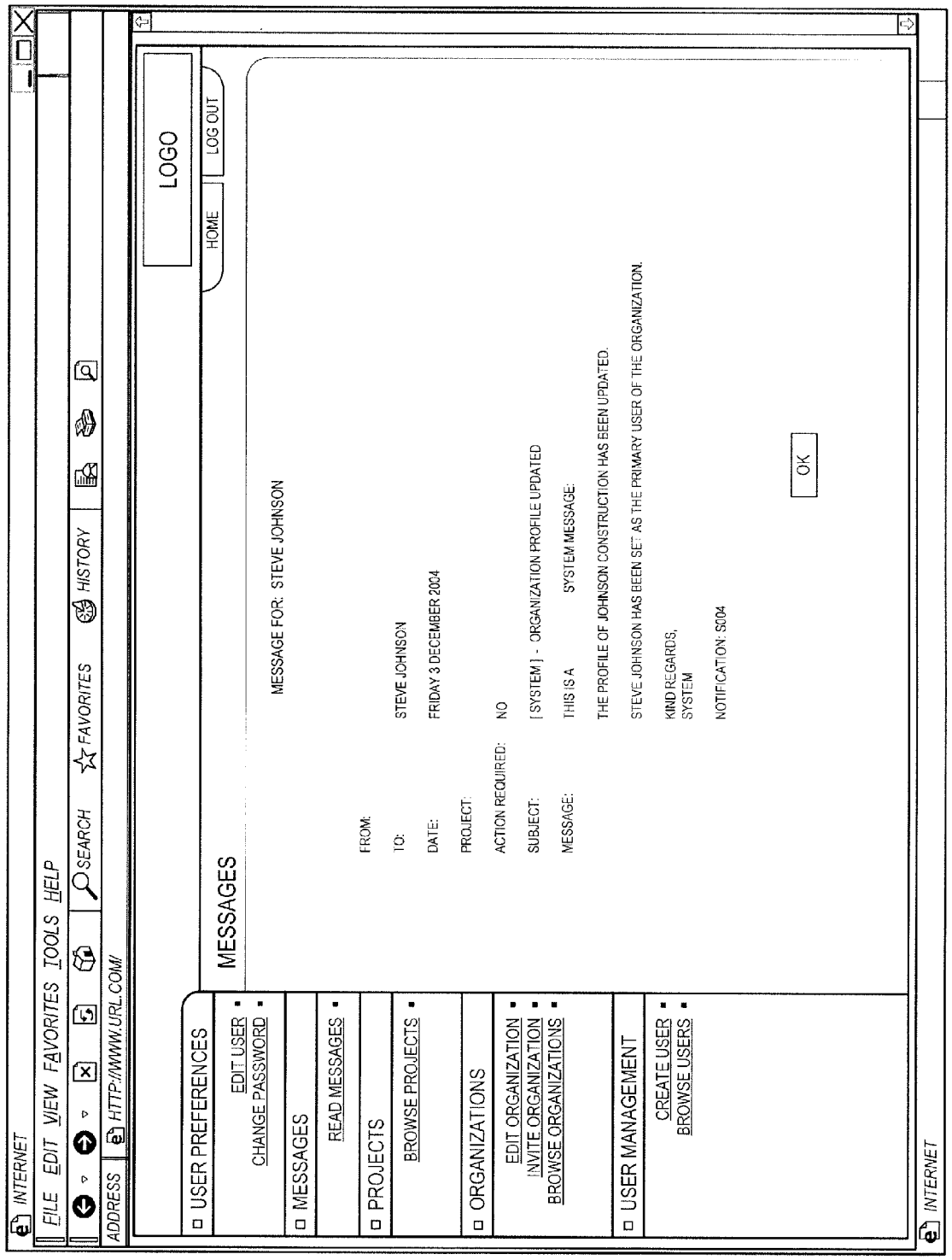
FIG. 21 is an illustration of an organization profile updated notification.

FIG. 21 illustrates an organization profile updated notification that can be transmitted during the organization updated notification task 168. The notification of FIG. 21 includes information regarding the updated profile for the participant along with a name of the primary user or administrator for the participant.

Figure 22:
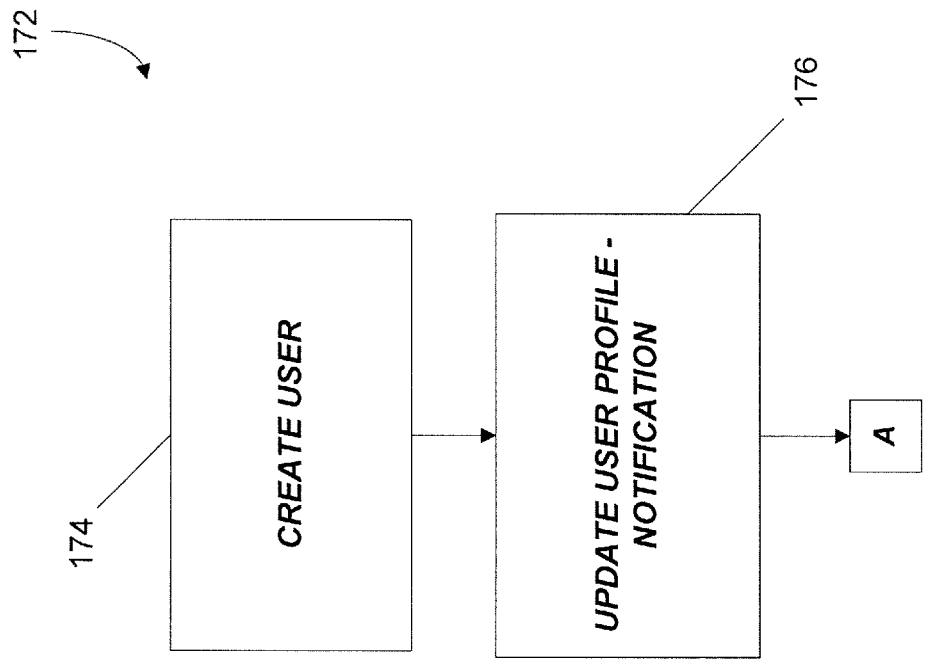
FIG. 22 is a schematic illustration of a create user process.

FIG. 22 illustrates a create user process 172, which can be included in the manage organization process 104. The create user process 172 can be used each time a new user at an existing organization is created in order to give the new user the appropriate access to the CPMS 10 (e.g., the appropriate security levels with a user identification and password). The create user process 172 can also be used to update user profiles. The create user process 172 can be performed by any of the participants 24 using the organization module 42. The create user process 172 of FIG. 22 includes a create user task 174 and an update user profile notification task 176.

Figure 23:
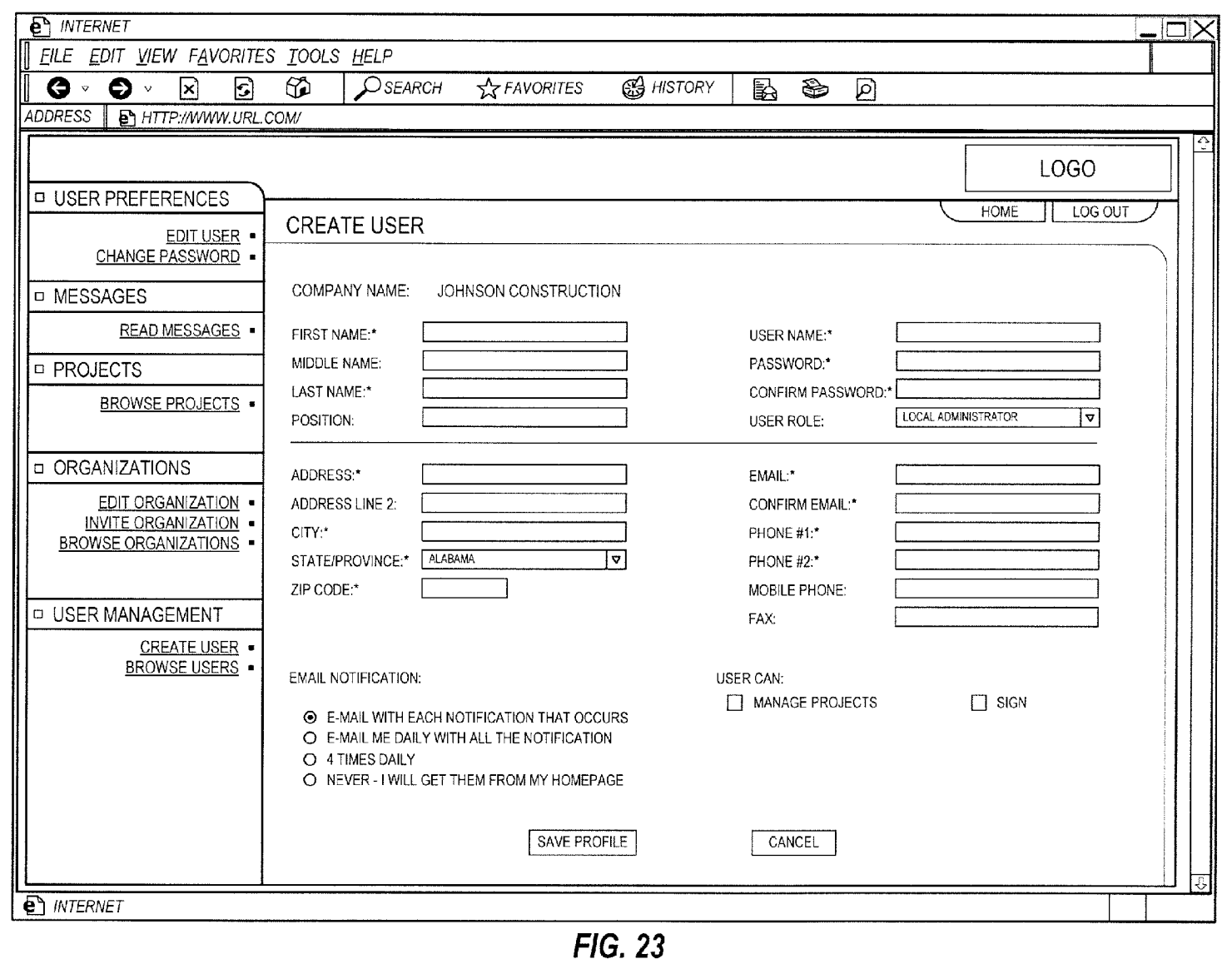

FIG. 23 illustrates a create user form that can be associated with the create user task 174. In some embodiments, the create user form can be used to add users after the primary user or administrator has already been created for the participant. The new user can enter personal information, security information (e.g., user name and password), email notification preferences, and security clearance levels (e.g., whether the user can manage projects and/or sign documents). For example, a new user can enter a user name (e.g., first and last name), a title, an email address, and a phone number.

Figure 24:
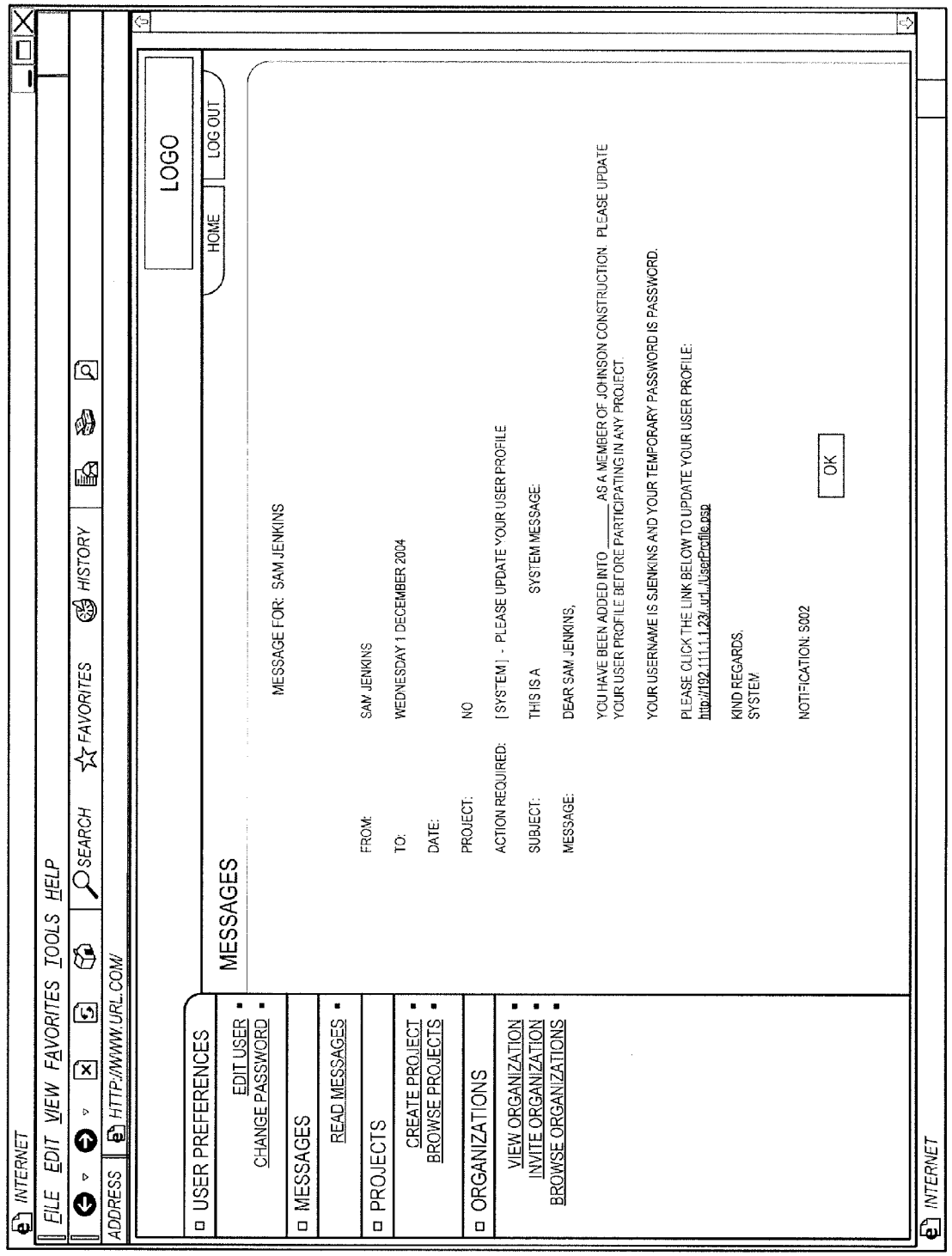
FIG. 24 is an illustration of an update user profile notification.

FIG. 24 illustrates an update user profile notification that can be transmitted during the update user profile notification task 176. The notification of FIG. 24 includes a statement that the user has been added as a member of the organization, along with the user's security information (e.g., user name and a temporary password).

Figure 25:
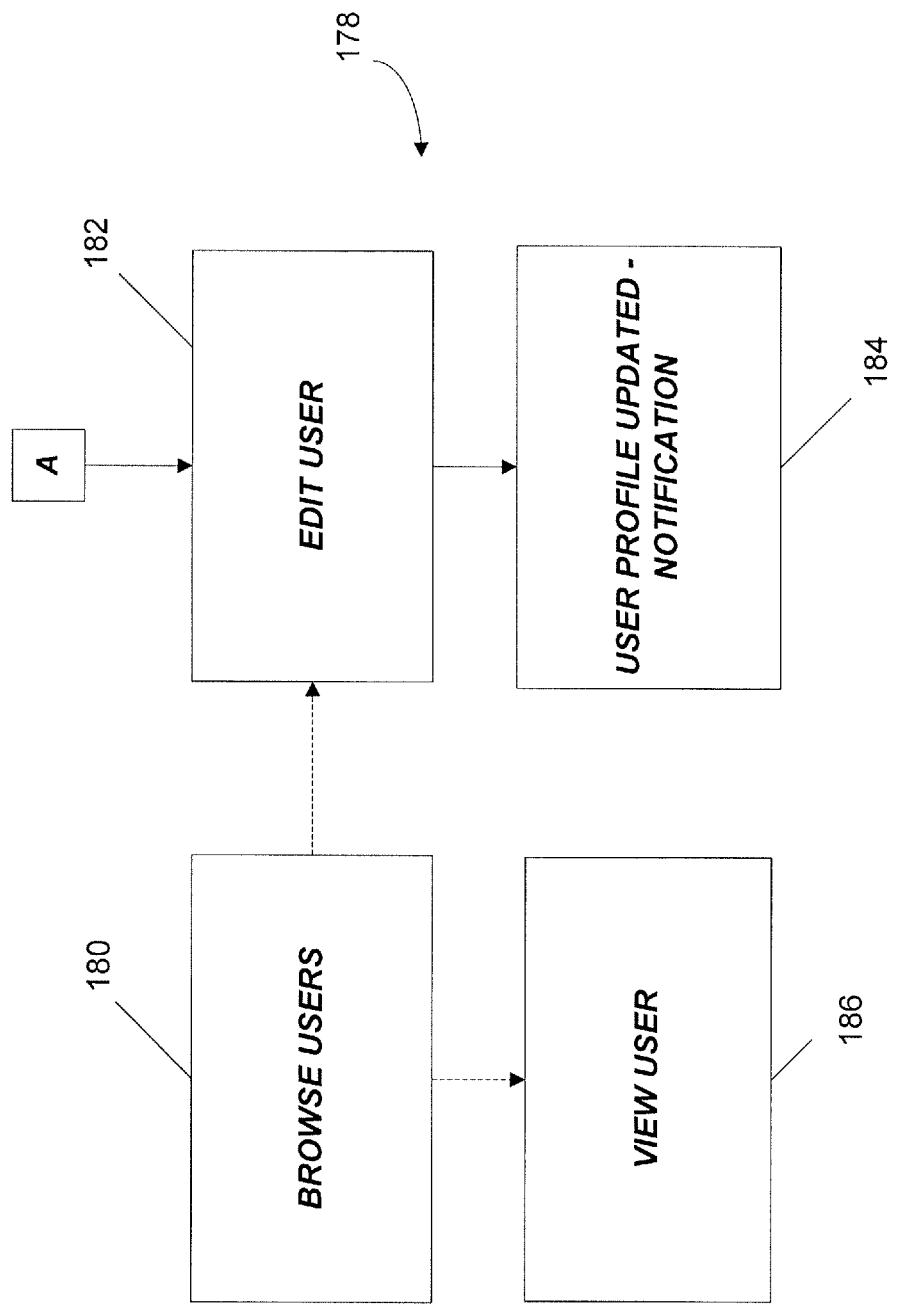
FIG. 25 is a schematic illustration of a maintain user process.

FIG. 25 illustrates a maintain user process 178, which can be included in the manage organization process 104 and can continue from FIG. 22 at A. The maintain user process 178 can be used to browse the users in each organization and to view, edit, and update the users in each organization. The maintain user process 178 can be performed by any of the participants using the organization module 42. The maintain user process 178 of FIG. 25 includes a browse users task 180, an edit user task 182, a user profile updated notification task 184, and a view user task 186.

Figure 26:
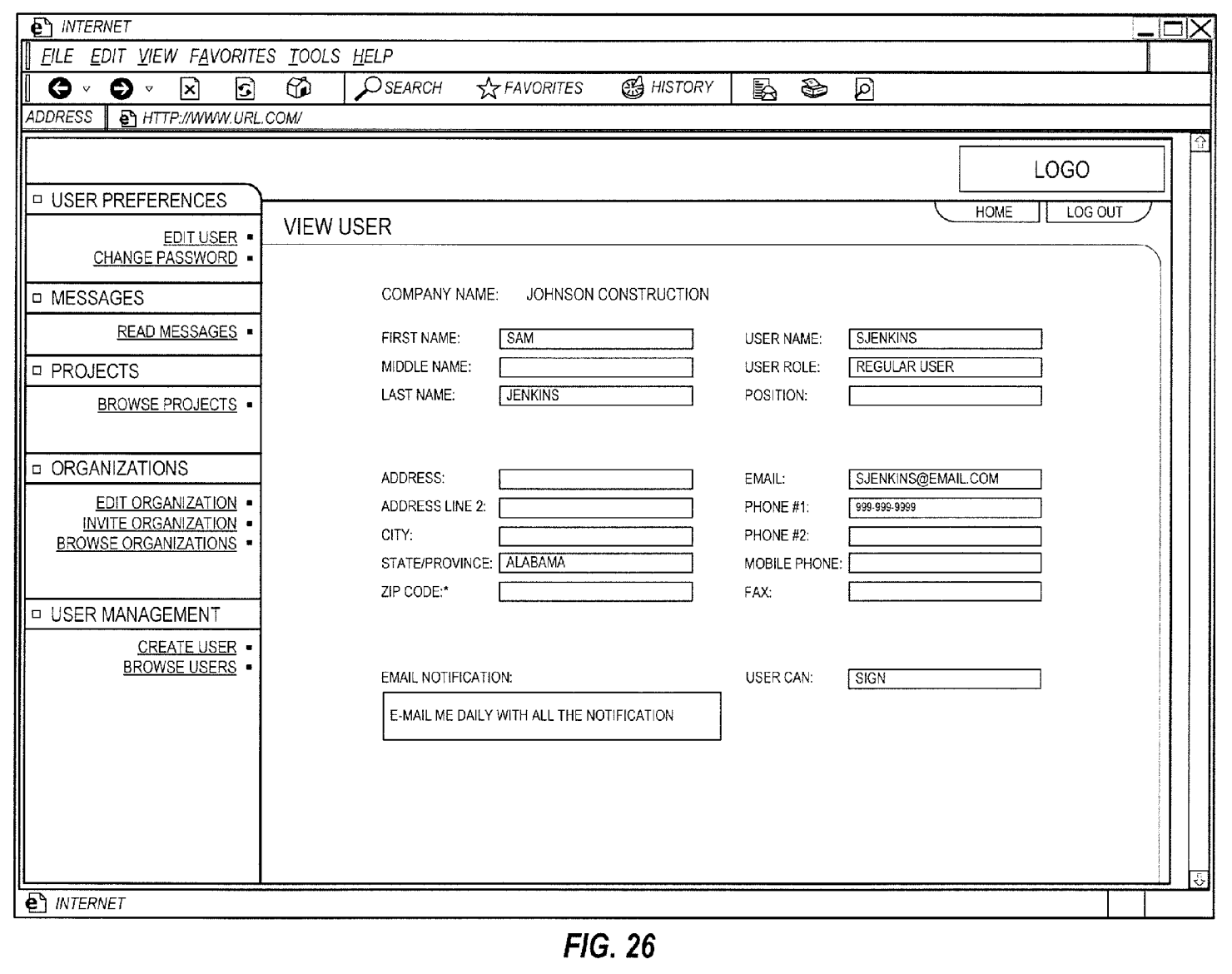

FIG. 26 illustrates a view user screen that can be associated with the view user task 186. The view user screen of FIG. 26 includes the user's personal information, email notification preference, and security clearance level.

Figure 27:
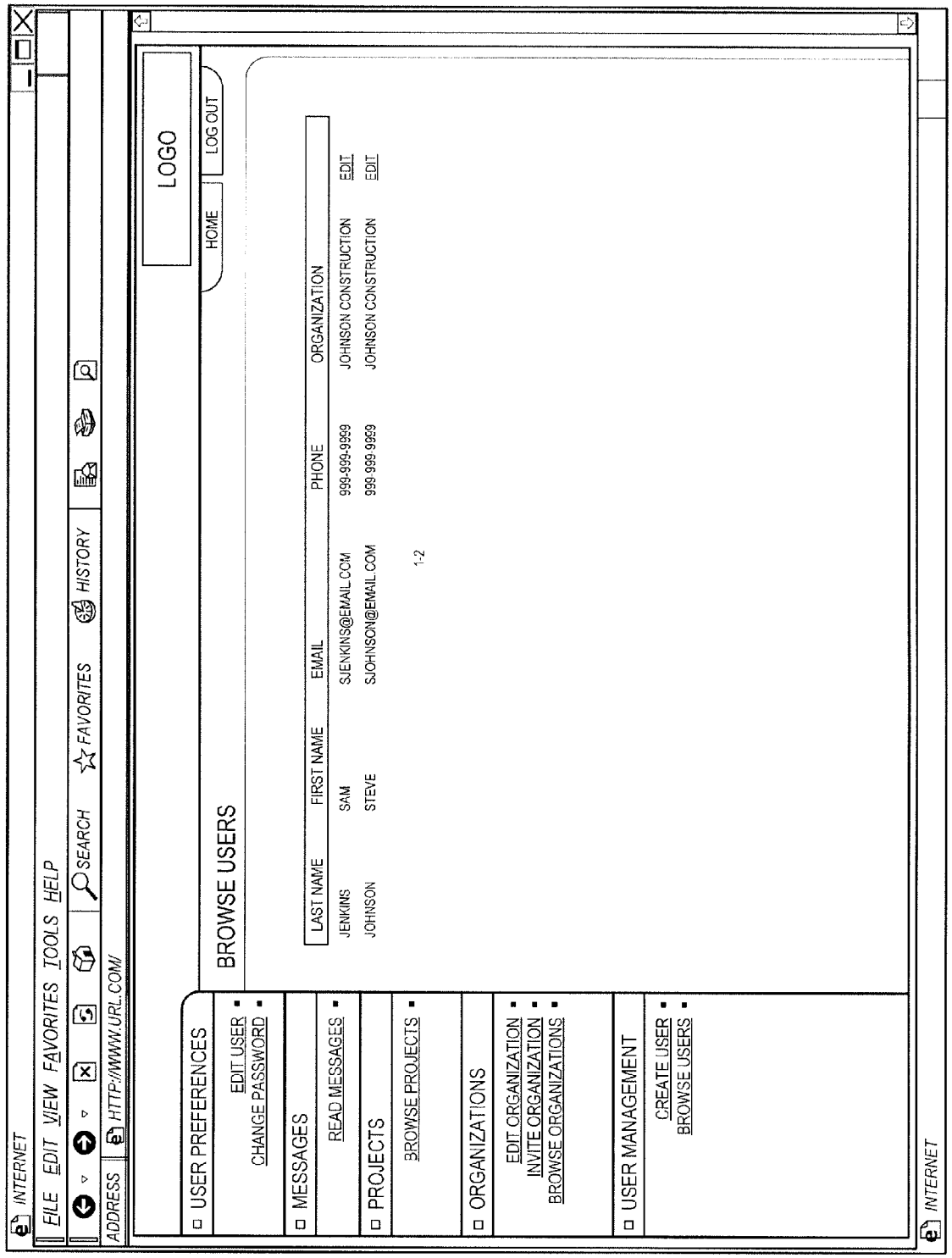
FIG. 27 is an illustration of a browse users screen.

FIG. 27 illustrates a browse users screen that can be associated with the browse users task 180. The browse users screen of FIG. 27 includes a list of one or more users for each participant, and can include the users' names, email addresses, and phone numbers. The browse users screen can also include links to edit the information for each user.

Figure 28:
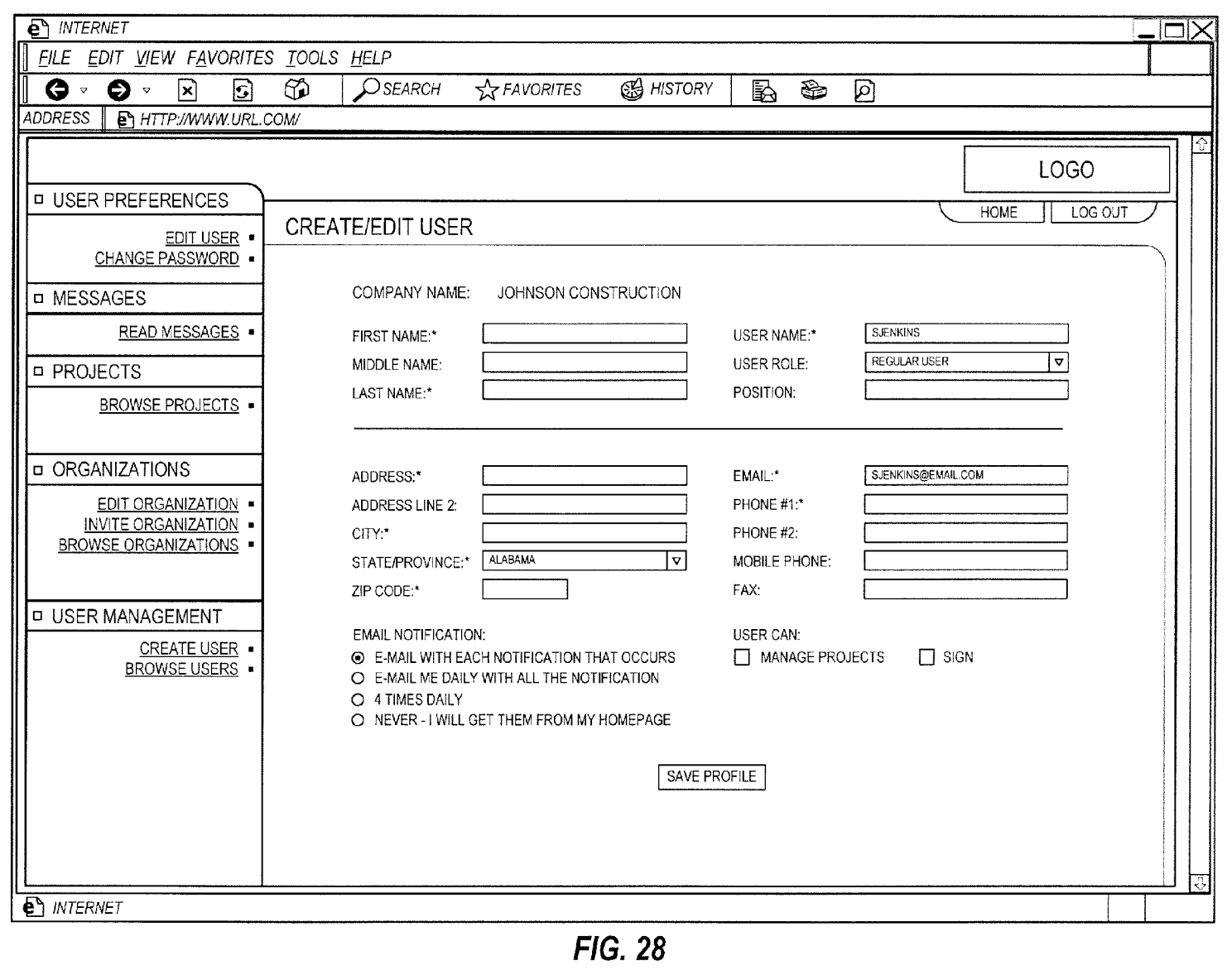

FIG. 28 illustrates an edit user form that can be associated with the edit user task 182. A user can provide personal information, email notification preferences, and security clearance levels.

Figure 29:
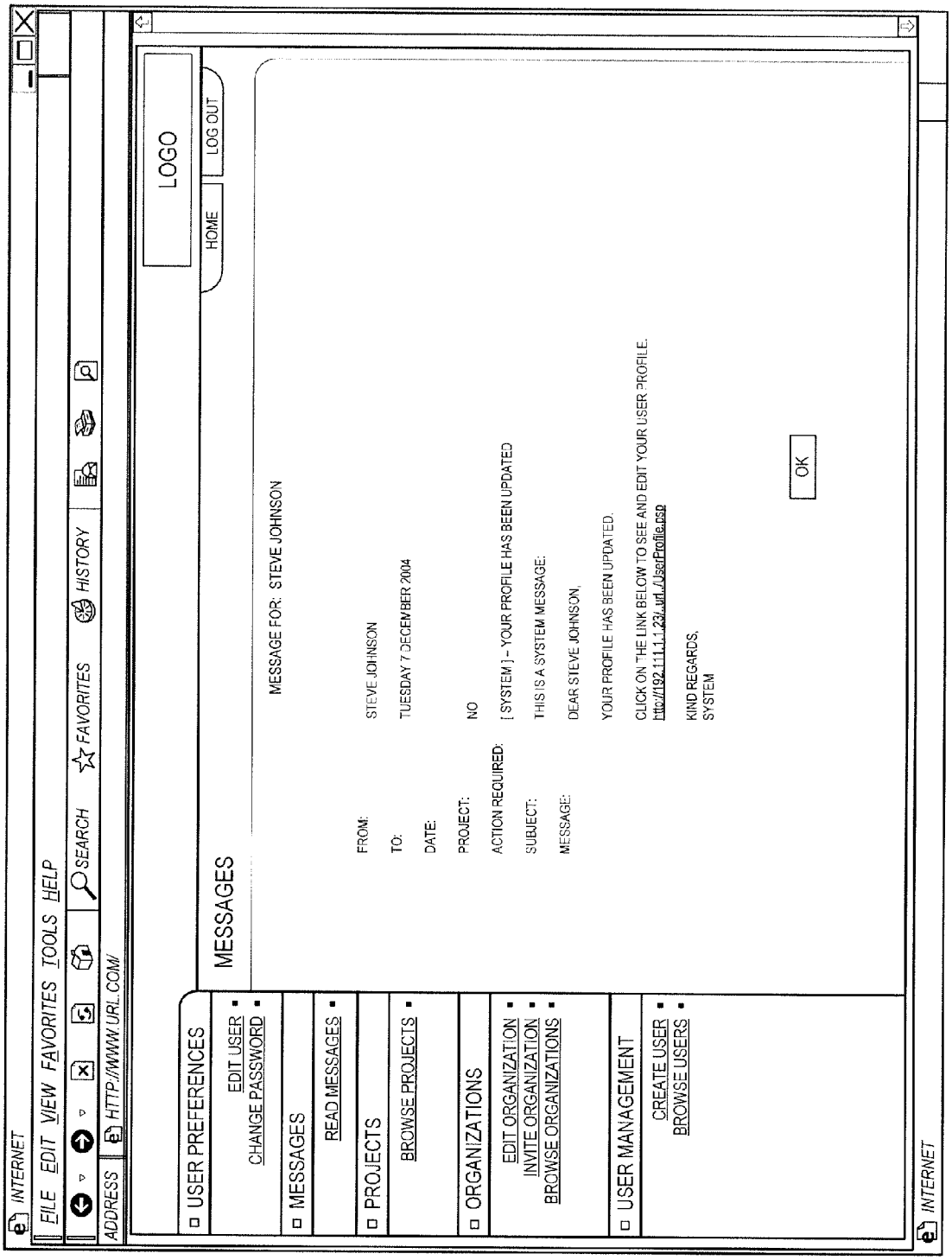
FIG. 29 is an illustration of a user profile updated notification.

FIG. 29 illustrates a user profile updated notification that can be transmitted during the user profile updated notification task 184.

Returning to FIG. 6, a first step of the manage project process 97 can include an interface project/contracts process 98. As described above with respect to FIGS. 2 and 3, the interface project/contracts process 98 can include uploading project data and/or contract data from an external system of the homebuilder to the CPMS 10 via the interface module 92. For example, the project data and contract data can be uploaded to the CPMS 10 from an ERP system of the homebuilder 74.

Figure 30:
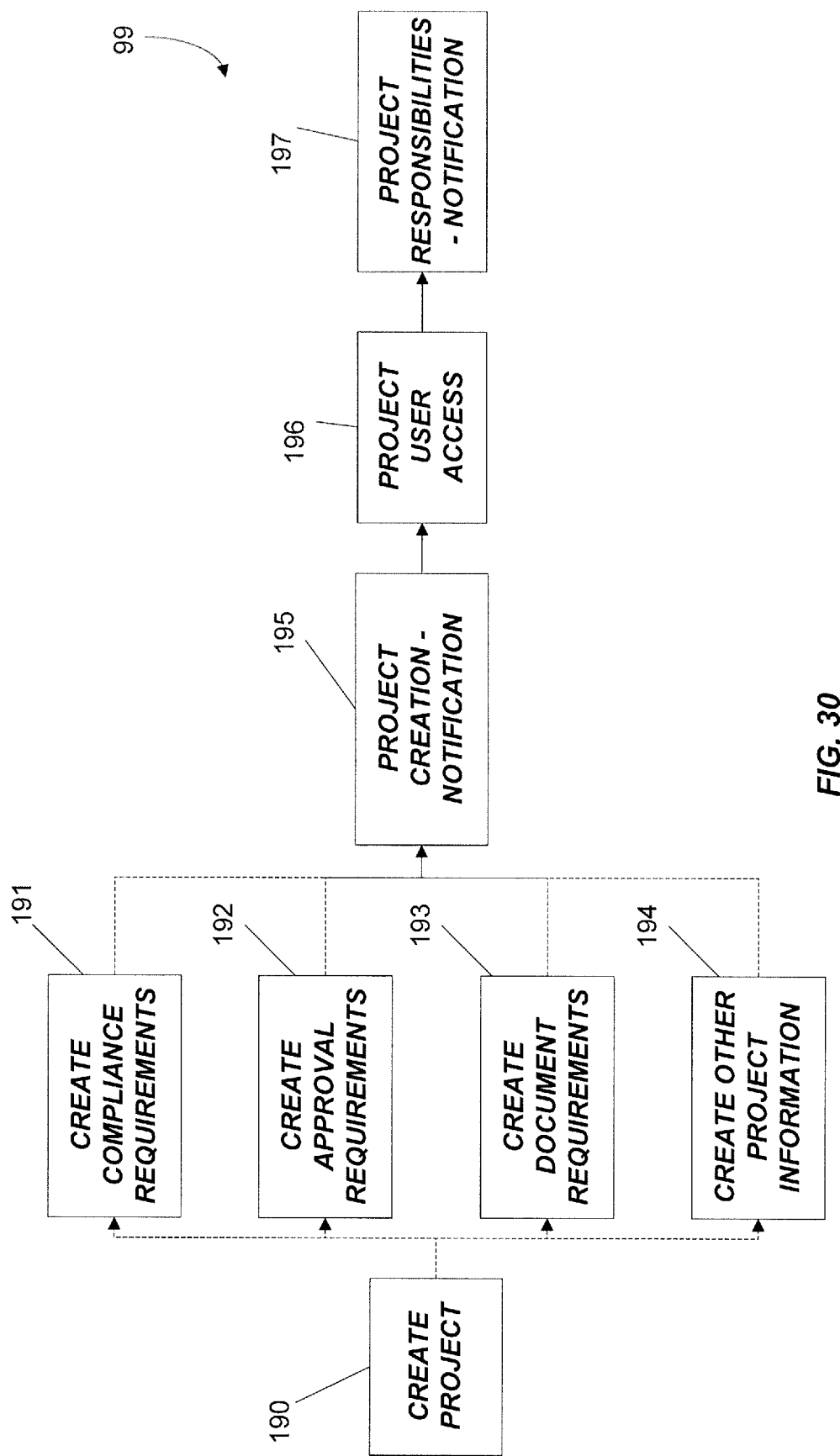
FIG. 30 is a schematic illustration of a create project process.

FIG. 30 illustrates a create project process 99, which can be included in the manage project process 97. The create project process 99 can be performed by the homebuilder 74 using the project module 28 to initiate a new project in the CPMS 10. The create project process 99 of FIG. 30 includes a create project task 190, a project creation notification task 195, a project user access task 196, and a project responsibilities task 197. In embodiments that include document compliance functionality such as described above, the create project task 190 may further include creating project compliance requirements (task 191), creating project approval requirements (task 192), creating project document requirements (task 193), and/or creating other project requirements (task 194).

In some embodiments, the CPMS 10 can initiate a new project based on project data and/or contract data uploaded to the CPMS 10 from an external system of the homebuilder 74. In other embodiments, in place of uploading data or in addition to uploading data to the CPMS 10, the homebuilder can manually enter data and/or verify data. FIGS. 31 and 32 illustrate a create project form that can be associated with the create project task 190. A homebuilder 74 can use the create project form of FIGS. 31 and 32 to provide project identification information, project funding information, project owner information, project architect information, and site information. A homebuilder 74 can also use the create project form of FIGS. 31 and 32 to verify project and/or contract information uploaded from an external system. For example, a homebuilder 74 can use the create project form of FIGS. 31 and 32 to enter and/or verify a document template for a lien waiver, a site description, a site address, a site state, a site county, a contract amount, and/or a contract date.

FIG. 33 illustrates a create compliance requirement form. A homebuilder 74 can use the create compliance requirement form to identify situations in which additional documents, information, or approvals are required before payment is effectuated. The homebuilder 74 can indicate the scope of the requirement (e.g. whether the requirement applies to a specific project, a specific vendor or subcontractor, or to all projects and payees associated with the homebuilder 74). The homebuilder 74 can identify the object type (e.g., an invoice, a check, a sworn statement, or a lien waiver) and can indicate the requirement associated with that object. The homebuilder 74 can also use this form to indicate a time period when the requirement will be in effect such as an effective date, an expiration date, or an initiating event. The homebuilder 74 can also set deadlines for satisfying the requirement.

As described above in reference to FIG. 3, the CPMS 10 can be configured to hold payment until an additional document is received. Using the create compliance requirement form of FIG. 33, a homebuilder 74 can identify the additional document and check the "Required for Payment" box. The create compliance requirement form can also be used to set a time for sending a first and second notice of the non-compliant item to the applicable party.

Also as described above in reference to FIG. 3, a homebuilder 74 can require that certain requested documents be approved before payment is effectuated. Using the create compliance requirement form of FIG. 33, the homebuilder 74 can identify the document ("Object Type") and set an approval requirement. The create compliance requirement form of FIG. 33 also allows the homebuilder 74 to set an approval workflow or identify multiple participants that must approve the document before payment is effectuated.

Figure 34:
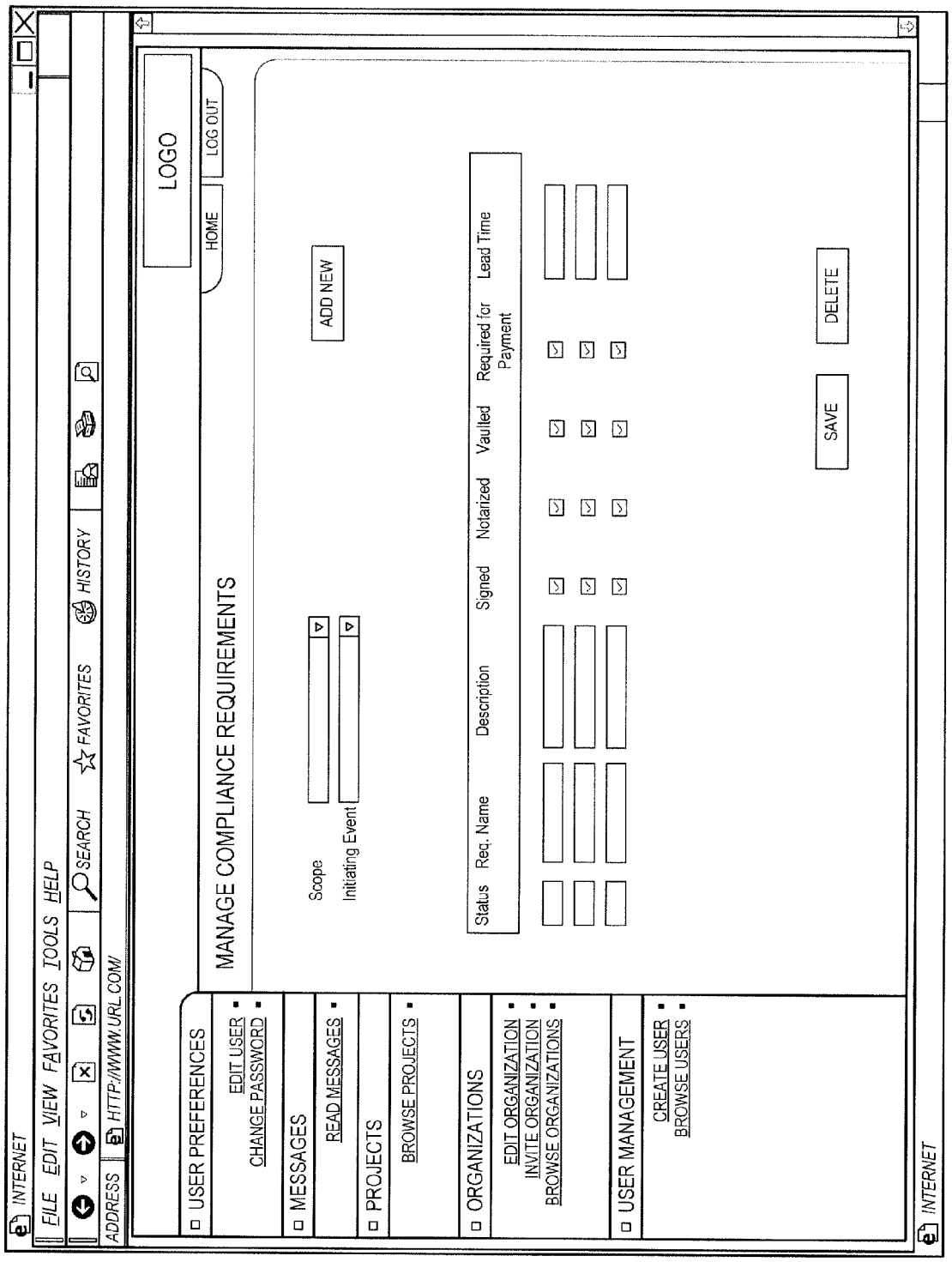
FIG. 34 is an illustration of a manage compliance requirements form.

Once created, compliance requirements can be monitored and managed through a manage compliance requirements form such as illustrated in FIG. 34. The homebuilder 74 selects the scope and/or initiating event and a list of all applicable compliance requirements is displayed. The homebuilder 74 can add, remove, or edit the requirements from this list.

Figure 35:
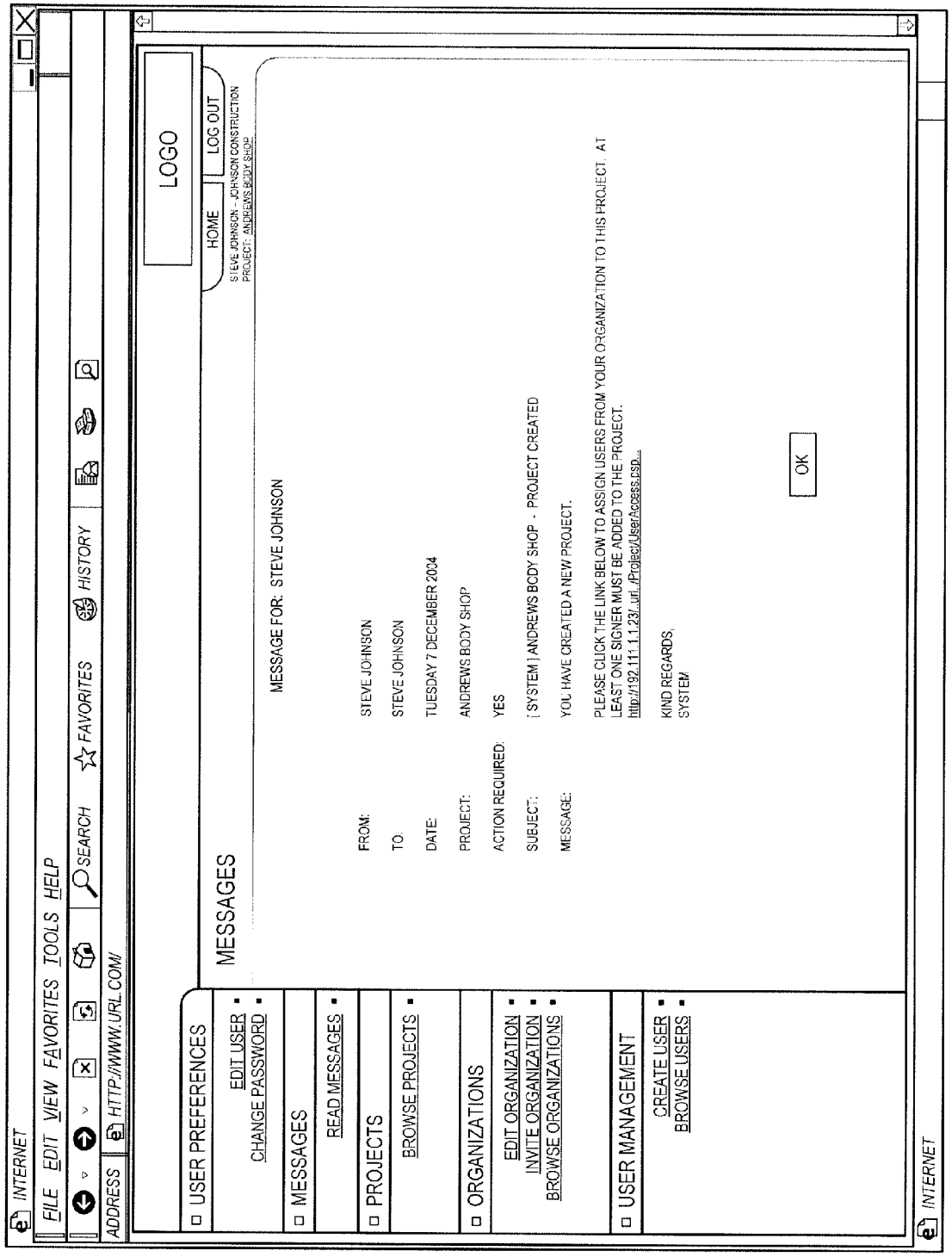
FIG. 35 is an illustration of a project created notification.

FIG. 35 illustrates a project created notification that can be transmitted during the project creation task 195 of FIG. 30. The notification of FIG. 35 includes a statement that the homebuilder 74 has created a new project, along with a link to a screen that allows users to be assigned to the project.

Figure 36:
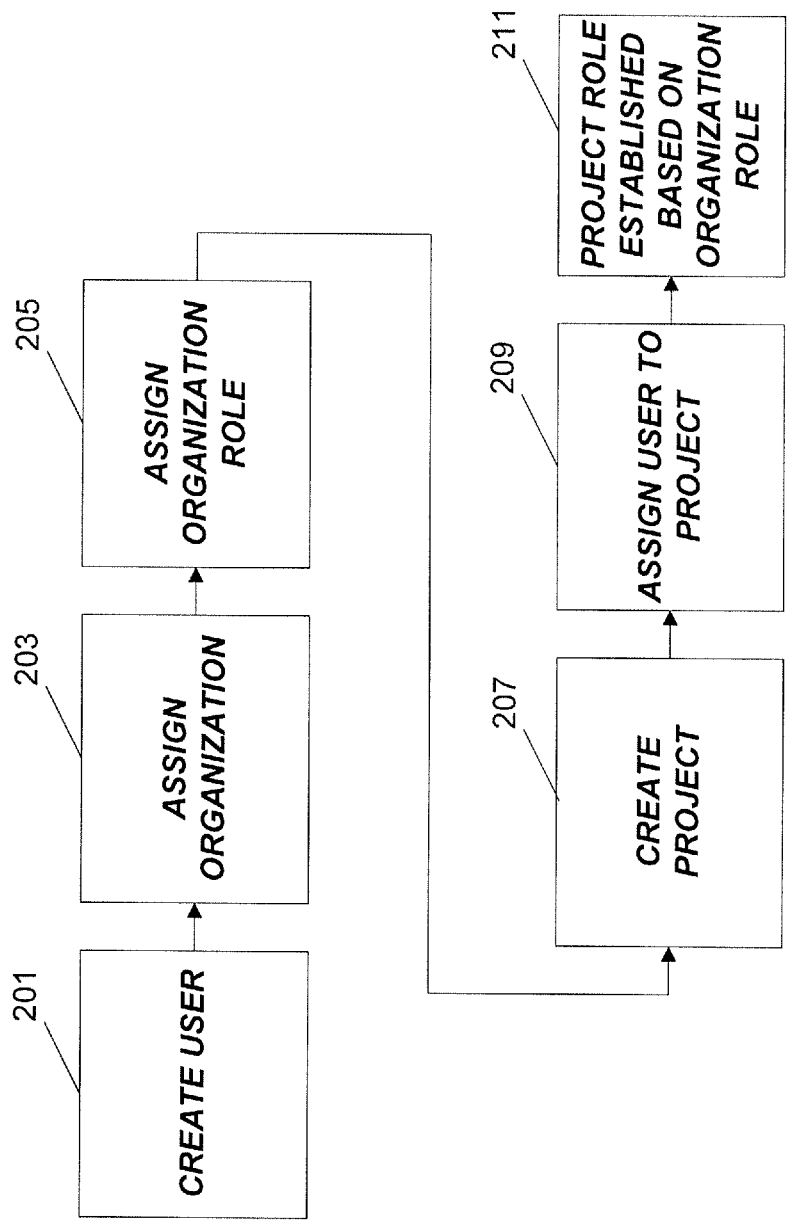
FIG. 36 is a schematic illustration of a process for assigning user roles for a project.

FIG. 36 illustrates a process for assigning user roles for a project and, in some embodiments, may overlap with the create project task 190 and the project user access task 196 from FIG. 30. When a new user is created (step 201), the user is associated with an organization (step 203) and given a role within that organization (step 205). When a new project is created (step 207) and the user is assigned to that project (step 209), the system in this example automatically associates the user's role within the organization with the role that the user will have in the project.

Figure 37:
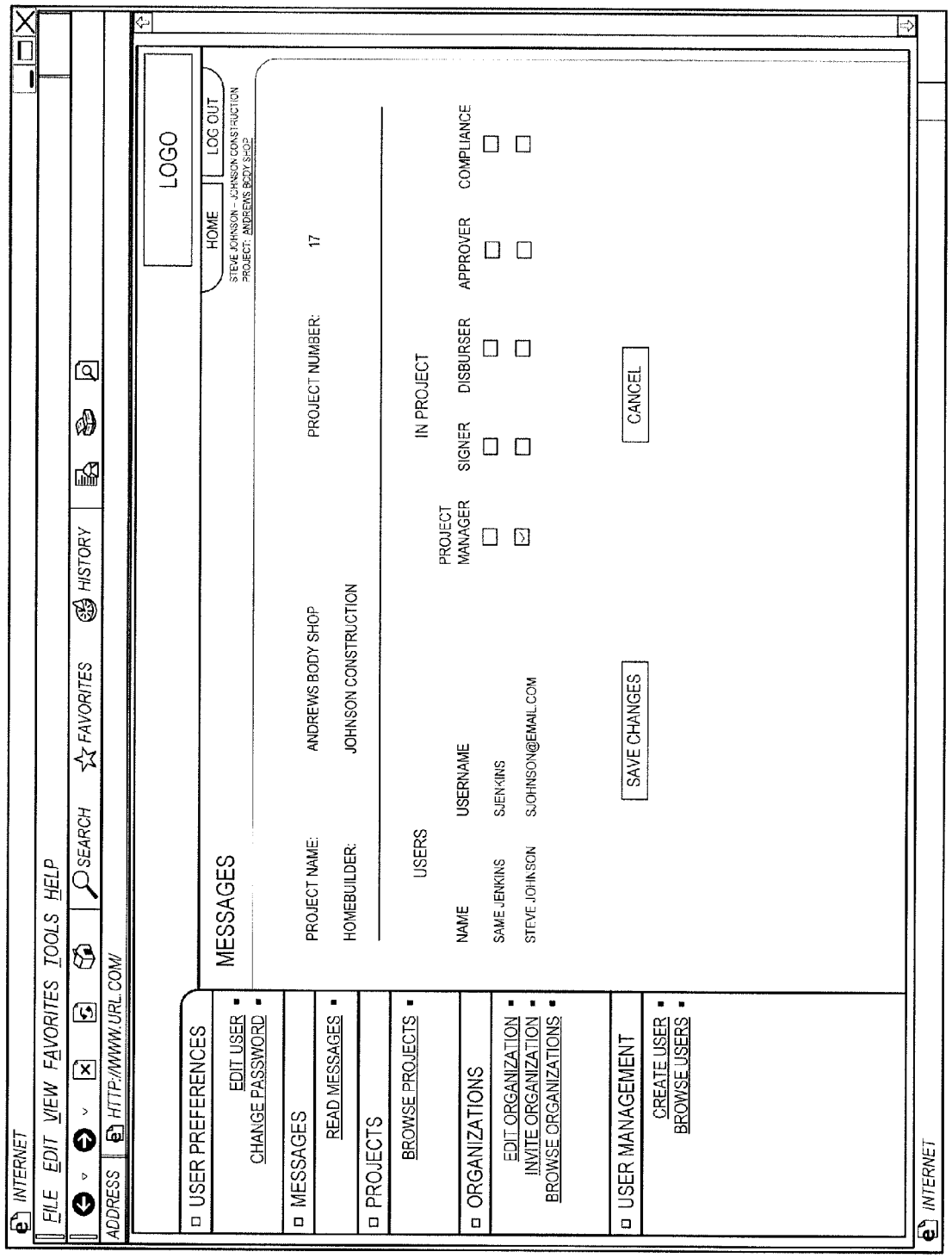
FIG. 37 is an illustration of a project user access screen.

FIG. 37 illustrates a project user access screen that can be associated with the project user access task 196. The project user access screen includes the project name, the project number, the homebuilder name, and a list of users for a particular project and/or a particular organization. The users can be identified by name and username, and, in some embodiments, can be deemed a project manager or a signer. This screen displays a list of users currently associated with a project and the respective roles currently assigned to the users. This list of users and their assigned roles can be modified from this screen. For example, if a compliance requirement is created with the create compliance requirement form of FIG. 33, "Sam Jenkins" can be assigned a "compliance" role. If a requirement is created that requires approval before a payment is effectuated, "Steve Johnson" can be given the role of "approver" for this project.

Figure 38:
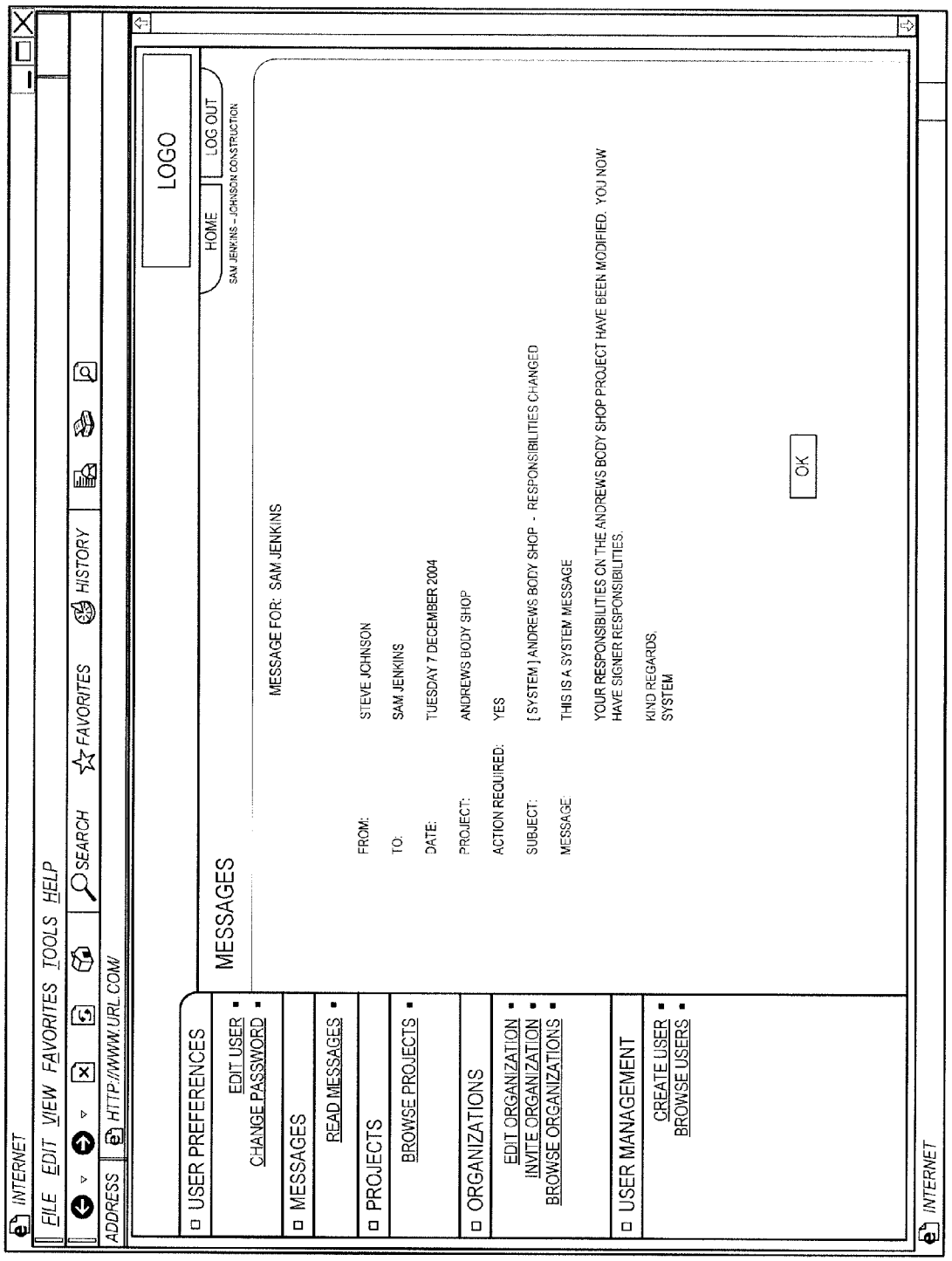
FIG. 38 is an illustration of a project responsibilities notification.

When a project role or responsibility is created or changed, a notification is sent to the appropriate user. FIG. 38 illustrates a project responsibilities notification that can be transmitted during the project responsibilities notification task 197 of FIG. 30. The notification of FIG. 38 can include a statement that a user's responsibilities with respect to a project have been modified.

Figure 39:
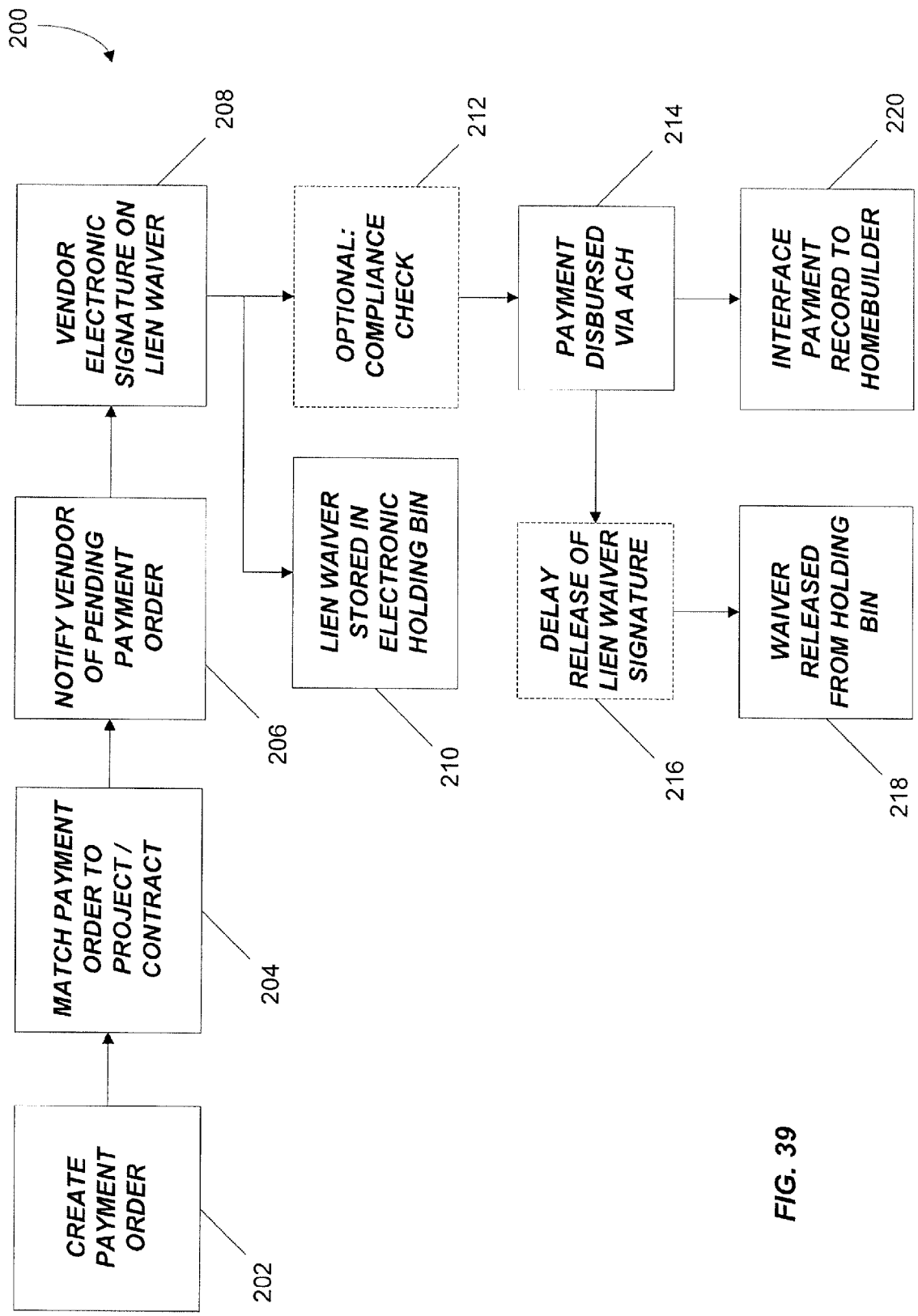
FIG. 39 is a schematic illustration of a lien waiver exchange process.

As described above with respect to FIGS. 2 and 3, a homebuilder can use the CPMS 10 to exchange payments for electronically signed lien waivers. FIG. 39 illustrates a lien waiver payment exchange process 200 that can be performed by the CPMS 10. As stated above in reference to the examples illustrated in FIGS. 2-5, although in this example builder 74 is a homebuilder, the functionality of CPMS 10 described in FIG. 39 can also be applied to builders engaged in non-residential construction. Furthermore, although this example describes an exchange between a homebuilder 74 and a vendor, the second participant can also be of another type such as a subcontractor or a materials supplier.

As shown in FIG. 39, to initiate a lien waiver payment exchange, the CPMS 10 can create a payment order (step 202) based on information specified by the homebuilder 74. As described above with respect to FIGS. 2 and 3, the homebuilder 74 can manually enter the payment information into the CPMS 10, or the payment information can be uploaded from an external system of the homebuilder 74 (e.g., an ERP system) via the interfaces module 92. Each payment order managed by the CPMS 10 includes information that links the line item with the correct project and the correct contract to be paid. The payment information associated with a payment order can include a project name/development, project owner information, a project identifier, a transaction identifier, a contract identifier, and a payment amount.

The payment orders are then stored in the CPMS 10 in the context of the project and the contract to which they relate. The CPMS 10 maintains an organization/user hierarchy independent of payment transactions. The hierarchy provides the structure for storing payments as well as the user/permission structure that determines who the authorized person from any given organization is for signing and/or notarizing purposes and that controls access to information managed by the CPMS 10. The project/contract data structures can also specify the information required to complete the correct lien waiver form for a particular vendor 93.

As shown in FIG. 39, once the payment order information is received by the CPMS 10, the CPMS 10 matches the payment order to a project and/or contract using the project and contract information previously obtained from the homebuilder 74 (e.g., manually from the homebuilder 74 or uploaded from an external system of the homebuilder 74) (step 204). The vendor 93 is then notified (e.g., via the notifications manager 40) to sign either a partial or a final lien waiver via an electronic signature engine of the CPMS 10 (step 206). The CPMS 10 generates the needed lien waiver and the vendor 93 electronically signs the lien waiver (step 208). In some embodiments, the CPMS 10 can generate the needed documents based on a lien waiver template specified by the homebuilder 74 (e.g., manually and/or uploaded from an external system). Once the vendor 93 signs the lien waiver, the CPMS 10 stores the signed lien waiver in the electronic holding bin/escrow 68 (step 210).

As described above with respect to FIG. 3, in some embodiments, the CPMS 10 can optionally include a document management module 88 and a compliance management module 90 that allows the CPMS 10 to provide compliance management. For example, when the CPMS 10 includes a document management module 88 and a compliance management module 90 (or includes an activated or "turned-on" document management module 88 and compliance management module 90), the CPMS 10 can obtain document requirements from the homebuilder 74. The document requirements can include a list of documents the homebuilder 74 requires from the vendors 93, deadlines for receiving the requested documents, actions to be taken if the requested documents are not received from a particular vendor 93, etc. In some embodiments, the document or compliance requirements also specify templates or specifications for the requested documents. The CPMS 10 can use the templates or specifications to generate the requested documents. As described above, the document or compliance requirements can be set at an organization level and/or a project level. In some embodiments, the homebuilder 74 can directly enter the document requirements into the CPMS 10. In other embodiments, the homebuilder 74 can load document requirements to the CPMS 10 via an external system (e.g., an ERP system) using the interfaces module 92 of the CPMS 10. After the homebuilder 74 provides document requirements to the CPMS 10, the vendor 93 can upload requested documents to the CPMS 10 for approval by the homebuilder 74.

After the homebuilder 74 provides document requirements and payment orders or data to the CPMS 10, the CPMS 10 can prompt the vendors 93 to enter (sign, notarize, submit, etc.) any missing compliance documents that are required before a vendor can receive a payment in addition to prompting the vendor 93 to sign a lien waiver. In some embodiments, the CPMS 10 can generate the compliance documents (e.g., based on the templates and/or specifications specified by the homebuilder 74) and can present the generated documents to the vendor 93 for approval and/or signature.

Therefore, as shown in FIG. 39, if the CPMS 10 provides compliance management, the CPMS 10 can perform a compliance check prior to initiating payment to a vendor 93 (step 212). As described above with respect to FIG. 3, if a vendor 93 is noncompliant with the required documents and the homebuilder 74 has selected to hold payments when a vendor 93 is deemed noncompliant, the CPMS 10 can hold a payment to the vendor (e.g., even if the vendor 93 signs the requested lien waiver).

Once the lien waiver is signed and stored (steps 208 and 210) and the vendor's compliance with the document requirements or other requirements is verified (step 212), the signed lien waiver is queued for payment (step 214). In some embodiments, the CPMS 10 automatically disburses funds to the vendor 93 via ACH or another payment network. After the payment is queued and/or initiated, the CPMS 10 allows the homebuilder 74 to view the signed lien waiver. However, in some embodiments as described above, the CPMS prevents the homebuilder 74 from viewing the signature on the lien waiver until receipt of the payment to the vendor is confirmed by the ACH or other payment network (step 216).

After receipt of the payment has been confirmed, the CPMS 10 releases the signed lien waiver from the electronic holding bin 68 (step 218). In some embodiments, the CPMS 10 also sends a receipt of payment (via email or the CPMS 10, such as the notifications manager 40) to the vendor 93. In addition, the CPMS 10 sends the homebuilder 74 a payment record (step 220). In some embodiments, the CPMS 10 transmits the payment record to an external system of the homebuilder 74 (e.g., an ERP system) through the interfaces module 92.

Although the example of FIG. 39 is related to a homebuilder receiving a signed lien waiver from a vendor, the participants and documents can vary. For example, the payer may be a property owner or a non-residential builder and the payee can be a subcontractor or materials supplier. Similarly, the payment distribution of step 214 may be initiated through an automated clearing house (ACH) as shown in FIG. 39 or through some other form of payment. Furthermore, the steps may be added, removed, or arranged in a different order than as shown in FIG. 39. For example, the compliance check at step 212 may be removed in some systems or optional in some projects. Similarly, some systems may release the signed document (step 218) immediately after payment is initiated (step 214); thereby eliminating the delay of step 216.

As described above with respect to FIG. 2, the CPMS 10 can be configured to support a "specified billing" environment in place of or in addition to being configured to support a "specified payment" environment, as shown in FIG. 39. For example, instead of the homebuilder 74 specifying a payment for a vendor 93, as shown in FIG. 39, the homebuilder 74 can use the CPMS 10 to generate an invoice for a vendor 93 that includes a requested payment amount. The vendor 93 can view and approve or decline the invoice via the CPMS 10, but cannot modify the invoice. Once the vendor 93 approves the invoice, the CPMS 10 can prompt the vendor 93 to sign a lien waiver in order to initiate the approved payment. Once the vendor 93 signs the lien waiver (and, optionally, is compliant with the document requirements specified by the homebuilder 74), the CPMS 10 initiates the payment to the vendor 93, as shown in FIG. 39.

In addition, the CPMS 10 can be configured to support an invoicing environment, wherein a vendor 93 uses the CPMS 10 to create an invoice and submit the invoice to the homebuilder 74 for approval. Once the homebuilder 74 approves the invoice, the CPMS 10 prompts the vendor 93 to sign a lien waiver in order to initiate the approved payment. Once the vendor 93 signs the lien waiver (and, optionally, is compliant with the document requirements specified by the homebuilder 74), the CPMS 10 initiates the payment to the vendor 93, as shown in FIG. 39.

It should be understood that in some embodiments a residential construction project may include multiple properties (e.g., lots in a single subdivision). When a construction project includes multiple properties, the CPMS 10 can initiate a single payment to a particular vendor 93 wherein a single payment covers multiple properties or can initiate separate payments for each property. Similarly, the CPMS 10 can generate one lien waiver for a particular vendor that is associated with multiple properties (e.g., lien waiver by subdivision) or can generate separate lien waivers for each property (e.g., lien waiver by lot).

It should also be understood that the CPMS 10 can create a project that includes multiple properties. Therefore, when a vendor 93 registers with the CPMS 10 and/or the project, the vendor 93 is automatically registered and available to be associated with each property included in the project. In some embodiments, once a vendor 93 is registered with the CPMS 10, the homebuilder 74 can use the CPMS 10 to assign particular vendors 93 to particular projects.

In some embodiments, the CPMS 10 can also manage budgets or schedules of values associated with a particular project, property, vendor 93, etc. For example, a homebuilder 74 (and/or a vendor 93) can input a budget using the CPMS 10. The homebuilder 74 can manually enter budget information into the CPMS 10 or the CPMS 10 can obtain budget information from an external system of the homebuilder 74 via the interfaces module 92. Once the CPMS 10 receives budget information, it can use the budget information to generate documents (e.g., invoices, lien waivers, etc.), verify payment amounts, etc. For example, as described above with respect to FIG. 2, in some embodiments, a vendor 93 can use the CPMS 10 to generate and submit an invoice. To generate an invoice, the vendor 93 can specify a payment amount or a percent complete. If the vendor 93 specifies a percent complete, the CPMS 10 can automatically generate an invoice by calculating a payment based on a budget amount and the specified percent complete. The CPMS 10 can also verify a payment amount specified by a homebuilder 74 against a budget amount. Change orders to the budget can also be provided to (e.g., manually and/or uploaded from an external system via the interfaces module 92) and managed through (e.g., approved) the CPMS 10. In some embodiments, the CPMS 10 can also allow an inspector to input inspection information, such as percent complete information, which the CPMS 10 can use to generate and/or verify invoices, lien waivers, payment amounts, etc.

It should be understood by one of ordinary skill in the art that constructions and methods described above are illustrative and not limiting. Other configurations, designs, and uses are possible. For example, various embodiments of the CPMS might be applied to a "homebuilder" engaged in residential construction or a builder engaged in non-residential construction. Furthermore, the payer may not be the builder, but rather, for example, a bank or property owner. In such cases, builder 74 could be a payee. Various payees may also include, for example, vendors, material suppliers, and subcontractors. Also, although the above examples describe a lien waiver exchange, it may be possible to apply this methodology to other types of documents. Various features and advantages of the invention are set forth in the following claims.

The invention claimed is:

1. A computer-implemented method of effectuating a payment related to a construction project using a construction payment management system including a computer readable memory storing a plurality of modules executed by an application server, wherein the plurality of modules can be selectively activated for the construction project, the method comprising:
creating, by the application server, a project record associated with the construction project on a computer readable medium;
creating, by the application server, a payee user record for a payee on the computer readable medium and associating the payee user record with the project record, the payee user record having a status;
creating, by the application server, a list of required documents on the computer readable medium in response to input from a payer through a first device communicating with the application server over at least one network and associating the list of required document with at least one of the project record and the payee user record, the list of required documents including one or more documents that must be provided by the payee for the construction project;
providing, by the application server, a user interface including a selection mechanism;
receiving, by the application server, a compliance module setting through the selection mechanism;
assigning, by the application server, the compliance module setting to at least one of the project record and the payee user record, the compliance module setting indicating
whether a compliance module is activated for the construction project and
whether a hold payment mode of the compliance module is activated for the construction project;
storing, by the application server, at least one electronic document submitted by the payee on the computer readable medium, wherein the at least one electronic document is included in the list of required documents and wherein the payee submits the at least one electronic document through a second device communicating with the application server over at least one communication network;
allowing, by the application server, the payer to access the stored at least one electronic document through the first device;
automatically monitoring, by the application server, the stored at least one electronic document and comparing the stored at least one electric document to the list of required documents;
automatically assigning, by the application server, the status of the payee user record to noncompliant when the stored at least one electronic document does not include each document included in the list of required documents;
automatically assigning, by the application server, the status of the payee user record to compliant when the stored at least one electronic document includes each document included in the list of required documents;

receiving, by the application server, a request for the payment to the payee;

in response to receiving the request for the payment, automatically generating, by the application server, an unsigned lien waiver document and automatically transmitting, by the application server, the unsigned lien waiver document to the payee through the second device;

receiving, by the application server, an electronic signature for the unsigned lien waiver from the payee through the second device, automatically creating an electronically-signed version of the unsigned lien waiver document, and automatically storing the electronically-signed version of the unsigned lien waiver document to an electronic holding bin;

after receiving the electronic signature, automatically determining, by the application server, the stored compliance module setting and the status of the payee user record;

upon determining that the compliance module setting indicates that the compliance module is not activated for the construction project, automatically initiating, by the application server, the payment to the payee;

upon determining that the compliance module setting indicates that the compliance module is activated for the construction project and that the hold payment mode of the compliance module is not activated for the construction project, automatically initiating, by the application server, the payment to the payee;

upon determining that the compliance module setting indicates that the compliance module is activated for the construction project, that the hold payment mode of the compliance module is activated for the construction project, and that the status of the payee user record is compliant, automatically initiating, by the application server, the payment to the payee;

upon determining that the compliance module setting indicates that the compliance module is activated for the construction project, that the hold payment mode of the compliance module is activated for the construction project, and that the status of the payee user record is noncompliant, automatically holding, by the application server, the payment to the payee; and after holding the payment, automatically initiating, by the application server, the payment after automatically monitoring, by the application server, the stored at least one electronic document and comparing the stored at least one electric document to the list of required documents, and automatically assigning, by the application server, the status of the payee user record to compliant when the stored at least one electronic document includes each document included in the list of required documents.

2. The method according to claim 1 further comprising creating a payment order prior to transmitting the unsigned lien waiver document.

3. The method according to claim 2, wherein the act of receiving the request for the payment includes receiving the request for the payment from the payee, and further comprising:

displaying the request for the payment to the payer; and
receiving an approval from the payer of the request for the payment, wherein the act of creating a payment order is performed in response to receiving the approval of the request for the payment.

4. The method according to claim 1 further comprising releasing the signed lien waiver document to the payer only after the payment has been initiated.

5. The method according to claim 1 wherein the list of required documents includes at least one previously requested electronically signed document other than the signed lien waiver document.

6. The method according to claim 1 wherein receiving the request for the payment includes receiving, by the construction payment management system, an electronic invoice from the payee for work performed by the payee on the construction project.

7. The method according to claim 1 wherein the act of initiating the payment includes electronically communicating, by the construction payment management system, with an automated clearing house.

8. The method according to claim 1 wherein the act of initiating the payment includes automatically effectuating, by the construction payment management system, an electronic funds transfer.

9. The method according to claim 1 wherein the act of initiating the payment includes printing, by the construction payment management system, a check to be delivered to the payee.

10. The method according to claim 1 further comprising generating an electronic receipt document and transmitting the electronic receipt document to the payee.

11. The method according to claim 1 further comprising generating an electronic payment record and transmitting the electronic payment record to the payer.

12. The method according to claim 1 wherein the act of initiating the payment includes initiating the payment to the payee from a general contractor.

13. The method according to claim 1 wherein the payee is a subcontractor or a vendor of building materials.

14. The method of claim 1 further comprising:

displaying, by the construction payment management system, the unsigned lien waiver document to the payer at any time after the electronic signature has been submitted by the payee; and displaying, by the construction payment management system, the electronically-signed version of the unsigned lien waiver document to the payer only after the payment is initiated to the payee.

15. The method of claim 1 further comprising receiving a plurality of module settings for the plurality of modules stored to the computer readable memory, each module setting indicating whether a respective module is activated for the construction project.

16. The method of claim 1, wherein assigning the compliance module setting includes assigning the compliance module setting to all construction projects managed by the construction payment management system and associated with the first user.

17. The method of claim 1, wherein receiving the compliance module setting includes receiving the compliance module setting through the selection mechanism from a project manager for the construction project, wherein the project manager is one selected from a group consisting of a project architect, a project owner, and a general contractor.

18. The method of claim 1 further comprising displaying the list of required documents to the payee on a graphical user interface of the construction payment management system.

19. A construction payment management system comprising:
- a software enabled user interface;
- a processor; and
- at least one computer readable memory storing instructions including instructions for a plurality of modules that can be selectively activated for a construction project managed by the construction payment management system, wherein the instructions, when executed by the processor, cause the construction payment management system to
  - create a project record for the construction project on the at least one computer readable memory,
  - create a payee user record for a payee on the at least one computer readable memory and associating the payee user record with the project record, the payee user record having a status,
  - create a list of required documents from the payee for the construction project on the at least one computer readable memory in response to input from a payer and associating the list of required documents with at least one of the project record and the payee user record, the list of required documents including one or more documents that must be provided by the payee for the construction project,
  - receive a compliance module setting via a selection mechanism included in the software enabled user interface,
  - assign the compliance module setting to at least one of the project record and the payee user record, the compliance module setting indicating
    - whether a compliance module is activated for the construction project and whether a hold payment mode of the compliance module is activated for the construction project,
  - store at least one electronic document submitted by the payee on the at least one computer readable memory, wherein the at least one electronic document is included in the list of required documents,
  - allow the payer to access the stored at least one electronic document,
  - automatically monitor the stored at least one electronic document and automatically compare the stored at least one electric document to the list of required documents,
  - automatically assign the status of the payee user record to noncompliant when the at least one stored electronic document does not include each document included in the list of required documents,
  - automatically assign the status of the payee user record to compliant when the at least one stored electronic document includes each document included in the list of required documents,
  - receive a request for a payment to the payee,
  - in response to receiving the request for the payment, automatically generate an unsigned lien waiver document and automatically transmit the unsigned lien waiver document to the payee,
  - receive an electronic signature for the unsigned lien waiver from the payee, automatically create an electronically-signed version of the unsigned lien waiver document, and automatically store the electronically-signed version of the unsigned lien waiver document to an electronic holding bin,
  - after receiving the electronic signature, automatically determine the compliance module setting and the status of the payee user record,
  - upon determining that the compliance module setting indicates that the compliance module is not activated for the construction project, automatically combine the payment to the payee with other payments associated with the construction project after receiving the electronic signature,
  - upon determining that the compliance module setting indicates that the compliance module is activated and that the hold payment mode of the compliance module is not activated for the construction project, automatically combine the payment to the payee with other payments associated with the construction project after receiving the electronic signature,
  - upon determining that the compliance module setting indicates that the compliance setting indicates that the compliance module is activated for the construction project, that the hold payment mode of the compliance module is activated for the construction project, and that the status of the payee user record is noncompliant, automatically hold the payment to the payee, and
  - after holding the payment to the payee, automatically initiate the payment to the payee after
    - automatically monitoring the stored at least one electronic document and comparing the stored at least one electronic document to the list of required documents, and
    - automatically assigning the status of the payee user record to compliant when the stored at least one electronic document includes each document included in the list of required documents.

20. The construction payment management system according to claim 19 wherein the instructions, when executed by the processor, further cause the construction payment management system to create a payment order before transmitting the unsigned lien waiver document.

21. The construction payment management system according to claim 20 wherein the instructions, when executed by the processor, cause the construction payment management system to receive the request for the payment by receiving the request for the payment from the payee via the software enabled user interface, and further cause the construction payment management system to:
  - display the request for the payment to the payer via the software enabled user interface; and
  - receive approval of the request for the payment from the payer via the user interface before creating the payment order.

22. The construction payment management system according to claim 19 wherein the instructions, when executed by the processor, further cause the software enabled user interface to be viewable on a display and editable through a keyboard, the display and the keyboard being remote from the processor.

23. The construction payment management system according to claim 19 wherein the instructions, when executed by the processor, further cause the software enabled user interface to be accessible on a plurality of networked computer terminals.

24. The construction payment management system according to claim 23 wherein the software enabled user interface is a web-based application accessible on a plurality of computer terminals connected to the Internet.

25. The construction payment management system according to claim 19 wherein the instructions, when executed by the processor, further cause the construction payment management system to display the electronically-signed version of the unsigned lien waiver document to the payer via the user interface only after the payment has been initiated.

26. The construction payment management system according to claim 19 wherein the instructions, when executed by the processor, cause the construction payment management system to receive the request for the payment by receiving an electronic invoice from the payee for work performed by the payee on the construction project.

27. The construction payment management system according to claim 19 further comprising a communication interface between the processor and an automated clearing house, wherein the instructions, when executed by the processor, cause the construction payment management system to initiate the payment by electronically communicating with the automated clearing house via the communication interface.

28. The construction payment management system according to claim 27 wherein the communication interface includes a telephone line.

29. The construction payment management system according to claim 27 wherein the communication interface includes an Internet connection.

30. The construction payment management system according to claim 19 further comprising an electronic interface between the processor and a bank, wherein the instructions, when executed by the processor, cause the construction payment management system to initiate the payment by requesting an electronic funds transfer at the bank.

31. The construction payment management system according to claim 19 further comprising a printer, wherein the instructions, when executed by the processor, cause the construction payment management system to initiate the payment by printing a check payable to the payee.

32. The construction payment management system according to claim 19 wherein the instructions, when executed by the processor, cause the construction payment management system to initiate the payment by displaying payment instructions to the payer via the software enabled user interface.

33. The construction payment management system according to claim 19 wherein the instructions, when executed by the processor, further cause the construction payment management system to generate an electronic receipt document and display the electronic receipt document to the payee via the software enabled user interface.

34. The construction payment management system according to claim 33 wherein the instructions, when executed by the processor, further cause the construction payment management system to store the electronic receipt in the at least one computer readable memory.

35. The construction payment management system according to claim 19 wherein the instructions, when executed by the processor, further cause the construction payment management system to generate an electronic payment record and display the electronic payment record to the payer via the software enabled user interface.

36. The construction payment management system according to claim 35 wherein the instructions, when executed by the processor, further cause the construction payment management system to store the electronic payment record in the at least one computer readable memory.

37. The construction payment management system of claim 19, wherein the instructions, when executed by the processor, further cause the construction payment management system to display the unsigned lien waiver document to the payer at any time after the electronic signature has been submitted by the payee; and display the electronically-signed version of the un-signed lien waiver document to the payer only after the payment is initiated to the payee.

38. The construction payment management system of claim 19, wherein the instructions, when executed by the processor, further cause the construction payment management system to receive a plurality of module settings for the plurality of modules stored to the computer readable memory, each module setting indicating whether a respective module is activated for the construction project.

39. The construction payment management system of claim 19, wherein the instructions, when executed by the processor, cause the construction payment management system to receive the compliance module setting by receiving a default compliance module setting from a first user and applying the default compliance module setting for all construction projects managed by the construction payment management system and associated with the first user.

40. The construction payment management system of claim 19, wherein the instructions, when executed by the processor, cause the construction payment management system to receive the compliance module setting by receiving the compliance module setting from a project manager, wherein the project manager is one selected from a group consisting of a project architect, a project owner, and a general contractor.

41. The construction payment management system of claim 19, further comprising a graphical user interface, and wherein the instructions, when executed by the processor, further cause the construction payment management system to display the list of required documents to the payee on a graphical user interface of the construction payment management system.

42. The construction payment management system according to claim 19 wherein the payment is initiated to the payee from a general contractor.

43. The construction payment management system according to claim 19 wherein the payee is a subcontractor or a supply vendor.

44. The construction payment management system according to claim 19 wherein the list of required documents includes at least one previously requested electronically signed document other than the unsigned lien waiver document.

45. A construction payment management system comprising:
   a software enabled user interface;
   a processor; and
   at least one computer readable memory storing instructions that, when executed by the processor, cause the construction payment management system to
      display to a payee via the user interface an electronic notification of a pending payment and a request for a signed lien waiver document,
      electronically receive the signed lien waiver document from the payee via the user interface, wherein the signed lien waiver includes an electronic signature,
      store an unsigned lien waiver based on the signed lien waiver in a first memory location of the at least one computer readable memory;
      store the signed lien waiver document in a second memory location of the at least one computer readable memory, automatically provide a payer access to the unsigned lien waiver document stored in the first memory location of the at least one computer readable memory before the pending payment corresponding to the signed lien waiver document has been initiated, automatically prevent access to the signed lien waiver document stored in the second memory location of the at least one computer readable memory until after the pending payment corresponding to the signed lien waiver document has been initiated, receive confirmation via the user interface that the pending payment corresponding to the signed lien waiver document has been initiated, and automatically provide the payer access to the signed lien waiver document stored in the second memory location of the at least one computer readable memory after receiving the confirmation.

46. The construction payment management system of claim 45, wherein the instructions, when executed by the processor, further cause the construction payment management system to automatically initiate the pending payment when the signed lien waiver document is stored in the second memory location of the at least one computer readable memory.

47. The construction payment management system of claim 46, wherein the instructions, when executed by the processor, further cause the construction payment management system to generate the unsigned lien waiver document by removing the electronic signature from the signed lien waiver document.

48. A computer implemented method of effectuating a payment in a construction project comprising:

electronically, with an application server, transmitting an electronic notification to a first device communicating with the application server over at least one communication network, the electronic notification informing a payee of a pending payment and requesting a signed lien waiver document from the payee;

receiving, with the application server, the signed lien waiver document from the payee through the first device, wherein the signed lien waiver includes an electronic signature;

storing, with the application server, an unsigned lien waiver based on the signed lien waiver in a first memory location of a computer readable memory;

storing, with the application server, the signed lien waiver document in a second memory location of the computer readable memory;

automatically providing, with the application server, a payer access to the unsigned lien waiver document stored in the first memory location of the computer readable memory through a second device communicating with the application server over at least one communication network before the pending payment corresponding to the signed lien waiver document has been initiated;

automatically preventing, with the application server, the payer from accessing the signed lien waiver document stored in the second memory location of the computer readable memory through the second device until after the pending payment corresponding to the signed lien waiver document has been initiated;

receiving, with the application server, confirmation that the pending payment corresponding to the signed lien waiver document has been initiated, and automatically providing, with the application server, the payer access to the signed lien waiver document stored in the second memory location of the computer readable memory through the second device after receiving the confirmation that the pending payment has been initiated.

49. The method according to claim 48, further comprising initiating the pending payment by check.

50. The method according to claim 48, further comprising initiating the pending payment by wire transfer.

51. The method of claim 48 further comprising generating the unsigned lien waiver document by removing the electronic signature from the signed lien waiver document.

* * * * *